(12) United States Patent
Doyen et al.

(10) Patent No.: US 12,301,871 B2
(45) Date of Patent: May 13, 2025

(54) ENCODING AND DECODING METHODS AND APPARATUS

(71) Applicant: InterDigital VC Holdings, Inc., Wilmington, DE (US)

(72) Inventors: Didier Doyen, Cesson-Sevigne (FR); Franck Galpin, Thorigne-Fouillard (FR); Guillaume Boisson, Pleumeleuc (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 321 days.

(21) Appl. No.: 17/786,211

(22) PCT Filed: Nov. 30, 2020

(86) PCT No.: PCT/US2020/062596
§ 371 (c)(1),
(2) Date: Jun. 16, 2022

(87) PCT Pub. No.: WO2021/126505
PCT Pub. Date: Jun. 24, 2021

(65) Prior Publication Data
US 2023/0019601 A1 Jan. 19, 2023

(30) Foreign Application Priority Data
Dec. 19, 2019 (EP) .................................. 19306707

(51) Int. Cl.
*H04N 19/00* (2014.01)
*H04N 19/105* (2014.01)
(Continued)

(52) U.S. Cl.
CPC ......... *H04N 19/597* (2014.11); *H04N 19/105* (2014.11); *H04N 19/139* (2014.11);
(Continued)

(58) Field of Classification Search
CPC ...................................................... H04N 19/00
See application file for complete search history.

(56) References Cited

U.S. PATENT DOCUMENTS 9,264,691 B2 2/2016 Zou et al.
9,503,702 B2 11/2016 Chen et al.
(Continued)

FOREIGN PATENT DOCUMENTS

EP 2837177 B1 8/2018
EP 3565253 A1 11/2019
(Continued)

OTHER PUBLICATIONS

Iyer et al., "Multi view Plus Depth Video Coding Using Depth Based 3D Wrapping", 2010 IEEE international Conference on Multimedia and Expo, Singapore, Jul. 19, 2019, 6 pages. (Year: 2019).*

(Continued)

*Primary Examiner* — Maryam A Nasri
(74) *Attorney, Agent, or Firm* — VOLPE KOENIG

(57) ABSTRACT

A method for decoding or encoding includes obtaining views parameters for a set of views comprising at least one reference view and a current view of a multi-views video content wherein each view comprises a texture layer and a depth layer. For at least one couple of a reference view and the current view of the set of views, an intermediate prediction image applying a forward projection method to pixels of the reference view is generated to project these pixels from a camera coordinates system of the reference view to a camera coordinates system of the current view, the prediction image comprising information allowing reconstructing image data. At least one final prediction image obtained from at least one intermediate prediction image is stored in a buffer of reconstructed images of the current view. A current image of the current view from the images (Continued)

stored in said buffer is reconstructed, said buffer comprising said at least one final prediction image.

24 Claims, 20 Drawing Sheets

(51) Int. Cl.
| | |
|---|---|
| *H04N 19/139* | (2014.01) |
| *H04N 19/159* | (2014.01) |
| *H04N 19/176* | (2014.01) |
| *H04N 19/30* | (2014.01) |
| *H04N 19/423* | (2014.01) |
| *H04N 19/52* | (2014.01) |
| *H04N 19/563* | (2014.01) |
| *H04N 19/597* | (2014.01) |
| *H04N 19/70* | (2014.01) |

(52) U.S. Cl.
CPC ......... *H04N 19/159* (2014.11); *H04N 19/176* (2014.11); *H04N 19/30* (2014.11); *H04N 19/423* (2014.11); *H04N 19/52* (2014.11); *H04N 19/563* (2014.11); *H04N 19/70* (2014.11)

(56) References Cited

U.S. PATENT DOCUMENTS

| | | | |
|---|---|---|---|
| 9,906,813 B2 | 2/2018 | Zhang et al. | |
| 9,961,370 B2 | 5/2018 | Chen et al. | |
| 10,097,858 B2 | 10/2018 | Lee et al. | |
| 2013/0003842 A1 | 1/2013 | Kondo | |
| 2014/0168362 A1 | 6/2014 | Hannuksela et al. | |
| 2014/0314147 A1 | 10/2014 | Rusanovskyy et al. | |
| 2015/0078450 A1* | 3/2015 | Chen .................... | H04N 19/577 375/240.16 |
| 2015/0358599 A1 | 12/2015 | Lin et al. | |

FOREIGN PATENT DOCUMENTS

| | | |
|---|---|---|
| JP | 2011147049 A | 7/2011 |
| WO | WO 201222364 A1 | 9/2012 |
| WO | WO 2019001710 A1 | 1/2019 |
| WO | 2019211429 A1 | 11/2019 |

OTHER PUBLICATIONS

Shimizu et al, "Backward View Synthesis Prediction using Virtual Depth Map for Multiview Video Plus Depth Map Coding", 2013 Visual Communications and Image Processing (VCIP), Kuching, Malaysia, Nov. 17, 2013, 6 pages.

Iyer et al., "Multiview Video Coding Using Depth Based 3D Wrapping", 2010 IEEE International Conference on Multimedia and Expo, Singapore, Jul. 19, 2019, 6 pages.

Huang et al., "Virtual View Synthesis for Multi-View Video plus Depth Sequences using Spatial-Temporal Information", 2015 3DTV-Conference: The True Vision—Capture, Transmission and Display of 3D Video (3DTV-CON), Lisbon, Portugal, Jul. 8, 2015, 4 pages.

Purica et al., "Multiview Plus Depth Video Coding With Temporal Prediction View Synthesis", IEEE Transactions on Circuits and Systems for Video Technology (vol. 26, Issue: 2), Jan. 9, 2015, 15 pages.

Lee et al., "Depth-Based Texture Coding in AVC-Compatible 3D Video Coding", IEEE Transactions on Circuits and Systems for Video Technology, vol. 25, No. 8, Aug. 2015, 15 pages.

Shahriyar et al., "Depth Sequence Coding with Hierarchical Partitioning and Spatial-Domain Quantisation", IEEE Transactions on Circuits and Systems for Video Technology, vol. 30, Issue: 3, Mar. 2020, 13 pages.

Tung et al., "View Synthesis Method for 3D Video Coding based on Temporal and Inter View Correlation", The Institution of Engineering and Technology (IET) Journals, IET Image Processing, vol. 12, No. 11, Jul. 16, 2018, 8 pages.

Tech et al., "Overview of the Multiview and 3D Extensions of High Efficiency Video Coding", IEEE Transactions on Circuits and Systems for Video Technology, vol. 26, Issue: 1, Jan. 2016, 15 pages.

Shimiszu et al., "CE1.h: View Synthesis Prediction using Forward Warping," Joint Collaborative Team on 3D Video Coding Extension Development of ITU-T SG 16 WP 3 and ISO/IEC JTC 1/SC 29/WG 11, JCT3V-C0104 (Jan. 17-23, 2023).

Tech et al., "3D-HEVC Test Model 1," Joint Collaborative Team on 3D Video Coding Extension Development of ITU-T SG 16 WP 3 and ISO/IEC JTC 1/SC 29/WG 11, 2JCT3V-A1005_d0, pp. 1,12-18,37-44 (Jul. 16-20, 2012).

* cited by examiner

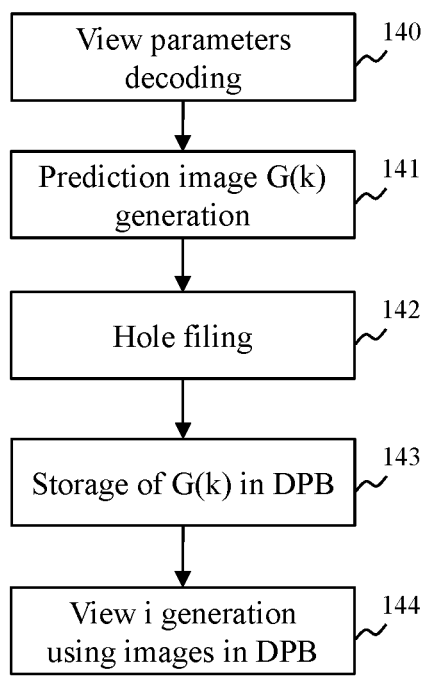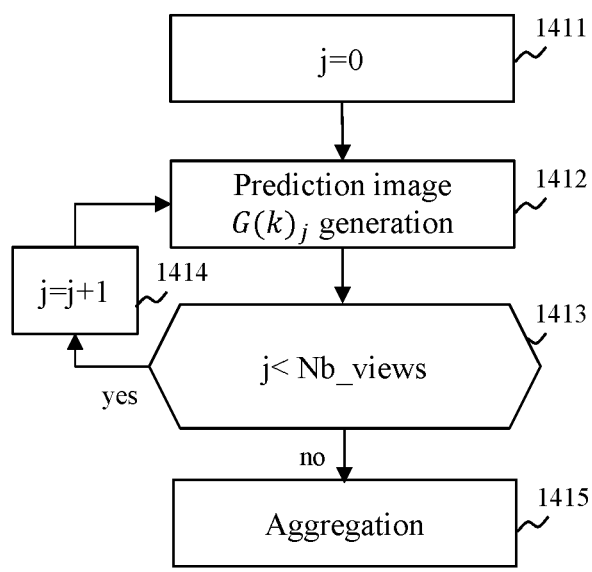
Fig. 14A
Fig. 14B

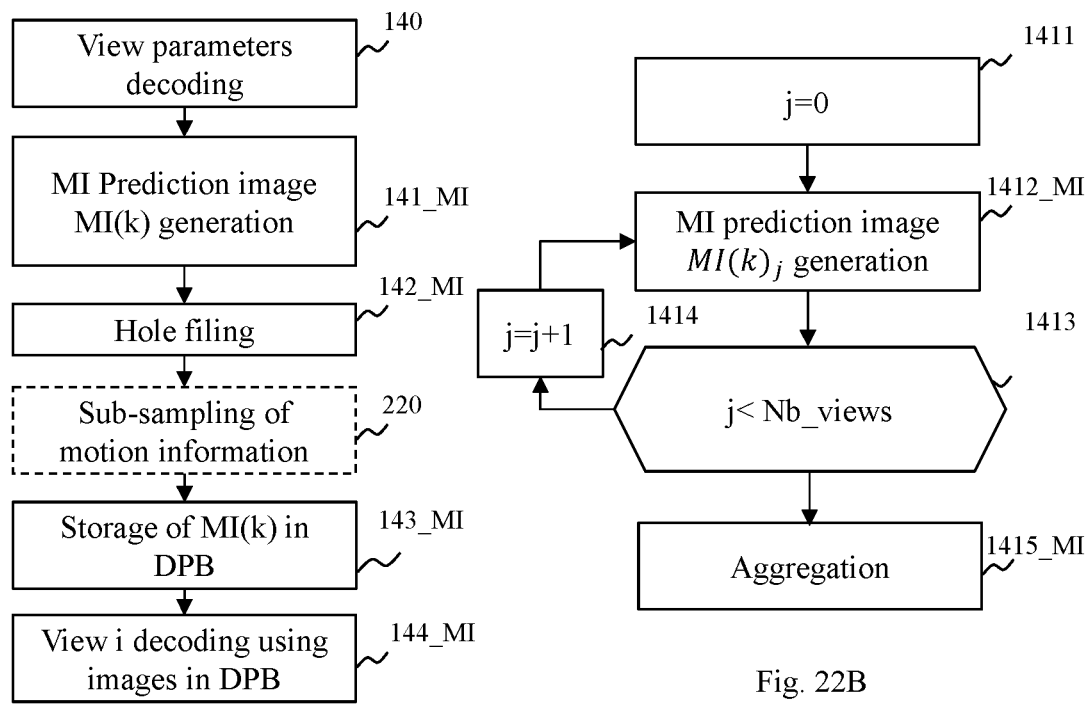
Fig. 22A
Fig. 22B
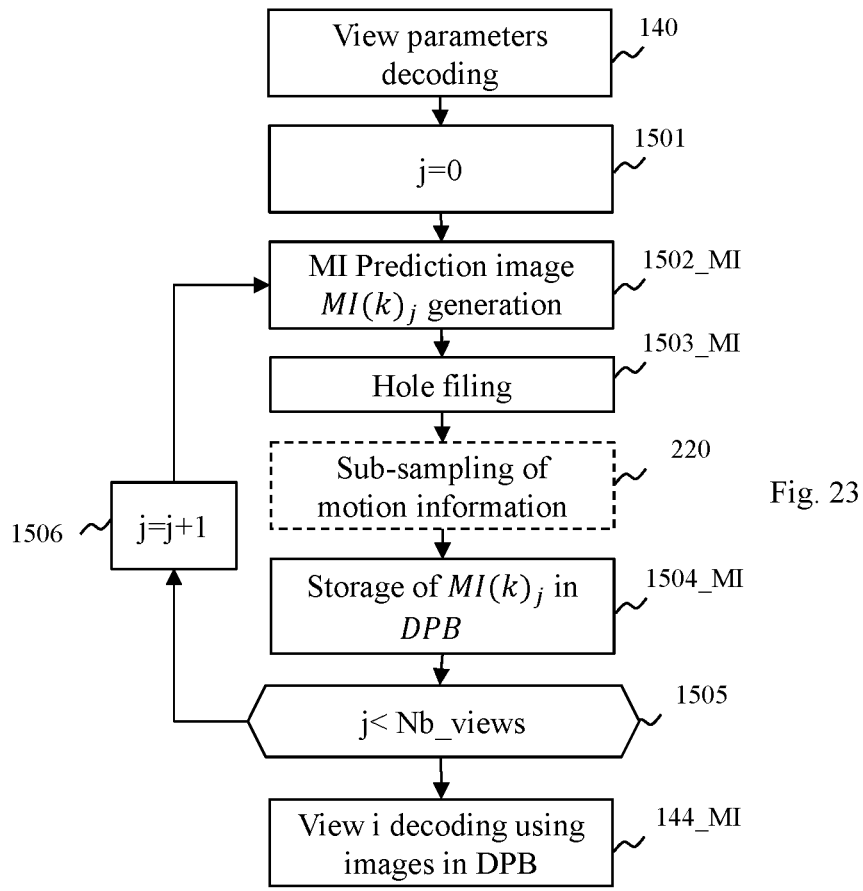
Fig. 23

ENCODING AND DECODING METHODS AND APPARATUS

CROSS REFERENCE TO RELATED APPLICATIONS

This application is a U.S. National Stage Application under 35 U.S.C. 371 of International Patent Application No. PCT/US2020/062596, filed Nov. 30, 2020, which is incorporated herein by reference in its entirety.

This application claims the benefit of European Patent Application No. 19306707.1, filed Dec. 19, 2019, which is incorporated herein by reference in its entirety.

1. TECHNICAL FIELD

At least one of the present embodiments generally relates to a method and an apparatus for video encoding or decoding, and more particularly, to a method and an apparatus for video encoding or decoding of MVD (Multi-View+Depth) data.

2. BACKGROUND

Compression of multi-view image or video contents (multiple views from multiple cameras), is investigated for several years by the image and video experts. Two types of contents are generally considered: contents, called multi-view (MV) contents, comprising synchronized images, each image corresponding to a different point of view on a same scene and contents in which MV contents are complemented by depth information of the scene, called multi-view+depth contents (MVD).

In 2015, to improve coding efficiency of multi-view contents, two extensions of HEVC (ISO/TEC 23008-2—MPEG-H Part 2. High Efficiency Video Coding/ITU-T H.265) were adopted:

MV-HEVC for MV contents;
3D-HEVC for MVD contents.

In MV-HEVC, in addition to the HEVC spatial intra image prediction (i.e. intra prediction) and temporal inter image prediction (i.e. inter prediction), inter-views prediction modes exploiting similarities between views were introduced. A first view is selected as a reference and at least a second view is encoded with respect to this reference view using disparity-based motion prediction. FIG. 11 illustrates an example of inter-dependencies between images of an MV content in both temporal and inter-views directions. A view View0 represents a reference view decodable without any inter-view prediction to remain backward compatible with HEVC. At a time T0, Views View1 and View2 are not encoded as all Intra image (I image) but encoded/decoded using a reconstructed image at T0 of view VieW0 as a reference image for prediction. An image at time T1 of view View1 is encoded/decoded using not only images of view View1 as reference image but also an image at time T1 of view View0.

Contents on which MV-HEVC was tested were only stereo contents or multi-view contents but with only "3" views acquired by aligned cameras. But following this MV-HEVC approach, the inter-view prediction is only exploiting the redundancy with the neighboring views based on a disparity estimation between adjacent views. This approach is not adapted to contents captured by camera arrays.

In 3D-HEVC the same approach as for MV-HEVC has been adopted but considering also the transmission of a dense depth information (i.e. one depth information per pixel of each view). Since contents were the same, the same inter-view approach with neighboring views has been adopted. More complex combinations of inter-views predictions have been introduced including the use of the additional depth information.

In order to use the depth information in the prediction mode selection, a View basic Synthesis Prediction mode (VSP) has been introduced. The basic VSP mode uses for a current block a Disparity Motion Vector (DMV) information corresponding to depth information of blocks neighboring the current block. The depth information is used to get from a reference view a block of texture as predictor for the current block. Since the depth of the current block is decoded after the texture, the depth information used is the one of neighboring blocks already reconstructed. The depth value of reconstructed neighboring blocks is generally considered as a sub-optimum depth value for an inter-views prediction.

It is desirable to propose solutions allowing providing an improved VSP mode.

3. BRIEF SUMMARY

In a first aspect, one or more of the present embodiments provide a method for decoding comprising:

obtaining views parameters for a set of views comprising at least one reference view and a current view of a multi-views video content wherein each view comprises a texture layer and a depth layer;

for at least one couple of a reference view and the current view of the set of views, generating an intermediate prediction image applying a forward projection method to pixels of the reference view to project these pixels from a camera coordinates system of the reference view to a camera coordinates system of the current view, the prediction image comprising information allowing reconstructing image data;

storing at least one final prediction image obtained from at least one intermediate prediction image in a buffer of reconstructed images of the current view;

reconstructing a current image of the current view from the images stored in said buffer, said buffer comprising said at least one final prediction image.

In a second aspect, one or more of the present embodiments provide a method for encoding comprising:

obtaining views parameters for a set of views comprising at least one reference view and a current view of a multi-views video content wherein each view comprises a texture layer and a depth layer;

for at least one couple of a reference view and the current view of the set of views, generating an intermediate prediction image applying a forward projection method to pixels of the reference view to project these pixels from a camera coordinates system of the reference view to a camera coordinates system of the current view, the prediction image comprising information allowing reconstructing image data;

storing at least one final prediction image obtained from at least one intermediate prediction image in a buffer of reconstructed images of the current view; and, reconstructing a current image of the current view from the images stored in said buffer, said buffer comprising said at least one final prediction image.

In a third aspect, one or more of the present embodiments provide a device for decoding comprising:

means for obtaining views parameters for a set of views comprising at least one reference view and a current view of a multi-views video content wherein each view comprises a texture layer and a depth layer;

means for generating an intermediate prediction image applying a forward projection method to pixels of a reference view to project these pixels from a camera coordinates system of the reference view to a camera coordinates system of the current view for at least one couple of a reference view and the current view of the set of views, the prediction image comprising information allowing reconstructing image data;

means for storing at least one final prediction image obtained from at least one intermediate prediction image in a buffer of reconstructed images of the current view;

means for reconstructing a current image of the current view from the images stored in said buffer, said buffer comprising said at least one final prediction image.

In a fourth aspect, one or more of the present embodiments provide a device for encoding comprising:

means for obtaining views parameters for a set of views comprising at least one reference view and a current view of a multi-views video content wherein each view comprises a texture layer and a depth layer;

means for generating an intermediate prediction image applying a forward projection method to pixels of a reference view to project these pixels from a camera coordinates system of the reference view to a camera coordinates system of the current view for at least one couple of a reference view and the current view of the set of views, the prediction image comprising information allowing reconstructing image data;

means for storing at least one final prediction image obtained from at least one intermediate prediction image in a buffer of reconstructed images of the current view;

means for reconstructing a current image of the current view from the images stored in said buffer, said buffer comprising said at least one final prediction image.

In a fifth aspect, one or more of the present embodiments provide an apparatus comprising a device according to the third and/or fourth aspect.

In a sixth aspect, one or more of the present embodiments provide a signal comprising data generated according to the method for encoding according to second aspect, or by the device for encoding according to the fourth aspect.

In a seventh aspect, one or more of the present embodiments provide a computer program comprising program code instructions for implementing the method according to the first or the second aspect.

In a height aspect, one or more of the present embodiments provide an information storage means storing program code instructions for implementing the method according to the first or the second aspect.

In a ninth aspect, one or more embodiments also provide a method and apparatus for transmitting or receiving a signal according to the sixth aspect.

In a tenth aspect, one or more embodiments also provide a computer program product including instructions for performing at least part of any of the methods described above.

In an embodiment of any of the previous aspect, the information allowing reconstructing image data comprise texture data and depth data.

In an embodiment of any of the previous aspect, the forward projection method comprises:

applying a de-projection to a current pixel of the reference view from the camera coordinates system of the reference view to a world coordinate system to obtain a de-projected pixel, the de-projection using a pose matrix of a camera acquiring the reference view, called reference camera, an inverse intrinsic matrix of the reference camera and a depth value associated to the current pixel;

projecting the de-projected pixel into the coordinate system of the current view to obtain a forward projected pixel using an intrinsic matrix and a extrinsic matrix of a camera acquiring the current view, called current camera, each matrix being obtained from the views parameters; and, if the obtained forward projected pixel doesn't correspond to a pixel on a grid of pixels of the current camera, selecting a pixel of said grid of pixels nearest to the forward projected pixel to obtain a corrected forward projected pixel.

In an embodiment of any of the previous aspect, the method comprises filling isolated missing pixels in each intermediate projection image or in the final projection image.

In an embodiment of any of the previous aspect, the information allowing reconstructing image data comprise motion information.

In an embodiment of any of the previous aspect, the forward projection method comprises:

applying a de-projection to a current pixel of the reference view from the camera coordinates system of the reference view to a world coordinate system to obtain a de-projected pixel, the de-projection using a pose matrix of a camera acquiring the reference view, called reference camera, an inverse intrinsic matrix of the reference camera and a depth value associated to the current pixel;

projecting the de-projected pixel into the coordinate system of the current view to obtain a forward projected pixel using an intrinsic matrix and a extrinsic matrix of a camera acquiring the current view, called current camera, each matrix being obtained from the views parameters:

if the obtained forward projected pixel doesn't correspond to a pixel on a grid of pixels of the current camera, selecting a pixel of said grid of pixels nearest to the forward projected pixel to obtain a corrected forward projected pixel;

computing a motion vector representative of a displacement between the forward projected pixel or the corrected forward projected pixel and the current pixel of the reference view.

In an embodiment of any of the previous aspect, the method comprising filling isolated missing motion information in each intermediate projection image or in the final projection image.

In an embodiment of any of the previous aspect, at least one final projection image is an intermediate projection image.

In an embodiment of any of the previous aspect, at least one final projection image result from an aggregation of at least two intermediate prediction images.

In an embodiment of any of the previous aspect, the method comprises for the at least one couple of a reference view and a current view, subsampling the depth layer of the reference view before applying the forward projection method to pixels of the reference view.

In an embodiment of any of the previous aspect, the method comprises, reconstructing a current block of the current image from a bi-directional predictor block computed as a weighted sum of two mono-directional predictor blocks, each mono-directional predictor block being extracted from one image stored in the buffer of reconstructed images of the current view, at least one of the mono-directional predictor blocks being extracted from a final prediction image stored in said buffer.

In an embodiment of any of the previous aspect, at least one weight used in the weighted sum is modified in function of a confidence rate of a pixel of a mono-directional predictor block.

In an embodiment of any of the previous aspect, the view parameters of each view are provided by a SEI message.

In an embodiment of any of the previous aspect, a syntax element representing information allowing reconstructing each final prediction image of a current view is comprised in a slice header or in a sequence header, or in an image header or at a level of a synchronization point or image.

In an embodiment of any of the previous aspect, the multi-views video content is encoded in an encoded video stream or decoded from an encoded video stream, and wherein, when a current block is encoded according to a prediction mode using a final prediction image to generate a predictor block for the current block, called VSP mode, the encoding of the current block according to the VSP mode is explicitly signaled by a flag in a portion of the encoded video stream corresponding to said current block or implicitly signaled by a syntax element representing an index of a final prediction image in a list of reconstructed images stored in the buffer of reconstructed images of the current view.

In an embodiment of any of the previous aspect, a portion of the encoded video stream corresponding to said current block comprises a syntax element representative of a motion information.

In an embodiment of any of the previous aspect, the motion information is representative of a motion vector refinement and/or of an index of a final prediction image in a list of final prediction images stored in the buffer of reconstructed images of the current view.

In an embodiment of any of the previous aspect, when a current block encoded in merge or skip mode inherits its encoding parameters from a block encoded in VSP mode, said current block inherits also VSP parameters.

4. BRIEF SUMMARY OF THE DRAWINGS

FIG. 14A depicts a first embodiment of a prediction image generation process;

FIG. 14B depicts a detail of a second embodiment of a prediction image generation process;

FIG. 22A depicts a fifth embodiment of a prediction image generation process;

FIG. 22B depicts a detail of a sixth embodiment of a prediction image generation process;

FIG. 23 depicts a seventh embodiment of a prediction image generation process;

5. DETAILED DESCRIPTION

In the following description, some embodiments use tools developed in the context of the international standard entitled Versatile Video Coding (VVC) under development by a joint collaborative team of ITU-T and ISO/IEC experts known as the Joint Video Experts Team (JVET) or in the context of HEVC, MV-HEVC or 3D-HEVC. However, these embodiments are not limited to the video coding/decoding method corresponding to VVC, HEVC, MV-HEVC or 3D-HEVC and applies to other video coding/decoding methods, but also to other image coding/decoding methods adapted to MVD contents.

In the embodiments described in the following, a new VSP mode is proposed.

In the following, FIGS. 24, 6, 7 and 8 describe basic embodiments allowing introducing some terminologies.

Figure 24:
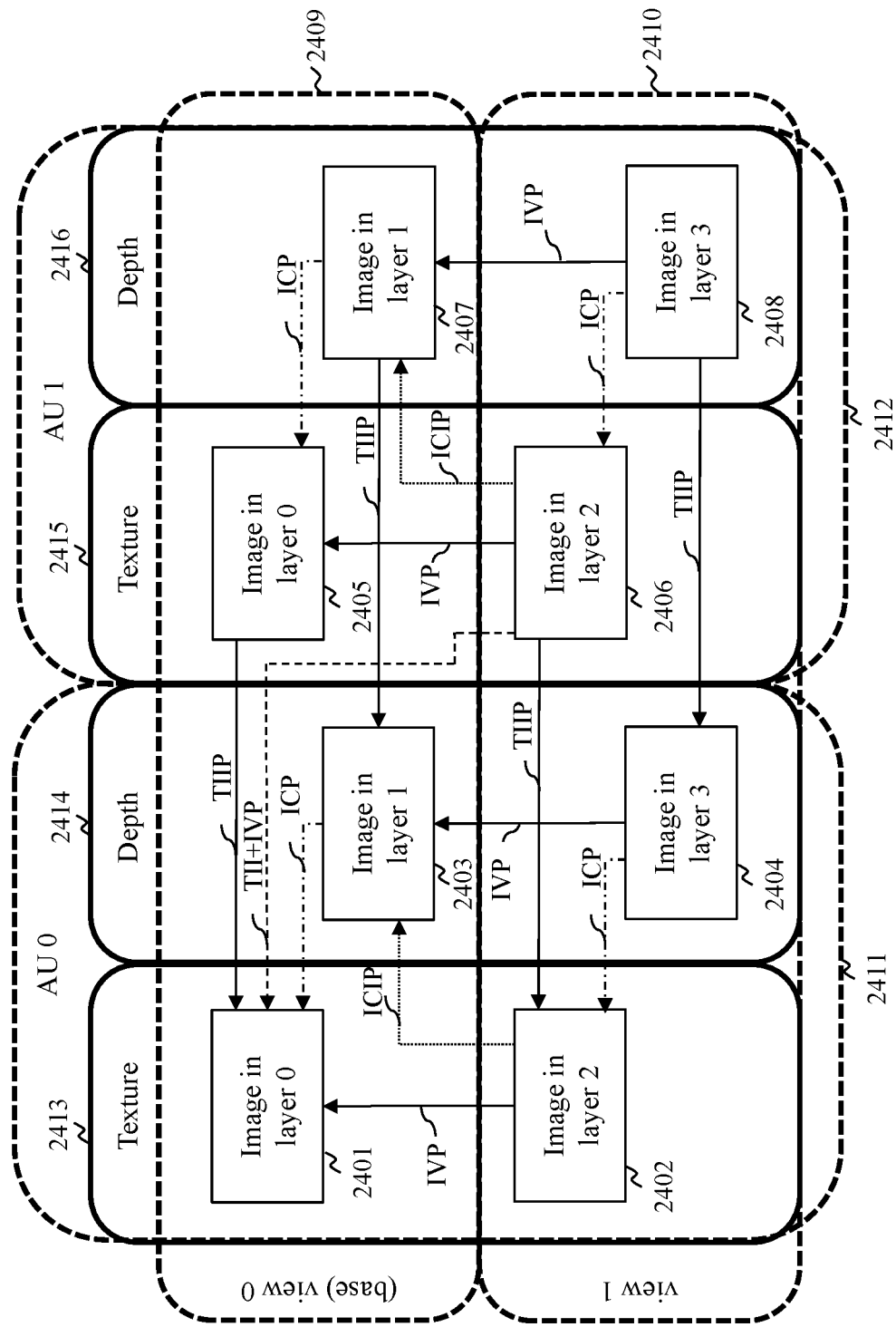
FIG. 24 illustrates schematically a typical coding structure and image dependencies of an MV-HEVC and 3D-HEVC codec; and, FIG. 25 depicts an eighth embodiment of a prediction image generation process.

FIG. 24 illustrates schematically a typical coding structure and image dependencies of an MV-HEVC and 3D-HEVC codec.

MV and 3D-HEVC are known to employ a multilayer approach in which layers are multiplexed into one bitstream and can depend on each other. In MV and 3D-HEVC, a layer can represent texture, depth, or other auxiliary information of a scene related to a particular camera. All layers belonging to a same camera are denoted as a view; whereas layers carrying the same type of information (e.g., texture or depth) are usually called components in the scope of 3D video.

FIG. 24 shows a typical coding structure comprising two views, a view "0" (also called base view) 2409 and a view 1 2410. Each view comprises two layers. View 0 2409 comprises a first layer made of an image of texture 2401 and an image of texture 2405 and a second layer comprising an image of depth 2403 and an image of depth 2407. View 1 2410 comprises a first layer made of images of texture 2402 and 2406 and a second layer comprising images of depth 2404 and 2408.

Two successive times are shown: by design choice, all images associated with the same capturing or display time instance are contained in one access unit (AU). Images 2401, 2402, 2403 and 2404 are in the same AU 0 2411. Images 2405, 2406, 2407 and 2408 are in the same AU 1 2412. The base layer is generally required to conform to an HEVC single-layer profile, and hence to be the texture component of the base view.

The layers of the images following the base layer image in an AU are denoted as enhancement layers, and the views other than the base view are denoted as enhancement views. In an AU, the order of views is required to be the same for all components. To facilitate combined coding, it is further required in 3D-HEVC that the depth component of a particular view immediately follows its texture component. An overview of dependencies between images in different layers and AUs is depicted in FIG. 24 and further discussed below.

In MV-HEVC, beyond conventional temporal inter-image prediction (represented by arrows associated with an acronym TIIP in FIG. 24), using images of the same view and component, however, in different AUs, MV-HEVC allows prediction from images in the same AU and component but in different views, in the following denoted as inter-view prediction (represented by arrows associated with an acronym IVP in FIG. 24). For inter-view prediction, the decoded images from other views can be used as reference image for a current image.

Motion vectors associated to a current block of a current image may be temporal (noted TMV in the following) when related to temporal reference images of the same view or may be disparity MVs (noted DMV in the following) when related to inter-view reference images. Existing block-level HEVC motion compensation modules can be used which operate the same way regardless of whether an MV is a TMV or a DMV.

For increased compression performance, 3D-HEVC extends MV-HEVC by allowing new types of inter-layer prediction. As indicated in FIG. 24, the new prediction types are the following:
  combined temporal and inter-view prediction (represented by an arrow with an acronym TII+IVP in FIG. 24), referring to an image in the same component but in a different AU and a different view;
  inter-component prediction (represented by an arrow with an acronym ICP in FIG. 24), referring to images in the same AU and view but in a different component;
  combined inter-component and inter-view prediction (represented by an arrow with an acronym ICIP in FIG. 24), referring to images in the same AU but in a different view and component.

A further design change compared with MV-HEVC is that besides samples and motion information, residual, disparity and partitioning information can also be predicted or inferred. A detailed overview of texture and depth coding tools is provided in document "Overview of the Multiview and 3D Extensions of High Efficiency Video Coding, IEEE Transactions on circuits and systems for video technology, Vol. 26, No. 1, January 2016, G. Tech; Y. Chen; K. Müller; J-R. Ohm; A. Vetro; Y-K. Wang".

Due to the similarities between HEVC and VVC, it should be possible to adapt the compression tools defined in in the context of MV and 3D-HEVC to the context of VVC to obtain a codec capable of handling multi-view contents (with or without depth information). As in the context of HEVC, in the context of VVC a base layer of a multi-view content comprising only texture information should be fully compatible with VVC.

Figure 6:
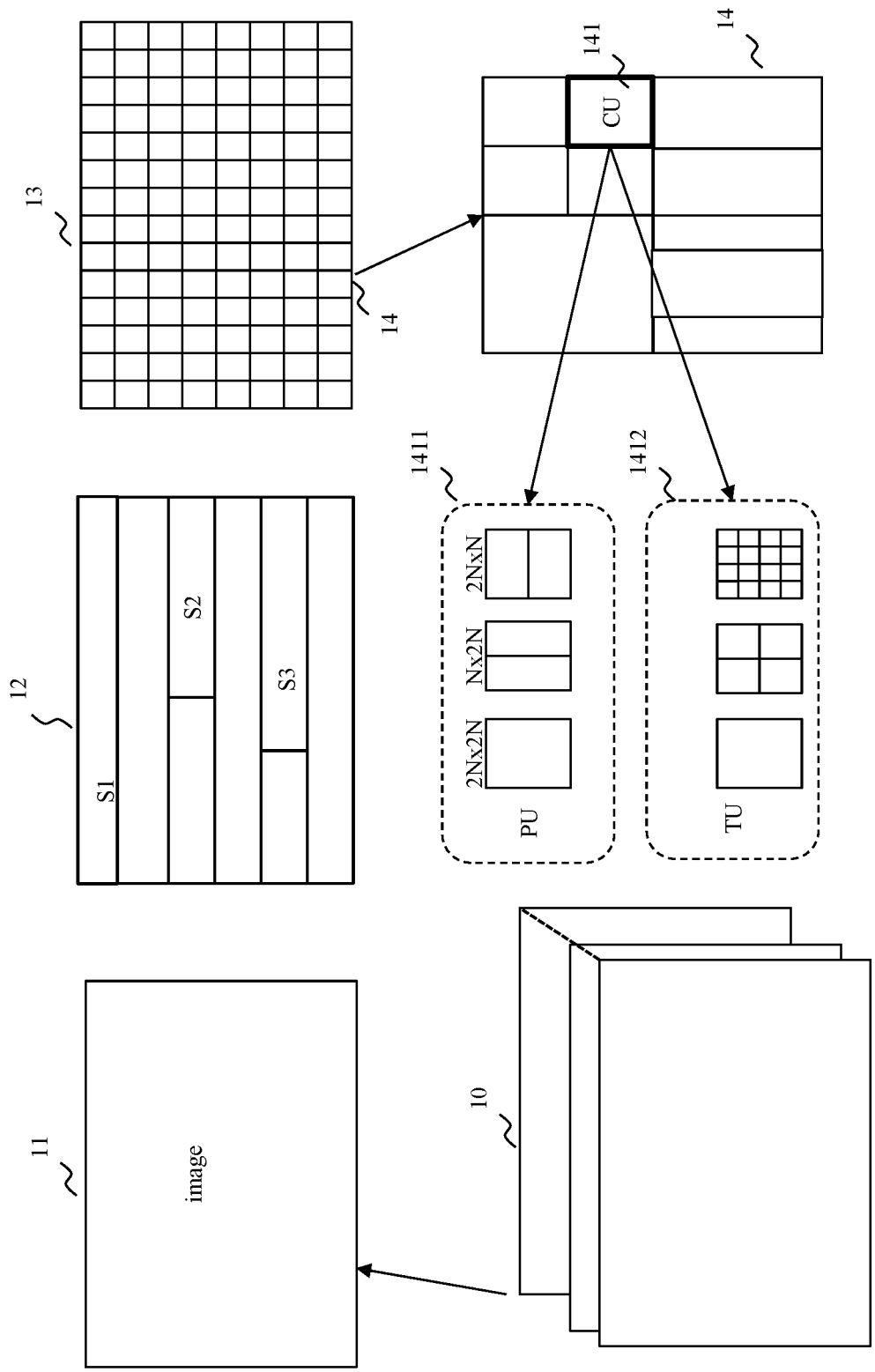
FIG. 6 depicts schematically a method for partitioning an image.
Figure 7:
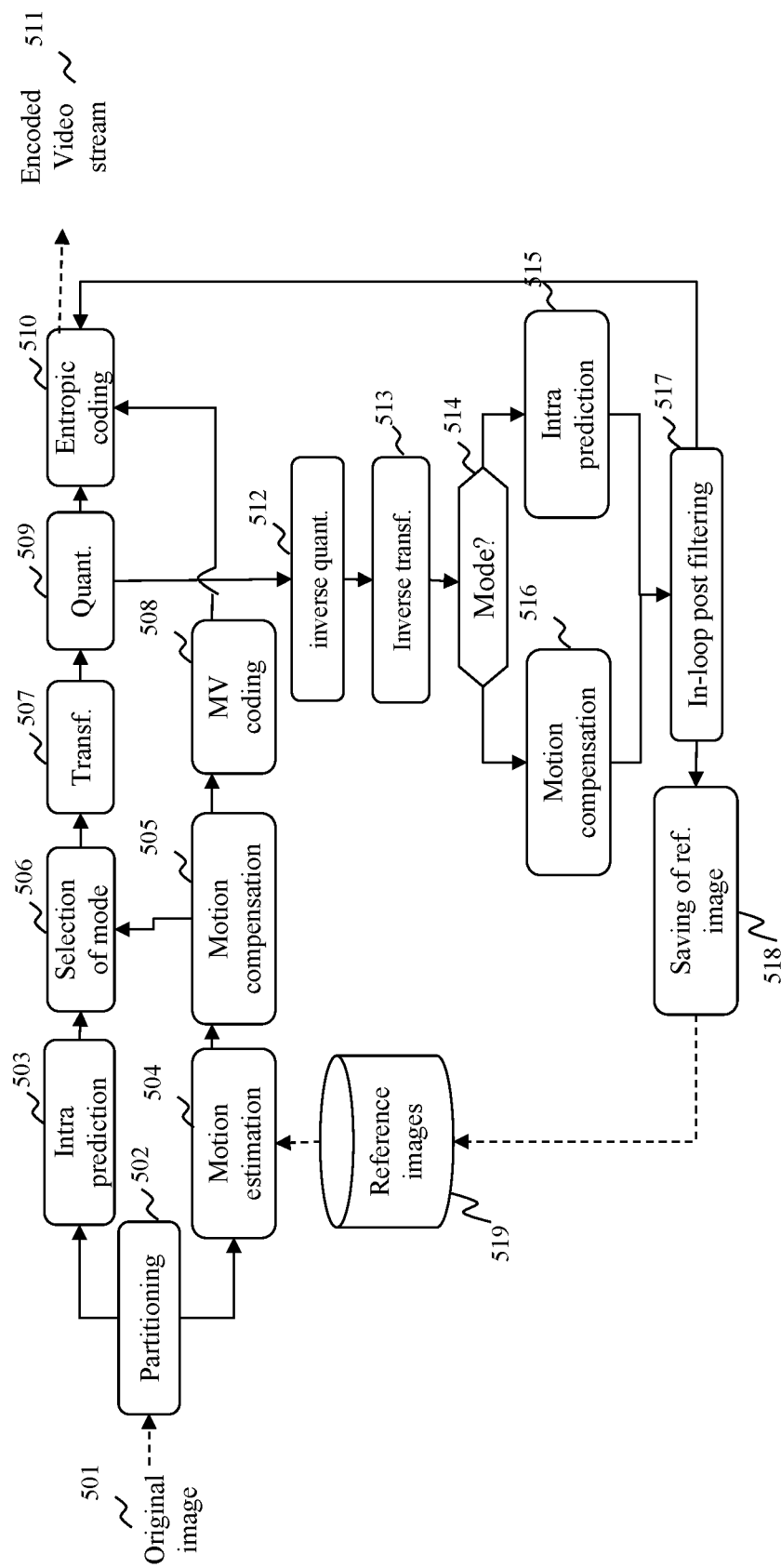
FIG. 7 depicts schematically an example of a method for encoding an encoded video stream representative of one view.
Figure 8:
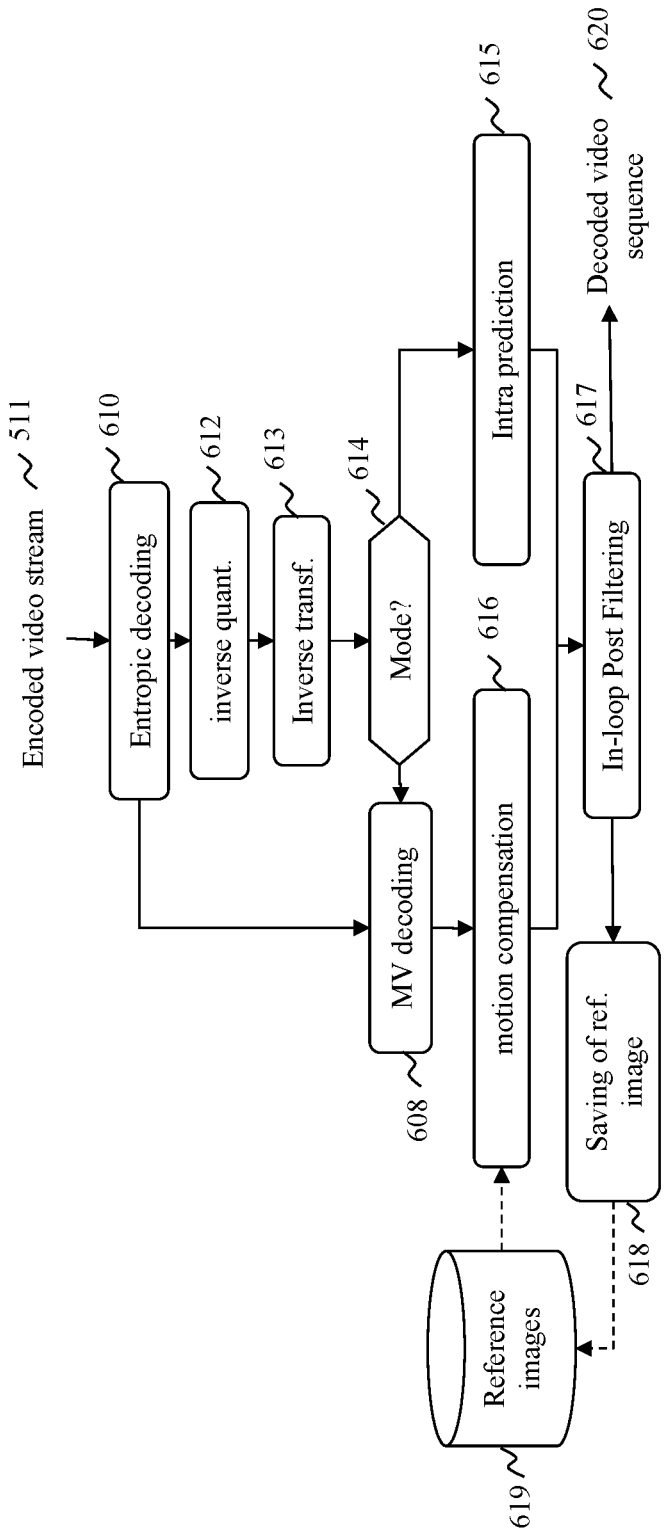
FIG. 8 depicts schematically an example of a method for decoding an encoded video stream representative of one view.

FIGS. 6, 7 and 8 reminds some key features of basic compression methods that could be used for encoding a base layer of a multi-view content.

FIG. 6 illustrates an example of partitioning undergone by an image of pixels 11 of an original video 10. It is considered here that a pixel is composed of three components corresponding to a base layer of a multi-view content; a luminance component and two chrominance components. The same partitioning could be applied to all layers of the multi-view content, i.e. a texture layer and a depth layer. In addition, the same partitioning could be applied to another number of components or layers, for example a texture layer comprising four components (a luminance, two chrominance and a transparency components) and a depth layer.

An image is divided in a plurality of coding entities. First, as represented by reference 13 in FIG. 6, an image is divided in a grid of blocks also called coding tree units (CTU). A CTU consists of an N×N block of luminance samples together with two corresponding blocks of chrominance samples. N is a power of two having, for example a maximum value of "128". Second, an image is divided into one or more tile rows and tile columns, a tile being a sequence of CTU covering a rectangular region of an image. In some video compression scheme, a tile could be divided into one or more bricks, each of which consisting of at least one row of CTU within the tile. Above the concept of tiles and bricks, another encoding entity, called slice, exists, that can contain at least one tile of an image or at least one brick of a tile.

In the example in FIG. 6, as represented by reference 12, the image 11 is divided into three slices S1, S2 and S3, each comprising a plurality of tiles (not represented).

As represented by reference 14 in FIG. 6, a CTU may be partitioned in the form of a hierarchical tree of one or more sub-blocks called coding units (CU). The CTU is a root (i.e. a parent node) of the hierarchical tree and can be partitioned in a plurality of CU (i.e. child nodes). Each CU becomes a leaf of the hierarchical tree if it is not further partitioned in smaller CU or becomes a parent node of smaller CU (i.e. child nodes) if it is further partitioned. Different types of hierarchical trees could be used: quadtrees in which a CTU or a CU is divided in four square CU or equal sizes; binary trees, in which a CTU (respectively a CU) can be partitioned horizontally or vertically in "2" rectangular CU of equal sizes; ternary trees, in which a CTU (respectively a CU) can be partitioned horizontally or vertically in "3" rectangular CU.

In the example of FIG. 6, the CTU 14 is first partitioned in "4" square CU using a quadtree type partitioning. The upper left CU is a leaf of the hierarchical tree since it is not further partitioned, i.e. it is not a parent node of other CU. The upper right CU is further partitioned in "4" smaller square CU using again a quadtree type partitioning. The bottom right CU is vertically partitioned in "2" rectangular CU using a binary tree type partitioning. The bottom left CU is vertically partitioned in "3" rectangular CU using a ternary tree type partitioning.

During the coding of an image, the partitioning is adaptive, each CTU being partitioned so as to optimize a compression efficiency criterion.

In some video compression scheme appeared the concept of prediction unit (PU) and transform unit (TU). Indeed, in that case, the coding entity that is used for prediction (i.e. a PU) and transform (i.e. a TU) can be a subdivision of a CU. For example, as represented in FIG. 6, a CU of size 2N×2N, can be divided in PU 1411 of size N×2N or of size 2N×N. In addition, said CU can be divided in "4" TU 1412 of size N×N or in "16" TU of size $$\left(\frac{N}{2}\right) \times \left(\frac{N}{2}\right).$$

In the present application, the term "block" or "image block" can be used to refer to any one of a CTU, a CU, a PU and a TU. In addition, the term "block" or "image block" can be used to refer to a macroblock, a partition and a sub-block and more generally to refer to an array of samples of numerous sizes.

In the present application, the terms "reconstructed" and "decoded" may be used interchangeably, the terms "pixel" and "sample" may be used interchangeably, the terms "image," "picture" may be used interchangeably. In the particular context of MVD data, similarly to an AU in FIG. 24, a frame at a time T is considered as an entity comprising for each view an image (texture and depth) corresponding to the time T. Usually, but not necessarily, the term "reconstructed" is used at the encoder side while "decoded" is used at the decoder side.

FIG. 7 depicts schematically a method for encoding a video stream executed by an encoding module. Variations of this method for encoding are contemplated, but the method for encoding of FIG. 7 is described below for purposes of clarity without describing all expected variations. In particular, the described method for encoding is applied to a base layer of a multi-view content, each pixel of said base layer comprising a luminance component and two chrominance components. Specific encoding tools adapted to multi-view contents and in particular to the encoding of a depth layer are not further described.

The encoding of a current original image 501 begins with a partitioning of the current original image 501 during a step 502, as described in relation to FIG. 6. The current image 501 is thus partitioned into CTU, CU, PU, TU, etc. For each block, the encoding module determines a coding mode between an intra prediction and an inter prediction.

The intra prediction consists of predicting, in accordance with an intra prediction method, during a step 503, the pixels of a current block from a prediction block derived from pixels of reconstructed blocks situated in a causal vicinity of the current block to be coded. The result of the intra prediction is a prediction direction indicating which pixels of the blocks in the vicinity to use, and a residual block resulting from a calculation of a difference between the current block and the prediction block.

The inter prediction consists of predicting the pixels of a current block from a block of pixels, referred to as the reference block, of an image preceding or following the current image, this image being referred to as the reference image. During the coding of a current block in accordance with the inter prediction method, a block of the reference image closest, in accordance with a similarity criterion, to the current block is determined by a motion estimation step 504. During step 504, a motion vector indicating the position of the reference block in the reference image identified by an index is determined. Said motion vector and said index of the reference image is used during a motion compensation step 505 during which a residual block is calculated in the form of a difference between the current block and the reference block. It should be noted that only a mono-predicted inter prediction is described here. There also exists a bi-predicted inter prediction (or B mode) for which a current block is associated with two motion vectors, designating two reference blocks in two different images (each designated by a reference image index), the residual block of this block then being an average of two residual blocks.

Note that intra and inter prediction are generic terms that includes many modes based on the generic principle of spatial and temporal prediction.

During a selection step 506, the prediction mode optimising the compression performances, in accordance with a rate/distortion criterion, among the prediction modes tested, is selected by the encoding module. When the prediction mode is selected, the residual block is transformed during a step 507 and quantized during a step 509. Note that the encoding module can skip the transform and apply quantization directly to the non-transformed residual signal. When the current block is coded according to an intra prediction, the prediction direction and the transformed and quantized residual block are encoded by an entropic encoder during a step 510. When the current block is encoded according to an inter prediction, the motion vector of the block is predicted from a prediction vector selected from a set of motion vectors corresponding to reconstructed blocks situated in the vicinity of the block to be coded. The motion information (comprising a motion vector residual, an index of the motion vector predictor, an index of the reference image) is next encoded by the entropic encoder during step 510 in the form of a motion residual and an index for identifying the prediction vector. The transformed and quantized residual block is encoded by the entropic encoder during step 510. Note that the encoding module can bypass both transform and quantization, i.e., the entropic encoding is applied on the residual without the application of the transform or quantization processes. The result of the entropic encoding is inserted in an encoded video stream 511.

After the quantization step 509, the current block is reconstructed so that the pixels corresponding to that block can be used for future predictions. This reconstruction phase is also referred to as a prediction loop. An inverse quantization is therefore applied to the transformed and quantized residual block during a step 512 and an inverse transformation is applied during a step 513. According to the prediction mode used for the block obtained during a step 514, the prediction block of the block is reconstructed. If the current block is encoded according to an inter prediction, the encoding module applies, during a step 516, a motion compensation using the motion vector of the current block in order to identify the reference block of the current block. If the current block is encoded according to an intra prediction, during a step 515, the prediction direction corresponding to the current block is used for reconstructing the reference block of the current block. The reference block and the reconstructed residual block are added in order to obtain the reconstructed current block.

Following the reconstruction, an in-loop post-filtering intended to reduce the encoding artefacts is applied, during a step 517, to the reconstructed block. This post-filtering is called in-loop post-filtering since this post-filtering occurs in the prediction loop to obtain the encoding of the same reference images as the decoder and thus avoid a drift between the encoding and the decoding. For instance, the in-loop post-filtering comprises a deblocking filtering and a SAO (sample adaptive offset) filtering. Parameters representative of the activation or the deactivation of the in-loop deblocking filter and when activated, of characteristics of said in-loop deblocking filter are introduced in the encoded video stream 511 during the entropic coding step 510. When a block is reconstructed, it is inserted during a step 518 into a reconstructed image stored in a memory 519 of reconstructed images, also referred to as a reference image memory, reference image buffer or decoded picture buffer (DPB). The reconstructed images thus stored can then serve as reference images for other images to be coded.

FIG. 8 depicts schematically a method for decoding the encoded video stream 511 encoded according to the method described in relation to FIG. 7 executed by a decoding module. Variations of this method for decoding are contemplated, but the method for decoding of FIG. 8 is described below for purposes of clarity without describing all expected variations.

The decoding is done block by block. For a current block, it starts with an entropic decoding of the current block during a step 610. Entropic decoding allows to obtain the prediction mode of the block.

If the block has been encoded according to an inter prediction, the entropic decoding allows to obtain a prediction vector index, a motion residual, an index on a reference image and a residual block. During a step 608, a motion vector is reconstructed for the current block using the prediction vector index and the motion residual.

If the block has been encoded according to intra prediction, entropic decoding allows to obtain a prediction direction and a residual block. Steps 612, 613, 614, 615, 616 and 617 implemented by the decoding module are in all respects identical respectively to steps 512, 513, 514, 515, 516 and 517 implemented by the encoding module. Decoded blocks are saved in decoded images and the decoded images are stored in a DPB 619 in a step 618. When the decoding module decodes a given image, the images stored in the DPB 619 are identical to the images stored in the DPB 519 by the encoding module during the encoding of said given image. The decoded image can also be outputted by the decoding module for instance to be displayed.

Figure 1:
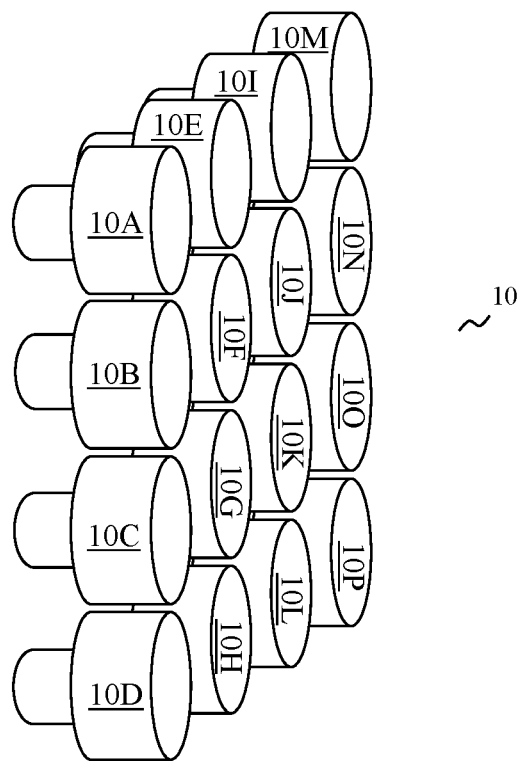
FIG. 1 illustrates schematically an example of camera array adapted to acquire a MVD content.

FIG. 1 illustrates schematically an example of camera array adapted to acquire a MVD content.

FIG. 1 represents a camera array 10 comprising "16" cameras 10A to 10P positioned on a 4×4 grid. Each camera of the camera array 10 focuses on a same scene and is capable of acquiring for example images where pixels comprises a luminance and two chrominance components. Calculation means or measurements means (not represented), for example connected to the camera array 10 are used for generating a depth map for each image generated by a camera of the camera array 10. In the example of FIG. 1, each depth map associated to an image has the same resolution than said image (i.e. the depth map comprises a depth value for each pixel of said image). The camera array 10 generates therefore a MVD content comprising "16" texture layers and "16" depth layers. With such kind of camera array, overlap between captured views is important. This is a goal of the following embodiments to improve the overall compression rate that could be achieved with such multi-view content.

Each camera of the camera array 10 is associated to intrinsic and extrinsic camera parameters. As will be described latter in this document, these parameters are needed by a decoder to create prediction images. In an embodiment, the intrinsic and extrinsic parameters are provided to the decoder in the form of SEI (supplemental Enhancement Information) messages. SEI messages were defined in H.264/AVC and HEVC to convey metadata.

Table TAB1 describes a syntax of a SEI message adapted to convey intrinsic and extrinsic parameters of a camera array. This syntax is identical to a syntax of a Multiview acquisition information SEI message syntax in HEVC (section G.14.2.6).

TABLE TAB1

| multiview_acquisition_info( payloadSize ) { | Descriptor |
| --- | --- |
| intrinsic_param_flag | u(1) |
| extrinsic_param_flag | u(1) |
| if( instrinsic_param_flag ) { | |
| intrinsic_params_equal_flag | u(1) |
| prec_focal_length | ue(v) |
| prec_principal_point | ue(v) |
| prec_skew_factor | ue(v) |
| for( i = 0; i <= intrinsic_params_equal_flag ? 0 : numViewsMinus1; i++ ) { | |
| sign_focal_length_x[ i ] | u(1) |
| exponent_focal_length_x[ i ] | u(6) |
| mantissa_focal_length_x[ i ] | u(v) |
| sign_focal_length_y[ i ] | u(1) |
| exponent_focal_length_y[ i ] | u(6) |
| mantissa_focal_length_y[ i ] | u(v) |
| sign_principal_point_x[ i ] | u(1) |
| exponent_principal_point_x[ i ] | u(6) |
| mantissa_principal_point_x[ i ] | u(v) |
| sign_principal_point_y[ i ] | u(1) |
| exponent_principal_point_y[ i ] | u(6) |
| mantissa_principal_point_y[ i ] | u(v) |

TABLE TAB1-continued

| multiview_acquisition_info( payloadSize ) { | Descriptor |
|---|---|
|     sign_skew_factor[ i ] | u(1) |
|     exponent_skew_factor[ i ] | u(6) |
|     mantissa_skew_factor[ i ] | u(v) |
|    } | |
| } | |
| if( extrinsic_param_flag ) { | |
|   prec_rotation_param | ue(v) |
|   prec_translation_param | ue(v) |
|   for( i = 0; i <= numViewsMinus1; i++ ) | |
|    for( j = 1; j <= 3; j++ ) { /* row */ | |
|     for( k = 1; k <= 3; k++ ) { /* column */ | |
|      sign_r[ i ][ j ][ k ] | u(1) |
|      exponent_r[ i ][ j ][ k ] | u(6) |
|      mantissa_r[ i ][ j ][ k ] | u(v) |
|     } | |
|     sign_t[ i ][ j ] | u(1) |
|     exponent_t[ i ][ j ] | u(6) |
|     mantissa_t[ i ][ j ] | u(v) |
|    } | |
|  } | |
| } | |

One goal of the embodiments described below is to improve the prediction of one view based on at least one other view. Since we target multi-view contents captured by camera arrays as described above, any of the cameras can provide a good prediction for some or all of the neighbouring views. In order to create a prediction image for a current image of a current view, previously decoded views and their associated camera parameters and the camera parameters associated to the current view are used. Note that either texture layer or depth layer in a view can use the new vsp mode.

Let consider a camera calibrated as a plain pinhole and $$K = \begin{pmatrix} f & \gamma & c_u \\ 0 & \alpha f & c_v \\ 0 & 0 & 1 \end{pmatrix}$$

the intrinsic matrix of said camera:

f denotes a distance from an exit pupil to a sensor of the camera, expressed in pixels, and often abusively referred to as "focal length" in the literature. In table TAB1 this information is described with the following set of parameters:

| | |
|---|---|
| sign_focal_length_x[ i ] | u(1) |
| exponent_focal_length_x[ i ] | u(6) |
| mantissa_focal_length_x[ i ] | u(v) |

$$\begin{pmatrix} c_u \\ c_v \end{pmatrix}$$

denotes pixel coordinates of a so-called "principal point", i.e. an orthogonal projection of the pinhole onto the sensor. In Table 1 this information is described with the following set of parameters:

| | |
|---|---|
| sign_principal_point_x[ i ] | u(1) |
| exponent_principal_point_x[ i ] | u(6) |
| mantissa_principal_point_x[ i ] | u(v) |
| sign_principal_point_y[ i ] | u(1) |
| exponent_principal_point_y[ i ] | u(6) |
| mantissa_principal_point_y[ i ] | u(v) |

$\alpha$ and $\gamma$ respectively denote pixels' aspect ratio and a sensor's skew coefficient. The $\alpha$ value is not directly expressed in Table 1 but the $\alpha f$ value:

| | |
|---|---|
| sign_focal_length_y[ i ] | u(1) |
| exponent_focal_length_y[ i ] | u(6) |
| mantissa_focal_length_y[ i ] | u(v) |

The $\gamma$ value is described in table 1 as:

| | |
|---|---|
| sign_skew_factor[ i ] | u(1) |
| exponent_skew_factor[ i ] | u(6) |
| mantissa_skew_factor[ i ] | uv) |

If $$\begin{pmatrix} x \\ y \\ z \end{pmatrix}$$

are coordinates of a given point in the Coordinate System (CS) of a camera, the coordinates of its projection in an image $$\begin{pmatrix} u \\ v \end{pmatrix}$$

are given (in pixel) by:

$$\begin{pmatrix} u \\ v \\ 1 \end{pmatrix} \equiv K \cdot \begin{pmatrix} x \\ y \\ z \end{pmatrix}$$

Where the symbol denotes the equivalence relation between homogeneous vectors:

$$\begin{pmatrix} s \\ t \\ 1 \end{pmatrix} \equiv \begin{pmatrix} x \\ y \\ z \end{pmatrix} \Leftrightarrow \begin{cases} s = x/z \\ t = y/z \end{cases}$$

Let $P=(R\ T) \in \mathbb{R}_{3 \times 4}$ denote a pose matrix of the camera, where $R \in \mathbb{R}_{3 \times 3}$ and $T \in \mathbb{R}_{3 \times 1}$ respectively denote the camera's orientation and position in a reference Coordinate System (CS). The camera's extrinsic matrix is defined by:

$Q=(R^{-1} - R^{-1} \cdot T) \in \mathbb{R}_{3 \times 4}$

For each camera, in table TAB1, R and T matrix are described by:

```
for( j = 1; j <= 3; j++ ) { /* row */
for( k = 1; k <= 3; k++ ) { /* column */
sign_r[ i ][ j ][ k ]
exponent_r[ i ][ j ][ k ]
mantissa_r[ i ][ j ][ k ]
}
sign_t[ i ][ j ]
exponent_t[ i ][ j ]
mantissa_t[ i ][ j ]
 }
 }
```

If $$X_{cam} = \begin{pmatrix} x_{cam} \\ y_{cam} \\ z_{cam} \end{pmatrix} \text{ and } X_{world} = \begin{pmatrix} x_{world} \\ y_{world} \\ z_{world} \end{pmatrix}$$

denote the coordinates of the same point respectively in the Camera CS and in the reference CS, then $$X_{cam} = Q \cdot \begin{pmatrix} X_{world} \\ 1 \end{pmatrix} \text{ and } X_{world} = P \cdot \begin{pmatrix} X_{cam} \\ 1 \end{pmatrix}.$$

Figure 12:
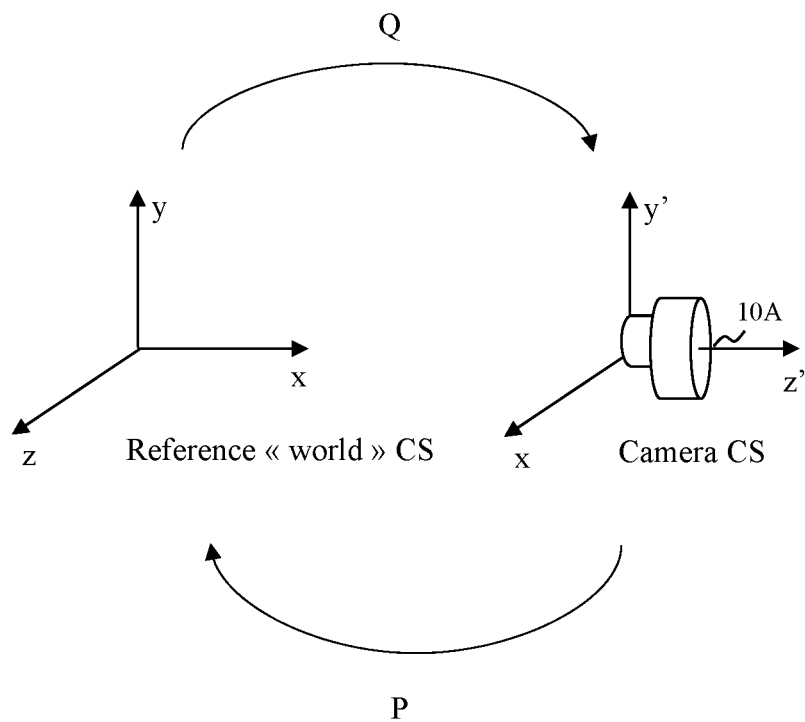
FIG. 12 represents schematically transitions between a world coordinate system and a camera coordinate system.

FIG. 12 represents the projection from the reference CS to the Camera CS and from the camera CS to the reference CS.

Now let's consider a given camera c is providing a current view. The camera c is associated with an intrinsic matrix $K_c$ and a pose matric $P_c$. Let $$\begin{pmatrix} u \\ v \end{pmatrix}$$

be a current pixel in an image of the current view acquired by the camera c, and z be its presumed depth. A pixel $$\begin{pmatrix} u' \\ v' \end{pmatrix}$$

of an image of a reference view provided by a camera c' associated with an intrinsic matrix $K_{c'}$ and an extrinsic matrix $Q_{c'}$ corresponding to the current pixel $$\begin{pmatrix} u \\ v \end{pmatrix}$$

is given by:

$$\begin{pmatrix} u' \\ v' \\ 1 \end{pmatrix} \equiv K_{c'} \cdot Q_{c'} \cdot \begin{pmatrix} P_c \cdot \begin{pmatrix} z \cdot K_c^{-1} \cdot \begin{pmatrix} u \\ v \\ 1 \end{pmatrix} \\ 1 \end{pmatrix} \\ 1 \end{pmatrix}$$

Figure 9:
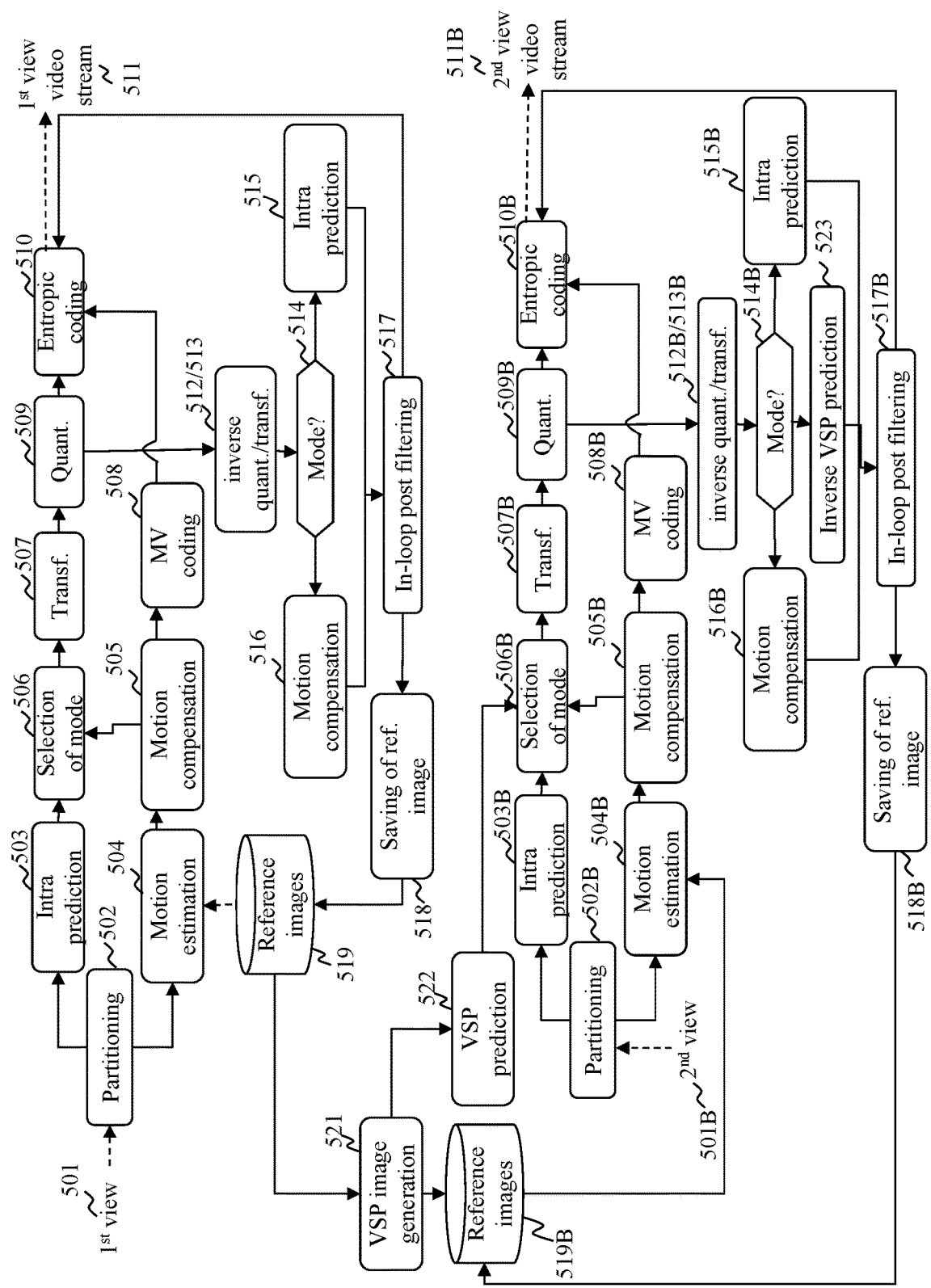
FIG. 9 depicts schematically an example of a method for encoding an encoded video stream representative of a multi-view content.

FIG. 9 depicts schematically an example of a method for encoding an encoded video stream representative of a MVD content.

The method of FIG. 9 is a method allowing encoding a first view 501 and a second view 501B. In this example, as in FIG. 24, the first view comprises a base layer (layer "0") comprising texture data and a layer "1" comprising depth data. The second view comprises a layer "2" comprising texture data and a layer "3" comprising depth data. For simplicity of representation, the encoding of only two views is represented, but more views can be encoded by the method of FIG. 9. For example, "16" view generated by the camera array 10 can be encoded by the method of encoding of FIG. 9.

In an embodiment (9a), the first view 501 is considered as a root view from which all other views are directly or indirectly predicted. The first view 501 is encoded without any inter-view or inter-layer prediction. In an embodiment, the layer "0" and the layer "1" are encoded separately, either in parallel or sequentially. In an embodiment layer "0" and layer "1" are encoded using the same steps 502, 503, 504, 505, 506, 507, 508, 509, 510, 512, 513, 514, 515, 516, 517, 518 and 519 described in relation to FIG. 7. In other words, the texture and the depth data of the first view 501 are encoded using the method of FIG. 7 (which correspond to the arrows TIIP in FIG. 24).

In an embodiment (9b), layer "0" is encoded using the method of FIG. 7 but said method is slightly modified for layer "1" to incorporate modes defined in 3D HEVC to predict a depth layer of a view from a texture layer of said view (which correspond to the arrow ICP in FIG. 24).

In an embodiment (9c), the texture layer (layer "2") of the second view 501B is encoded by a process comprising steps 502B, 503B, 504B, 505B, 507B, 508B, 509B, 510B, 512B, 513B, 515B, 516B, 517B, 518B and 519B respectively identical to steps 502, 503, 504, 505B, 507, 508, 509, 510, 512, 513, 514, 515, 516, 517, 518 and 519.

A new prediction image is generated by the processing module 20 in a step 521 and introduced in the DPB 519B. This new prediction image is used by the processing module 20 in a step 522 to determine a predictor, called VSP predictor, for a current block of a current image of the texture layer of the second view 501B. The prediction by a VSP predictor correspond to the new VSP mode, also called simply VSP mode in the following.

The VSP mode is very similar to a traditional Inter mode. Indeed, when introduced in the DPB 519B, the new prediction image generated during step 521 is treated as a usual reference image for temporal prediction (even if the prediction image generated during step 521 is co-located temporally with the current image of the texture layer of the second view 501B). The new VSP mode can be considered therefore as an Inter mode using a particular reference image generated by inter-view prediction. The step 522 comprises a motion estimation step and a motion compensation step. A block encoded using the VSP mode is encoded in the form of a motion information and a residual, the motion information comprising an identifier of the prediction image generated during step 521.

During a step 506B, the processing module 20 executes a step differing only from the step 506 in that the VSP predictor generated during step 522 is considered in addition the usual Intra and Inter predictors. Similarly, the processing module 20 executes a step 514B differing only from the step 514 in that the new VSP mode belongs to the set of prediction modes that can be potentially applied to the current block. If the new VSP mode has been selected for the current block during step 506B, the processing module 20 reconstructs the corresponding VSP predictor during a step 523.

In an embodiment (9d), the depth layer (layer "3") of the second view 501B is encoded using the same steps 502B, 503B, 504B, 505B, 506B, 507B, 508B, 509B, 510B, 512B, 513B, 514B, 515B, 516B, 517B, 518B, 519B, 521, 522 and 523. The new VSP mode is therefore applied to the depth layer (layer "3") of the second view 501B. More generally, the VSP mode can be applied to a depth layer of a view predicted from another view.

In an embodiment (9e), the encoding of layer "3" incorporates modes defined in 3D HEVC to predict a depth layer of a view from a texture layer of said view (which correspond to the arrow ICP in FIG. 24).

In the example of FIG. 9, the second view 501B is encoded from the first view 501 in which at least the texture layer "0" is encoded without any inter-view prediction. When more than two views are encoded by the method of FIG. 9, any third view can be encoded either from a view in which at least the texture layer is encoded without any inter-view prediction (for example from the first view 501) or from a view in which the texture layer is encoded with inter-view prediction (for example from the second view 501B).

As can be seen, the encoding method of FIG. 9 comprises two encoding layers, one for each view. Of course, if more than two views were encoded, the encoding method of FIG. 9 shall comprise as much encoding layers as the number of views. In the example of FIG. 9, each encoding layer has its own DPB. In other words, each view is associated to its own DPB.

As will be described in the following, images in a DPB are indexed by a plurality of reference indexes:
- ref_idx: index of a reference image to use in a DPB;
- ref_idx_l0: index of a reference image to use in a list l0 of reference images stored in a DPB. To decode a view i at a frame T, the list referred by ref_idx_l0 includes view i of different frames;
- ref_idx_l1: index of a reference image to use in a list l1 of reference images stored in a DPB. To decode a view i at a frame T, the list referred by ref_idx_l1 includes view i of different frames;
- ref_idx2: index of a reference image to use among reference images corresponding temporally to a current image. The index ref_idx2 refers only images generated by forward projection. To decode a view i at frame T, the list referred by ref_idx2 includes reference images corresponding to frame T.

Figure 10:
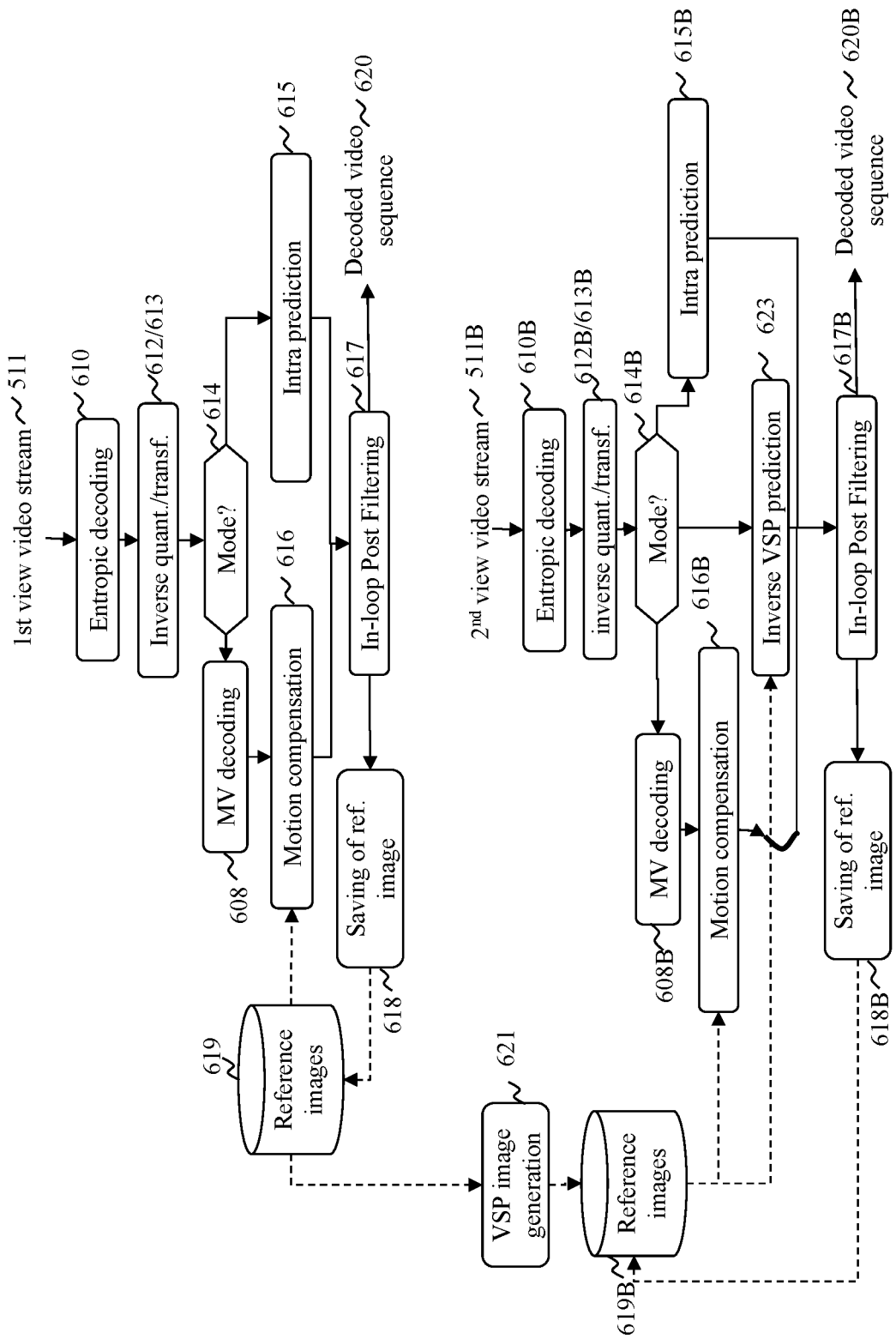
FIG. 10 depicts schematically an example of a method for decoding an encoded video stream representative of a multi-view content.
Figure 11:
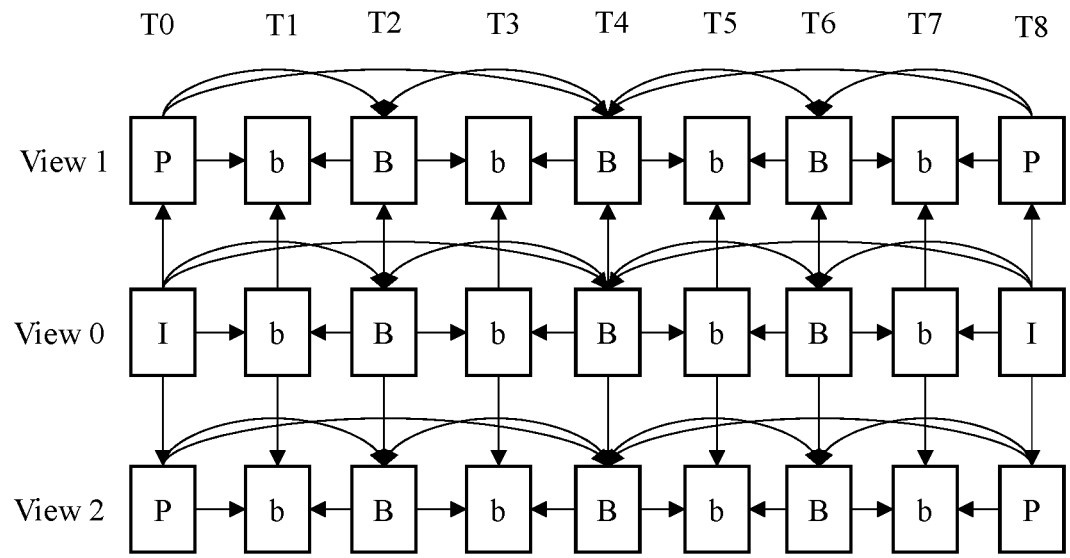
FIG. 11 represents schematically an example of inter-views dependencies of a MV content.

FIG. 10 depicts schematically an example of a method for decoding an encoded video stream representative of a multi-view content.

In an embodiment (10a) corresponding to the embodiment (9a), the layer "0" and the layer "1" are decoded separately, either in parallel or sequentially. In an embodiment layer "0" and layer "1" are decoded using the same steps 608, 610, 612, 613, 614, 615, 616, 617, 618, 619 described in relation to FIG. 8. In other words, the texture and the depth data of the first view 501 are decoded using the method of FIG. 8 (which correspond to the arrows TIIP in FIG. 24).

In an embodiment (10b) corresponding to embodiment (9b), layer "0" is decoded using the method of FIG. 8 but said method is slightly modified for layer "1" to incorporate modes defined in 3D HEVC (which correspond to the arrow ICP in FIG. 24).

In an embodiment (10c) corresponding to embodiment (9c), the texture layer (layer "2") of the second view 501B is decoded by a process comprising steps 608B, 610B, 612B, 613B, 615B, 616B, 617B, 618B, 619B respectively identical to steps 608, 610, 612, 613, 615, 616, 617, 618, 619. In a step 621, the processing module 20 generates a new prediction image identical to the image generated during step 521 and introduce this image in the DPB 619B. The processing module 20 executes a step 614B differing only from the step 614 in that the new VSP mode belongs to the set of prediction modes that can be potentially applied to the current block. If the new VSP mode has been selected for the current block during step 506B, the processing module 20 reconstructs the corresponding VSP predictor during a step 623.

In an embodiment (10d) corresponding to embodiment (9d), the depth layer (layer "3") of the second view 501B is decoded using the same steps 608B, 610B, 612B, 613B, 614B, 615B, 616B, 617B, 618B, 619B, 621 and 623.

As can be seen, the decoding method of FIG. 10 comprises two encoding layers, one for each view. Of course, if more than two views were decoded, the decoding method of FIG. 9 would comprise as much decoding layers as the number of views. In the example of FIG. 9, each decoding layer has its own DPB. In other words, each view is associated to its own DPB.

Figure 2:
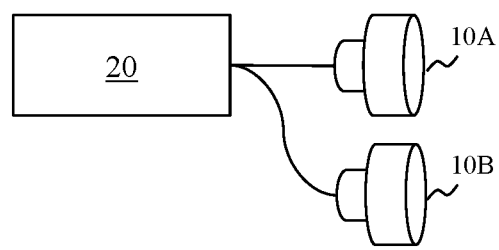
FIG. 2 represents schematically a processing module adapted for encoding a MVD content provided by a camera array.

FIG. 2 represents schematically a processing module adapted for encoding a MVD content provided by a camera array.

In FIG. 2, a simplified representation of the camera array 10 comprising only two cameras 10A and 10B is represented. Each camera of the camera array 10 communicates with a processing module 20 using a communication link that could be wired or wireless. In FIG. 2 the processing module 20 encodes in an encoded video stream the multi-view content generated by the camera army 10 using a new VSP mode described below.

Figure 3:
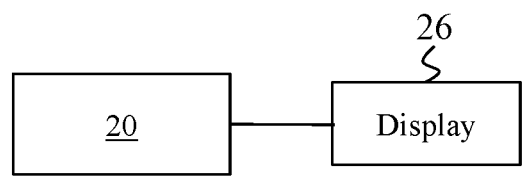
FIG. 3 represents schematically a processing module adapted for decoding an encoded video stream representative of a MVD content.

FIG. 3 represents schematically a processing module adapted for decoding an encoded video stream representative of a MVD content.

In FIG. 3, the processing module 20 decodes an encoded video stream. The processing module 20 is connected by a communication link that can be wired or wireless to a display device 26 that can display images resulting from the decoding. The display device is for example a virtual reality headset, a 3D TV or a computer display.

Figure 4:
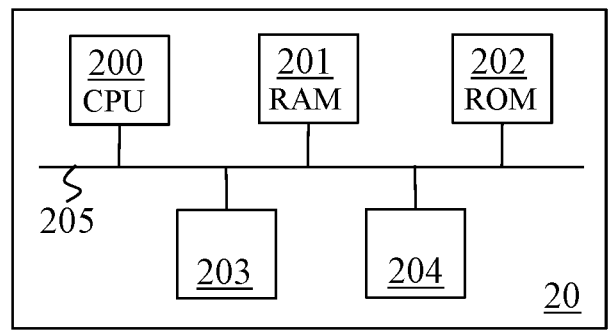
FIG. 4 illustrates schematically an example of hardware architecture of a processing module able to implement an encoding module or a decoding module in which various aspects and embodiments are implemented.

FIG. 4 illustrates schematically an example of hardware architecture of the processing module 20 able to implement an encoding module or a decoding module capable of implementing the different embodiments described in the following. The processing module 20 comprises, connected by a communication bus 205; a processor or CPU (central processing unit) 200 encompassing one or more microprocessors, general purpose computers, special purpose computers, and processors based on a multi-core architecture, as non-limiting examples: a random access memory (RAM) 201; a read only memory (ROM) 202; a storage unit 203, which can include non-volatile memory and/or volatile memory, including, but not limited to, Electrically Erasable Programmable Read-Only Memory (EEPROM), Read-Only Memory (ROM), Programmable Read-Only Memory (PROM), Random Access Memory (PAM), Dynamic Random Access Memory (DRAM), Static Random Access Memory (SRAM), flash, magnetic disk drive, and/or optical disk drive, or a storage medium reader, such as a SD (secure digital) card reader and/or a hard disc drive (HDD) and/or a network accessible storage device; at least one communication interface 204 for exchanging data with other modules, device or equipment. The communication interface 204 can include, but is not limited to, a transceiver configured to transmit and to receive data over communication channel. The communication interface 204 can include, but is not limited to, a modem or network card.

If the processing module 20 implements a decoding module, the communication interface 204 enables for instance the processing module 20 to receive encoded video streams and to provide decoded video streams.

If the processing module implements an encoding module, the communication interface 204 enables for instance the processing module 20 to receive original image data to encode and to provide an encoded video stream.

The processor 200 is capable of executing instructions loaded into the RAM 201 from the ROM 202, from an external memory (not shown), from a storage medium, or from a communication network. When the processing module 20 is powered up, the processor 200 is capable of reading instructions from the RAM 201 and executing them. These instructions form a computer program causing, for example, the implementation by the processor 200 of an encoding method as described in relation with FIG. 9 or a decoding method described in relation to FIG. 10, the decoding and encoding methods comprising various aspects and embodiments described below in this document.

All or some of the algorithms and steps of said encoding or decoding methods may be implemented in software form by the execution of a set of instructions by a programmable machine such as a DSP (digital signal processor) or a microcontroller, or be implemented in hardware form by a machine or a dedicated component such as a FPGA (field-programmable gate array) or an ASIC (application-specific integrated circuit).

Figure 5:
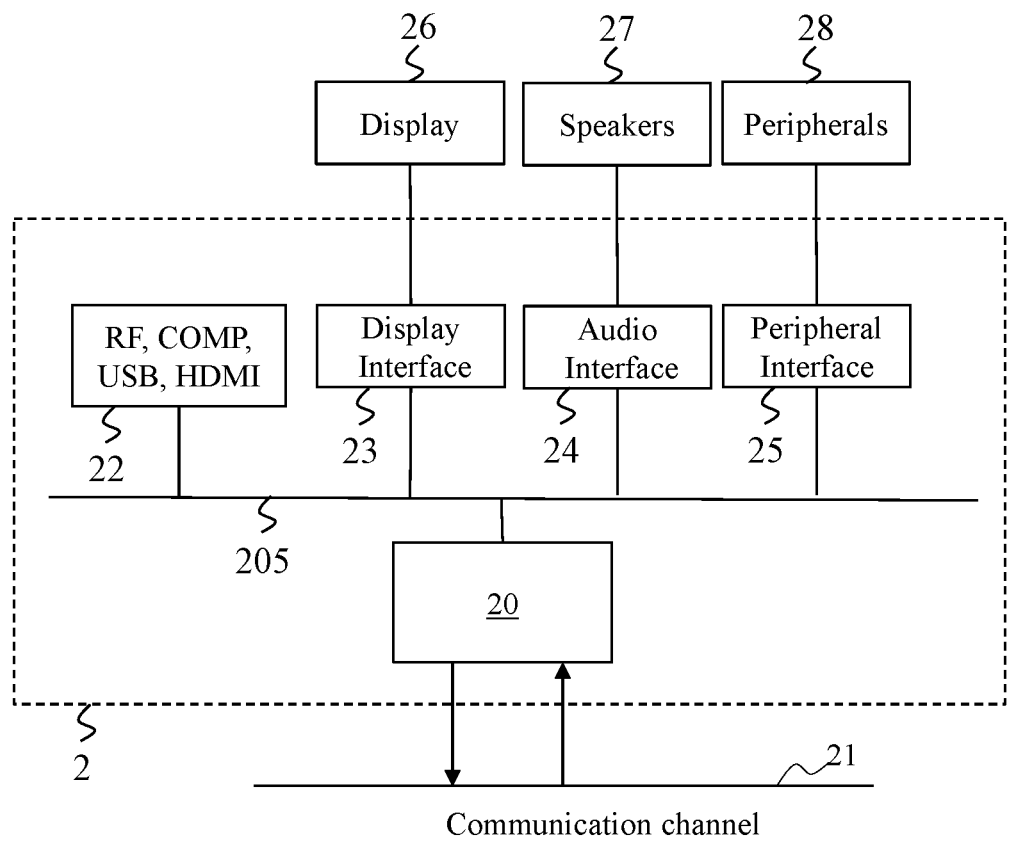
FIG. 5 illustrates a block diagram of an example of a system in which various aspects and embodiments are implemented.

FIG. 5 illustrates a block diagram of an example of a system 2 in which various aspects and embodiments are implemented. System 2 can be embodied as a device including the various components described below and is configured to perform one or more of the aspects and embodiments described in this document. Examples of such devices include, but are not limited to, various electronic devices such as personal computers, laptop computers, smartphones, tablet computers, digital multimedia set top boxes, digital television receivers, personal video recording systems, connected home appliances, virtual reality headsets and servers. Elements of system 2, singly or in combination, can be embodied in a single integrated circuit (IC), multiple ICs, and/or discrete components. For example, in at least one embodiment, the system 2 comprises one processing module 20 that implement a decoding module or an encoding module. But, in another embodiment, the system 2 can comprise one processing module 20 implementing a decoding module and one processing module 20 implementing an encoding module or one processing module 20 implementing a decoding module and an encoding module. In various embodiments, the system 2 is communicatively coupled to one or more other systems, or other electronic devices, via, for example, a communications bus or through dedicated input and/or output ports. In various embodiments, the system 2 is configured to implement one or more of the aspects and embodiments described in this document.

In an embodiment, the system 2 comprises at least one processing module 20 capable of implementing one of an encoding module or a decoding module or both.

The input to the processing module 20 can be provided through various input modules as indicated in block 22. Such input modules include, but are not limited to, (i) a radio frequency (RF) module that receives an RF signal transmitted, for example, over the air by a broadcaster, (ii) a component (COMP)input module (or a set of COMP input modules), (iii) a Universal Serial Bus (USB) input module, and/or (iv) a High Definition Multimedia Interface (HDMI) input module. Other examples, not shown in FIG. 5, include composite video.

In various embodiments, the input modules of block 22 have associated respective input processing elements as known in the art. For example, the RF module can be associated with elements suitable for (i) selecting a desired frequency (also referred to as selecting a signal, or band-limiting a signal to a band of frequencies), (ii) down-converting the selected signal, (iii) band-limiting again to a narrower band of frequencies to select (for example) a signal frequency band which can be referred to as a channel in certain embodiments, (iv) demodulating the down-converted and band-limited signal, (v) performing error correction, and (vi) demultiplexing to select the desired stream of data packets. The RF module of various embodiments includes one or more elements to perform these functions, for example, frequency selectors, signal selectors, band-limiters, channel selectors, filters, downconverters, demodulators, error correctors, and demultiplexers. The RF portion can include a tuner that performs various of these functions, including, for example, down-converting the received signal to a lower frequency (for example, an intermediate frequency or a near-baseband frequency) or to baseband. In one set-top box embodiment, the RF module and its associated input processing element receives an RF signal transmitted over a wired (for example, cable) medium, and performs frequency selection by filtering, down-converting, and filtering again to a desired frequency band. Various embodiments rearrange the order of the above-described (and other) elements, remove some of these elements, and/or add other elements performing similar or different functions. Adding elements can include inserting elements in between existing elements, such as, for example, inserting amplifiers and an analog-to-digital converter. In various embodiments, the RF module includes an antenna.

Additionally, the USB and/or HDMI modules can include respective interface processors for connecting system 2 to other electronic devices across USB and/or HDMI connections. It is to be understood that various aspects of input processing, for example, Reed-Solomon error correction, can be implemented, for example, within a separate input processing IC or within the processing module 20 as necessary. Similarly, aspects of USB or HDMI interface processing can be implemented within separate interface ICs or within the processing module 20 as necessary. The demodulated, error corrected, and demultiplexed stream is provided to the processing module 20.

Various elements of system 2 can be provided within an integrated housing, within the integrated housing, the various elements can be interconnected and transmit data therebetween using suitable connection arrangement, for example, an internal bus as known in the art, including the Inter-IC (I2C) bus, wiring, and printed circuit boards. For example, in the system 2, the processing module 20 is interconnected to other elements of said system 2 by the bus 205.

The communication interface 204 of the processing module 20 allows the system 2 to communicate on a communication channel 21. The communication channel 21 can be implemented, for example, within a wired and/or a wireless medium.

Data is streamed, or otherwise provided, to the system 2, in various embodiments, using a wireless network such as a Wi-Fi network, for example IEEE 802.11 (IEEE refers to the Institute of Electrical and Electronics Engineers). The Wi-Fi signal of these embodiments is received over the communication channel 21 and the communications interface 204 which are adapted for Wi-Fi communications. The communications channel 21 of these embodiments is typically connected to an access point or router that provides access to external networks including the Internet for allowing streaming applications and other over-the-top communications. Other embodiments provide streamed data to the system 2 using a set-top box that delivers the data over the HDMI connection of the input block 22. Still other embodiments provide streamed data to the system 2 using the RF connection of the input block 22. As indicated above, various embodiments provide data in a non-streaming manner. Additionally, various embodiments use wireless networks other than Wi-Fi, for example a cellular network or a Bluetooth network. Data provided to the system 2 comprises for example a MVD signal provided by the array of cameras 10.

The system 2 can provide an output signal to various output devices, including a display 26 via a display interface 23, speakers 27 via an audio interface 24, and other peripheral devices 28 via an interface 25. The display 26 of various embodiments includes one or more of, for example, a touchscreen display, an organic light-emitting diode (OLED) display, a curved display and/or a foldable display. The display 26 can be for a television, a tablet, a laptop, a cell phone (mobile phone), a smart phone, a virtual reality headset or other devices. The display 26 can also be integrated with other components (for example, as in a smart phone), or separate (for example, an external monitor for a laptop). The other peripheral devices 28 include, in various examples of embodiments, one or more of a stand-alone digital video disc (or digital versatile disc) (DVR, for both terms), a disk player, a stereo system, and/or a lighting system. Various embodiments use one or more peripheral devices 28 that provide a function based on the output of the system 2. For example, a disk player performs the function of playing the output of the system 2.

In various embodiments, control signals are communicated between the system 2 and the display 26, speakers 27, or other peripheral devices 28 using signaling such as AV.Link, Consumer Electronics Control (CEC), or other communications protocols that enable device-to-device control with or without user intervention. The output devices can be communicatively coupled to system 2 via dedicated connections through respective interfaces 23, 24, and 25. Alternatively, the output devices can be connected to system 2 using the communications channel 21 via the communications interface 204. The display 26 and speakers 27 can be integrated in a single unit with the other components of system 2 in an electronic device such as, for example, a television. In various embodiments, the display interface 23 includes a display driver, such as, for example, a timing controller (T Con) chip.

The display 26 and speaker 27 can alternatively be separate from one or more of the other components, for example, if the RF module of input 22 is part of a separate set-top box. In various embodiments in which the display 26 and speakers 27 are external components, the output signal can be provided via dedicated output connections, including, for example, HDMI ports, USB ports, or COMP outputs.

Various implementations involve decoding. "Decoding", as used in this application, can encompass all or part of the processes performed, for example, on a received encoded video stream in order to produce a final output suitable for display. In various embodiments, such processes include one or more of the processes typically performed by a decoder, for example, entropy decoding, inverse quantization, inverse transformation, and prediction. In various embodiments, such processes also, or alternatively, include processes performed by a decoder of various implementations described in this application, for example, for decoding a new VSP mode.

Whether the phrase "decoding process" is intended to refer specifically to a subset of operations or generally to the broader decoding process will be clear based on the context of the specific descriptions and is believed to be well understood by those skilled in the art.

Various implementations involve encoding. In an analogous way to the above discussion about "decoding", "encoding" as used in this application can encompass all or part of the processes performed, for example, on an input video sequence in order to produce an encoded video stream. In various embodiments, such processes include one or more of the processes typically performed by an encoder, for example, partitioning, prediction, transformation, quantization, and entropy encoding. In various embodiments, such processes also, or alternatively, include processes performed by an encoder of various implementations described in this application, for example, for encoding according to the new VSP mode.

Whether the phrase "encoding process" is intended to refer specifically to a subset of operations or generally to the broader encoding process will be clear based on the context of the specific descriptions and is believed to be well understood by those skilled in the art.

Note that the syntax elements as used herein, such as for example the flag VSP and the index ref_idx2 are descriptive terms. As such, they do not preclude the use of other syntax element names.

When a figure is presented as a flow diagram, it should be understood that it also provides a block diagram of a corresponding apparatus. Similarly, when a figure is presented as a block diagram, it should be understood that it also provides a flow diagram of a corresponding method/process.

Various embodiments refer to rate distortion optimization. In particular, during the encoding process, the balance or trade-off between a rate and a distortion is usually considered, often given constraints of computational complexity. The rate distortion optimization is usually formulated as minimizing a rate distortion function, which is a weighted sum of the rate and of the distortion. There are different approaches to solve the rate distortion optimization problem. For example, the approaches may be based on an extensive testing of all encoding options, including all considered modes or coding parameters values, with a complete evaluation of their coding cost and related distortion of a reconstructed signal after coding and decoding. Faster approaches may also be used, to save encoding complexity, in particular with computation of an approximated distortion based on a prediction or a prediction residual signal, not the reconstructed one. Mix of these two approaches can also be used, such as by using an approximated distortion for only some of the possible encoding options, and a complete distortion for other encoding options. Other approaches only evaluate a subset of the possible encoding options. More generally, many approaches employ any of a variety of techniques to perform the optimization, but the optimization is not necessarily a complete evaluation of both the coding cost and related distortion.

The implementations and aspects described herein can be implemented in, for example, a method or a process, an apparatus, a software program, a data stream, or a signal. Even if only discussed in the context of a single form of implementation (for example, discussed only as a method), the implementation of features discussed can also be implemented in other forms (for example, an apparatus or program). An apparatus can be implemented in, for example, appropriate hardware, software, and firmware. The methods can be implemented, for example, in a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Reference to "one embodiment" or "an embodiment" or "one implementation" or "an implementation", as well as other variations thereof, means that a particular feature, structure, characteristic, and so forth described in connection with the embodiment is included in at least one embodiment. Thus, the appearances of the phrase "in one embodiment" or "in an embodiment" or "in one implementation" or "in an implementation", as well any other variations, appearing in various places throughout this application are not necessarily all referring to the same embodiment.

Additionally, this application may refer to "determining" various pieces of information. Determining the information can include one or more of, for example, estimating the information, calculating the information, predicting the information, or retrieving the information from memory.

Further, this application may refer to "accessing" various pieces of information. Accessing the information can include one or more of, for example, receiving the information, retrieving the information (for example, from memory), storing the information, moving the information, copying the information, calculating the information, determining the information, predicting the information, or estimating the information.

Additionally, this application may refer to "receiving" various pieces of information. Receiving is, as with "accessing", intended to be a broad term. Receiving the information can include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

It is to be appreciated that the use of any of the following "/", "and/or", and "at least one of", "one or more of" for example, in the cases of "A/B", "A and/or B" and "at least one of A and B", "one or more of A and B" is intended to encompass the selection of the first listed option (A) only, or the selection of the second listed option (B) only, or the selection of both options (A and B). As a further example, in the cases of "A, B, and/or C" and "at least one of A, B, and C", "one or more of A, B and C" such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C)only, or the selection of all three options (A and B and C). This may be extended, as is clear to one of ordinary skill in this and related arts, for as many items as are listed.

Also, as used herein, the word "signal" refers to, among other things, indicating something to a corresponding decoder. For example, in certain embodiments the encoder signals an information representative of the new VSP mode. In this way, in an embodiment the same parameter is used at both the encoder side and the decoder side. Thus, for example, an encoder can transmit (explicit signaling) a particular parameter to the decoder so that the decoder can use the same particular parameter. Conversely, if the decoder already has the particular parameter as well as others, then signaling can be used without transmitting (implicit signaling) to simply allow the decoder to know and select the particular parameter. By avoiding transmission of any actual functions, a bit savings is realized in various embodiments. It is to be appreciated that signaling can be accomplished in a variety of ways. For example, one or more syntax elements, flags, and so forth are used to signal information to a corresponding decoder in various embodiments. While the preceding relates to the verb form of the word "signal", the word "signal" can also be used herein as a noun.

As will be evident to one of ordinary skill in the art, implementations can produce a variety of signals formatted to carry information that can be, for example, stored or transmitted. The information can include, for example, instructions for performing a method, or data produced by one of the described implementations. For example, a signal can be formatted to carry the encoded video stream of a described embodiment. Such a signal can be formatted, for example, as an electromagnetic wave (for example, using a radio frequency portion of spectrum) or as a baseband signal. The formatting can include, for example, encoding an encoded video stream and modulating a carrier with the encoded video stream. The information that the signal carries can be, for example, analog or digital information. The signal can be transmitted over a variety of different wired or wireless links, as is known. The signal can be stored on a processor-readable medium.

Figure 13A:
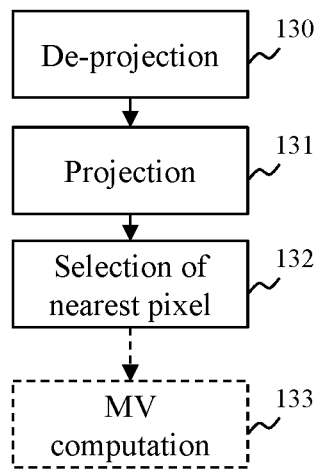
FIG. 13A depicts schematically an example of a forward projection method used in a prediction image generation process.
Figure 13B:
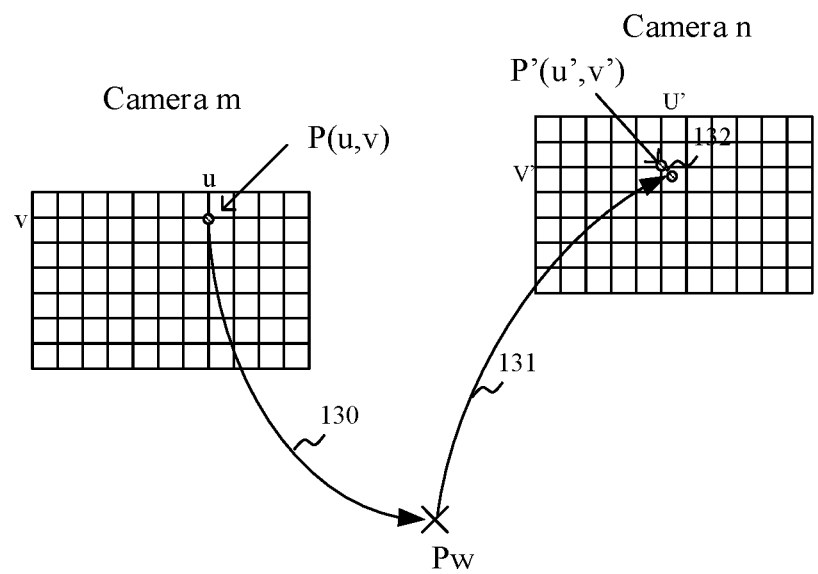
FIG. 13B depicts schematically is another representation of the example of a forward projection method depicted in FIG. 13A.

FIG. 13A depicts schematically an example of a forward projection method used in a prediction image generation process. FIG. 13B is another representation of the forward projection method of FIG. 13A. The forward projection process of FIGS. 13A and 13B is used during steps 521 and 621. The forward projection process is applied to pixels of a first view acquired by a camera m to project these pixels from a camera coordinate system of the first view to a camera coordinates system of a second view acquired by a camera n. Each pixel is considered to comprise texture information and depth information.

In a step 130, the processing module 20 applies a de-projection to a current pixel P(u,v) of the first view from the camera coordinates system of the first view to a reference coordinate system (i.e. a world coordinate system) to obtain a de-projected pixel $P_w$ as represented in FIG. 13B. The de-projection uses a pose matrix $P_m$ of camera m, the inverse intrinsic matrix $K_m^{-1}$ of camera m and a depth value associated to the current pixel. The pose matrix $K_m^{-1}$ and the intrinsic matrix $K_m$ are defined using camera parameters obtained by the processing module 20 for example from the SEI message described in table TAB1.

In a step 131, the processing module 20 project the de-projected pixel $P_w$ into the coordinate system of the second view using the intrinsic matrix $K_n$ and the extrinsic matrix $Q_n$ of camera n. Again, the intrinsic matrix $K_n$ and the extrinsic matrix $Q_n$ are defined using camera parameters obtained by the processing module 20 for example from the SEI message described in table TAB1. When this projection is not falling into the camera n area, this projection is rejected. When it is falling into the camera n area, this projection is most probably not falling onto a real pixel but in between "4" pixels.

In a step 132, the processing module 20 selects the pixel P'(u',v') of the grid of pixels of camera n nearest to the projection of the de-projected pixel $P_w$. The nearest pixel is for example, the pixel of the grid of pixels of camera n minimizing a distance to the projection of the de-projected pixel $P_w$. The distance is for example calculated as the square root of the sum of square difference (or as a sum of absolute difference) between coordinates of a pixel of the grid and the projection of the de-projected pixel $P_w$.

The pixel P'(u',v') obtained by the forward projection process of FIGS. 13A and 13B keeps the texture values and the depth value of the projected pixel P(u,v). The set of pixels P'(u',v') form a projected image.

FIG. 14A depicts a first embodiment of a prediction image generation process.

In the embodiment of FIG. 14A, also called embodiment (14A), one view has been signaled to be used as a possible predictor to reconstruct a current view.

The process described in FIG. 14A comprises steps 140 to 143 executed during step 521 of the encoding method of FIG. 9 and during step 621 of the decoding method of FIG. 10 to generate a reference image from the first view 501 to encode a current image of the second view 501B.

In a step 140, the processing module 20 obtains camera parameters (i.e. view parameters) for a reference view (for example the first view 501) and a current view (for example, the second view 501B). When the process of FIG. 14A is performed during step 521, the processing module 20 obtains these parameters directly from the cameras of the camera array 10 or from a user. When the process of FIG. 14A is performed during step 621, the processing module 20 obtains these parameters from a SEI message (for example the SEI message described in table TAB1) or from a user.

In a step 141, the processing module 20 generates a prediction image G(k) applying the forward projection method described in FIGS. 13A and 13B between the reference view (for example, the first view 501) and the current view (for example the second view 501B). The prediction image G(k) is intended to be introduced in the DPB of the current view (for example the DPB 519B (respectively 619B)) to become a $k^{th}$ prediction image for the current image of the current view.

Each pixel of the prediction image G(k) resulting from a successful prediction keeps the texture value and the depth value of the corresponding projected pixel of the reference view. After the forward projection, isolated missing pixels may remain (due to unsuccessful projection not falling into the second view area).

In a step 142, the processing module 20 fills the isolated missing pixels. In an embodiment, isolated missing pixels are filled with an average of neighboring pixel values. In another embodiment, isolated missing pixels are filled with a median value of neighboring pixel values. In another embodiment, isolated missing pixels are filled with a default value (typically 128 for values coded on 8 bits).

In a step 143, the processing module 20 stores the prediction image G(k) in the DPB of the current view.

In a step 144, the processing module 20 reconstructs the current image of the current view using the reference image comprised in the DPB of the current view, the DPB comprising the prediction image G(k).

When the process of FIG. 14A is applied in the encoding method of FIG. 9, the generation comprises steps 502B, 503B, 504B, 505B, 506B, 507B, 508B, 509B, 510B, 512B, 513B, 514B, 515B, 516B, 517B, 518B, 519B, 522 and 523.

When the process of FIG. 14A is applied in the decoding method of FIG. 10, the generation comprises steps 608B, 610B, 612B, 613B, 614B, 615B, 616B, 617B, 618B, 619B and 623.

FIG. 14B depicts a detail of a second embodiment of a prediction image generation process.

In the embodiment of FIG. 14B also called embodiment (14B), several views are available for predicting a current view. For example, if we go back to FIG. 9, at an instant T, an image of the first view (texture and depth) and an image of the second view have been encoded and reconstructed, and an image of a third view is ready to be encoded using prediction images generated from the reconstructed image of the first and second view. Similarly, if we go back to FIG. 10, at an instant T, an image of the first view (texture and depth) and an image of the second view have been reconstructed, and an image of a third view is ready to be decoded using prediction images generated from the reconstructed image of the first and second views.

In the embodiment (14B), a plurality of views are used to generate one aggregated prediction image to reconstruct a current view. More precisely, in embodiment (14B), a prediction image is generated for each view of the plurality of views and the aggregated prediction image is generated from the plurality of prediction images.

In step 140, the processing module 20 obtains camera parameters (i.e. view parameters) of each view of the plurality of views and of the current view.

Comparing to embodiment (14A), step 141 is replaced by steps 1411 to 1415.

In step 1411, the processing module 20 initializes a variable j to "0". The variable j is used to enumerate all views of the plurality of views.

In a step 1412, the processing module 20 generates a prediction image $G(k)_j$ applying the forward projection method described in FIGS. 13A and 13B between a view j and the current view. For example, the view j is the first view 501 or the second view 501B and the current view is a third view.

In a step 1413, the processing module 20 compares the value of the variable j to a number of views Nb_views in the plurality of views. If j<Nb_views, step 1413 is followed by a step 1414 in which j is incremented of one unit.

Step 1414 is followed by step 1412 during which a new prediction image $G(k)_j$ is generated.

If j=Nb_views, step 1413 is followed by a step 1415 during which prediction images $G(k)_j$ are aggregated to generate an aggregated prediction image G(k) intended to be stored in the DPB of the current view.

In an embodiment of the aggregation process, the prediction images $G(k)_j$ are aggregated by keeping the pixels value (texture and depth values) of the first prediction image $G(k)_j$ of the plurality of prediction images. The first prediction image if for example the prediction image $G(k)_{j=0}$.

In an embodiment of the aggregation process, the prediction images $G(k)_j$ are aggregated by keeping the pixels values (texture and depth values) of the prediction image $G(k)_j$ generated from the view j the closest to the current view. If several views are at the same distance from the current view (i.e. there are several closest views), a closest view in the several closest views is selected randomly. For example, in the camera array 10, let suppose that only a first view generated by camera 10A and a second view generated by camera 10C are available for predicting a current view generated by camera 10B. Then the first and the second views are the closest views to the current view and are at the same distance to the current view. One of the first and the second view is selected randomly to provide the pixels values to the aggregated prediction image G(k).

In an embodiment of the aggregation process, the prediction images $G(k)_j$ are aggregated by keeping the pixels values (texture and depth values) of the prediction image $G(k)_j$ having the best quality. For example, an information representative of the quality of a pixel is a value of a quantization parameter applied to a transformed block comprising said pixel. The quality of the pixels in a prediction image $G(k)_j$ depends of the quality of the pixels (i.e. of the quantization parameters) of the image on which the forward projection was applied to obtain the prediction image $G(k)_j$.

In an embodiment of the aggregation process, the prediction images $G(k)_j$ are aggregated by keeping the pixels values (texture and depth values) of the prediction image $G(k)_j$ having the nearest depth value (z-buffer algorithm).

In an embodiment of the aggregation process, the prediction images $G(k)_j$ are aggregated by keeping the pixels values (texture and depth values) of the prediction image $G(k)_j$ when neighboring pixels of the aggregated prediction image G(k) are already predicted from the prediction image $G(k)_j$.

In an embodiment of the aggregation process, the prediction images $G(k)_j$ are aggregated by computing an average, a weighted average, a median of the pixels values (texture and depth values) of the prediction image $G(k)_j$.

Step 1415 is followed by the step 142 during which the processing module 20 fills the isolated missing pixels in the aggregated prediction image G(k).

In step 143, the aggregated prediction image G(k) is stored in the DPB of the current view.

In step 144, the processing module 20 reconstructs the current image of the current view using the reference images comprised in the DPB of the current view, the DPB comprising the aggregated prediction image G(k).

Figure 15:
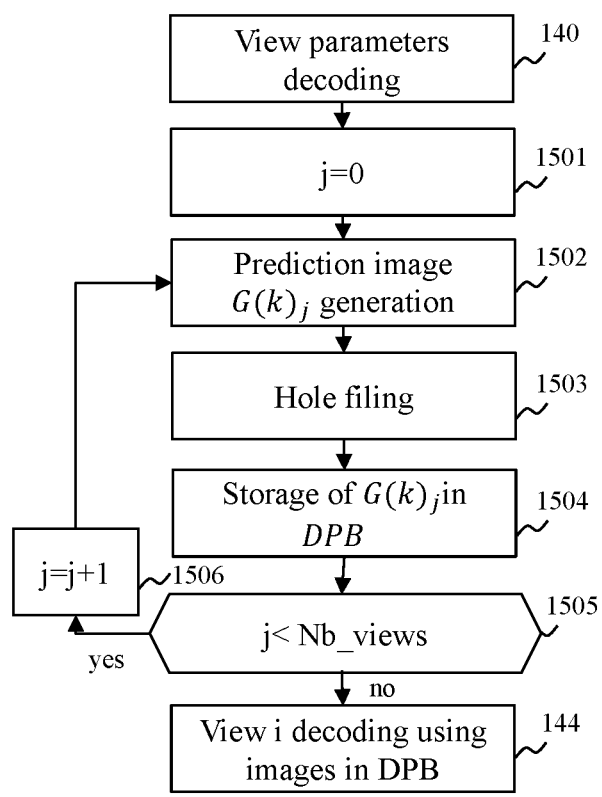
FIG. 15 depicts a third embodiment of a prediction image generation process.

FIG. 15 depicts a third embodiment of a prediction image generation process.

In the embodiment of FIG. 15 also called embodiment (15), similarly to the embodiment (14B), several views are available for predicting a current view.

In embodiment (15), a prediction image is generated for each view of the plurality of views. However, instead of generating an aggregated prediction image and inserting said aggregated prediction image in the DPB of the current view as in embodiment 14B, in embodiment (15) each generated prediction image is inserted in the DPB.

In step 140, the processing module 20 obtains camera parameters (i.e. view parameters) of each view of the plurality of views and of the current view.

In step 1501, the processing module 20 initialize a variable j to "0". The variable j is used to enumerate all views of the plurality of views.

In a step 1502, the processing module 20 generates a prediction image $G(k)_j$ applying the forward projection method described in FIGS. 13A and 13B between a view j and the current view.

In a step 1503, the processing module 20 fills the isolated missing pixels in the aggregated prediction image G(k).

In a step 1504, the processing module 20 stores the prediction image $G(k)_j$ in the DPB of the current view.

In a step 1505, the processing module 20 compares the value of the variable j to a number of views Nb_views in the plurality of views. If j<Nb_views, step 1505 is followed by a step 1506 in which j is incremented of one unit.

Step 1506 is followed by step 1502 during which a new prediction image $G(k)_j$ is generated.

If j=Nb_views, step 1505 is followed by step 144. In step 144, the processing module 20 reconstructs the current image of the current view using the reference images comprised in the DPB of the current view, the DPB comprising the plurality of prediction images $G(k)_j$.

In a variant of embodiment 15, in addition to the prediction images $G(k)_j$, an aggregated prediction image generated from the prediction images $G(k)_j$ and/or aggregated prediction images generated from subsets of prediction images $G(k)_j$ is/are inserted in the DPB of the current view.

In a variant of embodiment 15, in place of the prediction images $G(k)_j$, an aggregated prediction image generated from the prediction images $G(k)_j$ and aggregated prediction images generated from subsets of prediction images $G(k)_j$ is/are inserted in the DPB of the current view or only aggregated prediction images generated from subsets of prediction images G(k)$_j$ are inserted in the DPB of the current view.

Figure 16:
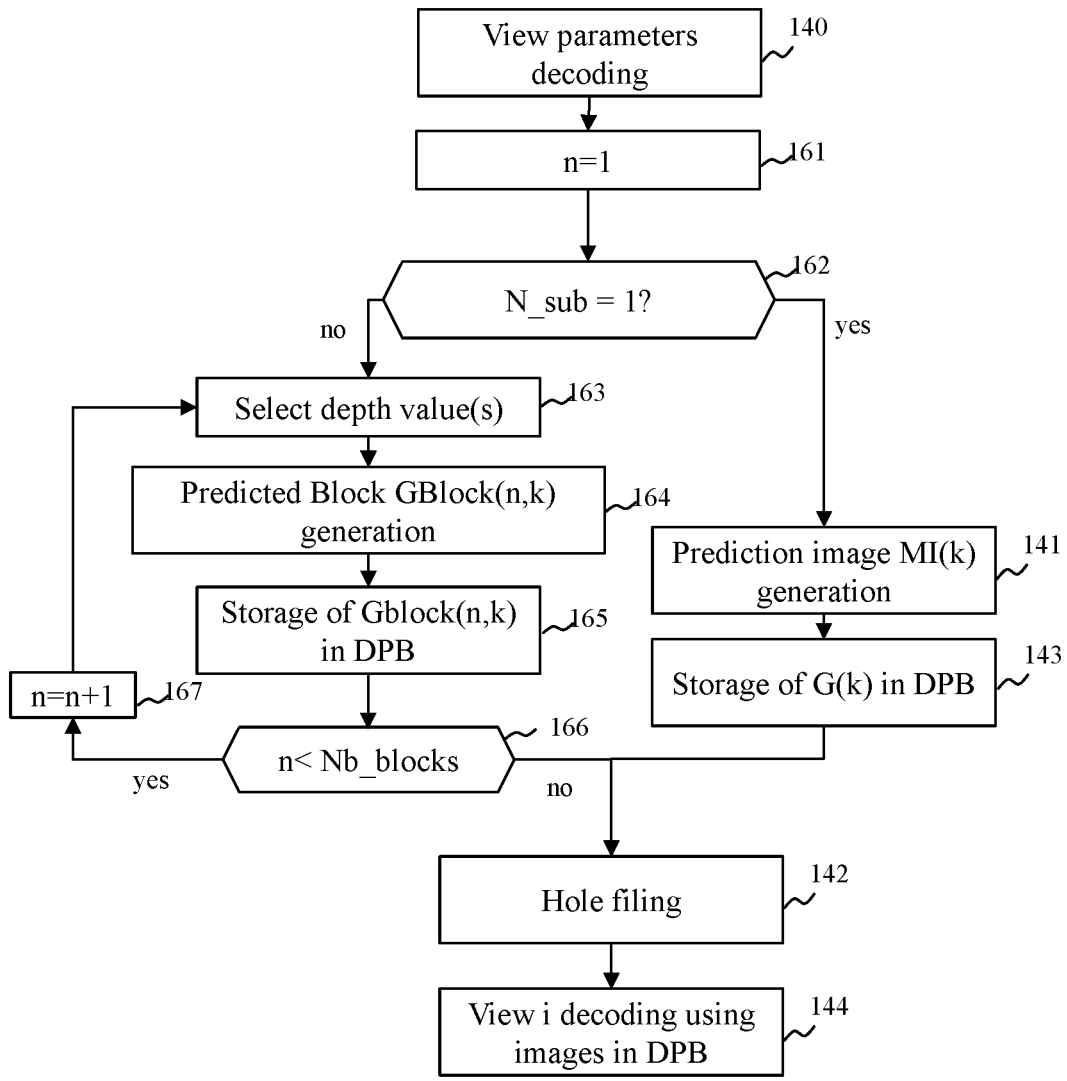
FIG. 16 depicts a fourth embodiment of a prediction image generation process.

FIG. 16 depicts a fourth embodiment of a prediction image generation process.

An objective of the embodiment of FIG. 16, also called embodiment (16), is to reduce a complexity of the generation of a prediction image. In the embodiment (16), each image of a reference view used to generate a prediction image for an image of a current view is divided in blocks. The depth layer of the image of the reference view is then subsampled in order to keep only one depth value per block. Consequently, all pixels of a block use the same depth value for the forward projection. A policy to select the depth value associated with a block is defined. It can include one of the following approaches:

- the depth value of one particular pixel of the block represents the block; for example, the top-left one or the one in the middle;
- an average or median depth value of the block (with average position) represents the block;
- the more frequent depth value (with associated position or central position) represents the block;

The embodiment (16) starts with the step 140 during which the processing module 20 obtains camera parameters (i.e. view parameters) of a reference view and of the current view.

In a step 161, the processing module 20 initializes a variable n to "1".

In a step 162, the processing module 20 checks a value of a variable N_sub determining if a subsampling is applied to the image of the reference view. If N_sub=1, no subsampling is applied to the depth layer of the reference view. In that case, step 162, is followed by step 141, during which the processing module 20 generates a prediction image G(k) applying the forward projection method described in FIGS. 13A and 13B between the reference view and the current view.

In step 143, prediction image G(k) is stored in the DPB of the current view.

Step 143 is followed by step 142 during which the processing module 20 fills the isolated missing pixels.

In step 144, the processing module 20 reconstructs the current image of the current view using the reference image comprised in the DPB of the current view, the DPB comprising the prediction image G(k).

If N_sub>1, a subsampling is applied to the depth layer of the reference view. In an embodiment, when N_sub>1, N_sub is a multiple of two. If the image of the reference view has a width w and a height h, said image is, for example, divided in $$NB\_blocks = \frac{w \times h}{N\_sub}$$

blocks of equal sizes.

Step 162 is followed by a step 163 during which the processing module 20 selects a depth value for a block number n of the image of the reference view using the policy defined for said selection.

In a step 164, the processing module 20 generates a prediction block Gblock(n,k) applying the forward projection method described in FIGS. 13A and 13B between the reference view and the current view for the block number n of the image of the reference view.

In a step 165, the processing module 20 stores the prediction block Gblock(n,k) in the DPB of the current view at a position co-located with the position of the block number n of the image of the reference view.

In a step 166, the processing module 20 compares the value of the variable n with the number of blocks in the image of the reference view NB_Blocks. If n<Nb_blocks, step 166 is followed by step 167 during which the variable n is incremented of one unit. Step 167 is followed by step 162 to apply a forward projection to a new block.

If n=Nb_blocks, step 166 is followed by step 142 and 144 already explained. Note that, at the end of the loop over the NB_Blocks of the image of the reference view, the combination of the blocks Gblock(n,k) forms a prediction image G(k).

In a variant of embodiment (16), similarly to the embodiments (14B) and (15), the embodiment (16) can be applied to images of a plurality of reference views to obtain a plurality of prediction images.

In an embodiment of this variant, the prediction images of the plurality are stored in the DPB of the current view.

In an embodiment of this variant, the prediction images of the plurality are aggregated to form an aggregated prediction image and the aggregated prediction image is stored in the DPB of the current view.

In an embodiment of this variant, at least one subset of the prediction images of the plurality are aggregated to form an aggregated prediction image and each aggregated prediction image is stored in the DPB of the current view.

In an embodiment of this variant, at least one subset of the prediction images of the plurality are aggregated to form an aggregated prediction image and each aggregated prediction image is stored in the DPB of the current view, in addition to the prediction images of the plurality and to an aggregated prediction image aggregating all prediction images of the plurality.

In a variant of embodiment (16), the image of the reference view is divided in blocks of unequal sizes. For example, said image is divided in large blocks (128, 128, 64×64, 32×32, 16×16 or 8×8) where the depth values are homogeneous (for example in areas where the differences between the smallest depth value and largest depth value does not exceed + or −10% of the smallest depth value) and in smaller blocks (4×4 or 2×2) where the depth values are heterogeneous (for example in areas where the differences between the smallest depth value and the largest depth value exceeds + or −10% of the smallest depth value).

In an embodiment, called embodiment bi-directional, at least one prediction image of the embodiment (14A), (14B), (15) and (16) is used to provide a reference block (i.e. a VSP predictor block) to a current block of a current image predicted using bi-prediction (i.e. bi-predicted inter-prediction). In that case, the current block is associated with two motion information, designating two reference blocks in two different images, the residual block of this block then being an average of two residual blocks, i.e. a first reference block being weighted by a weight $w_0=\frac{1}{2}$ and a second reference block being weighted by a weight $w_1=\frac{1}{2}$. A sample $S_{curr}$ of the current block is obtained as follows:

$$S_{curr} = \frac{w_0 \cdot S_0 + w_1 \cdot S_1}{w_0 + w_1}$$

where $S_0$ is a sample of the first reference block and $S_1$ of the second reference block.

In an embodiment, called embodiment WP, at least one prediction image of the embodiment (14A), (14B), (15) and (16) is used to provide a reference block (i.e. a VSP predictor block) to a current block of a current image predicted using weighted prediction (WP). In that case, the current block is associated with two motion information, designating two reference blocks in two different images, the residual block of this block then being a weighted average of two residual blocks, a first reference block being weighted by a weight $w_0$ and a second reference block being weighted by a weight $w_1$. Again, a sample $S_{curr}$ of the current block is obtained as follows:

$$S_{curr} = \frac{w_0 \cdot S_0 + w_1 \cdot S_1}{w_0 + w_1}$$

One can note that the embodiment WP can be generalized to all modes using weighting of samples for example a triangular mode.

As seen above, the forward prediction may generate a prediction image comprising isolated missing pixels. Until now, isolated missing pixels were filled using a hole filling process. However, the hole filling process provides only an approximation of the real pixel.

In a variant of the embodiment bi-directional and of the embodiment WP, called embodiment with modified weighting, the weighting process is modified to take into account a value representative of a confidence rate of a sample (i.e. of a pixel) of a prediction image. In this variant, a sample $S_{curr}$ of the current block is obtained as follows:

$$S_{curr} = \frac{w_0 \cdot Mask_0 \cdot S_0 + w_1 \cdot Mask_1 \cdot S_1}{w_0 \cdot Mask_0 + w_1 \cdot Mask_1}$$

where $Mask_0$ depends on the confidence rate in the sample $w_0$ and $Mask_1$ depends on the confidence rate in the sample $w_1$.

In a first variant of the embodiment with modified weighting, $Mask_0$ (respectively $Mask_1$) is equal to zero when the sample $S_0$ (respectively $S_1$) is obtained by hole filling and is equal to "1" otherwise. If $Mask_0=Mask_1=0$, the processing module 20 gives a default value to $S_{curr}$.

In a second variant of the embodiment with modified weighting, $Mask_0$ (respectively $Mask_1$) is set to a low positive value (for example "1") when the sample $S_0$ (respectively $S_1$) is obtained by hole filling and is set to a high positive value (for example "10000") otherwise. In other words, the value $Mask_0$ (respectively $Mask_1$) when the sample $S_0$ (respectively $S_1$) is obtained by hole filling is lower than the value of $Mask_0$ (respectively $Mask_1$) when the sample $S_0$ (respectively $S_1$) is obtained directly by forward projection.

In a third variant of the embodiment with modified weighting, the confidence rate of a sample depends of the similarity of said sample with samples in its neighborhood. For example, a sample $S_0$ (respectively $S_1$) that is similar to the samples in its neighborhood is associated to a value of $Mask_0$ (respectively $Mask_1$) higher than the value of $Mask_0$ (respectively $Mask_1$) associated to a sample $S_0$ (respectively $S_1$) different from the samples in its neighborhood. The difference between two samples is for example computed as a square root of the difference between the values of the two samples.

In a fourth variant of the embodiment with modified weighting, the confidence rate of a sample depends of the similarity of said sample with samples in its neighbourhood and of the process applied to obtain said sample (hole filling or direct forward projection).

In a fifth variant of the embodiment with modified weighting, the confidence rate of samples of a prediction image is computed at a block level(typically of size 4×4) instead of pixel level. The value $Mask_0$ (respectively $Mask_1$) associated to the samples of a block depends on an average confidence rate of the samples of said block.

In a sixth variant of the embodiment with modified weighting, the confidence rate of a sample of a prediction image depends on a consistency of its depth value with other depth maps. Let consider a forward projection of a sample position Pn with a depth Dn of a view n onto a view in is corresponding to a sample position Pm with a depth Dm. The depth Dn at the sample position Pn is considered as a consistent depth if the forward projection of the sample position Pm with the depth Dm onto view n is reaching the sample position Pn. Otherwise the depth Dn at the sample position Pn is not considered as consistent with view m. The same process is applied for the other views and then a score for the depth Dn at the sample position Pn can be established between not consistent up to fully consistent. The confidence rate of a sample is proportional to the consistency of its depth.

In some cases, a block predicted using a bi-directional inter prediction mode or a weighted prediction can use one reference block from a prediction image and one reference block from an image not obtained by forward prediction. In the third, fourth, fifth and sixth variant of the embodiment with modified weighting, samples of images not obtained by forward prediction are considered as samples with a highest possible confidence rate. For example, if the possible values of $Mask_0$ (respectively $Mask_1$) are:

"0" and "1", samples of images not obtained by forward prediction are associated with a value $Mask_0$ (respectively $Mask_1$) equal to "1";

"1" and "10000", samples of images not obtained by forward prediction are associated with a value $Mask_0$ (respectively $Mask_1$) equal to "10000";

between "0" and "1", samples of images not obtained by forward prediction are associated with a value $Mask_0$ (respectively $Mask_1$) equal to "1";

between "1" and "10000", samples of images not obtained by forward prediction are associated with a value $Mask_0$ (respectively $Mask_1$) equal to "10000".

In order to reduce a burden on decoder side and cap a maximum complexity of a compliant decoder which will use inter-view prediction, relationships between a current view and views used to generate prediction images is signalled in the encoded video stream corresponding to the encoded MVD data (for example the encoded video streams 511 and/or 511B). From this signalling, a decoder can advantageously pre-compute prediction images. The advantage of such approach is to allow a use of a legacy decoder with very few changes since only the reference picture buffer filling (i.e. the DPB filling) is modified.

In the following, a syntax element, called view_parameter, representing information allowing reconstructing the prediction images or the aggregated prediction images and adapted to the embodiments presented above is proposed. In an embodiment, said syntax element view_parameter is inserted in an encoded video stream at the level of a slice header. In another embodiment, the syntax element view_parameter is inserted in a sequence header (i.e. a Sequence Parameter Set (SPS)), an image header (i.e. a Picture Parameter Set (PPS)) of one image or shared by a plurality of images, or at the level of a synchronisation point or image in an encoded video stream (for example in a header of an IDR (instantaneous decoding refresh) image). Each time it receives said syntax element, a decoder can update its knowledge of the relationships between views.

Table TAB3 represents a second version of the syntax element view_parameter adapted to the embodiments in which a plurality of prediction images and/or of aggregated prediction images are inserted in the DPB of a current view (typically embodiment (15) and embodiment (16) when a plurality of prediction images or of aggregated prediction images are generated).

TABLE TAB2

| | Descriptor |
|---|---|
| view_parameter () { | |
|   view_id | u(4) |
|   if (!first_view) vsp_flag | u(1) |
|   if (vsp_flag) { | |
|     number_inter_view_predictor_used | u(3) |
|     for( i = 0; i <= number_of_inter_ | |
|     view_predictor_used; i++ ) { | |
|       predictor_id[view_id][i] | u(4) |
|     } | |
|   } | |
| } | |

Table TAB2 represents a first version of the syntax element view_parameter adapted to the embodiments in which only one prediction image or only one aggregated prediction image is inserted in the DPB of a current view (typically embodiments (14A), (14B), and embodiment (16) when only one prediction image is generated or only one aggregated prediction image is generated).

The first version of the syntax element view_parameter comprises a parameter view_id denoting a unique identifier for the current view. If the current view is not the first view decoded for a frame, a flag vsp_flag indicates if the vsp mode is used or not for the current view. A parameter number_of_inter_view_predictor_used represents a maximum number of views (already decoded) used to decode the current view. A parameter predictor_id[view_id][i] provide an identifier of each view is used to create the prediction image for the current view. In an embodiment, the maximum number of views used to decode a current view is fixed to "8". In that case, "3" bits are needed to encode the parameter predictor_id[view_id].

Of course, inter-view prediction between a first view and a second view is possible only if the camera parameters of the two views are available at the decoder side, i.e. if the SEI message described in table TAB1 was received and decoded by the decoder.

In that case, a current view can be associated to a plurality of reference views. In this second version of the syntax element view_parameter, a parameter number_inter_view_predictor_minus1 specifies a number of prediction images or of aggregated prediction images used for inter-view prediction of the current view identified by the parameter view_id. A parameter number_inter_view_predictor_used_minus1 specifies for each prediction image or aggregated prediction image a number of reference views used to generate said prediction image or aggregated prediction image. In case of a prediction image, the parameter number_inter_view_predictor_used_minus1 is set to one. A parameter predictor_id specifies which view or views is/are used to generate a prediction image or an aggregated prediction image.

As can be seen from tables TAB2 and TAB3, the VSP mode can be activated at the slice header level in the syntax element view_parameter by the flag vsp_flag.

The signalisation at the slice level allows indicating to a decoder if a block comprised in this slice can potentially use the VSP mode. However, it doesn't specify which block in the slice actually uses the VSP mode.

In an embodiment, when activated at the slice level, the actual use of the VSP mode is signalled at the block level.

TABLE TAB3

| | Descriptor |
|---|---|
| view_parameter () { | |
|   view_id | u(4) |
|   if (!first_view) vsp_flag | |
|   if (vsp_flag) { | |
|     number_inter_view_predictor_minus1 | u(3) |
|     for( i = 0; i <= number_of_inter_ | |
|     view_predictor_minus1, i++ ) { | |
|       number_inter_view_predictor_used_minus1[i] | u(3) |
|       for( j = 0; j <= number_of_inter_view_ | |
|       predictor_used_minus1[i]; j++ ) { | |
|         predictor_id[view_id][i][j] | u(4) |
|       } | |
|     } | |
|   } | |
| } | |

Figure 17:
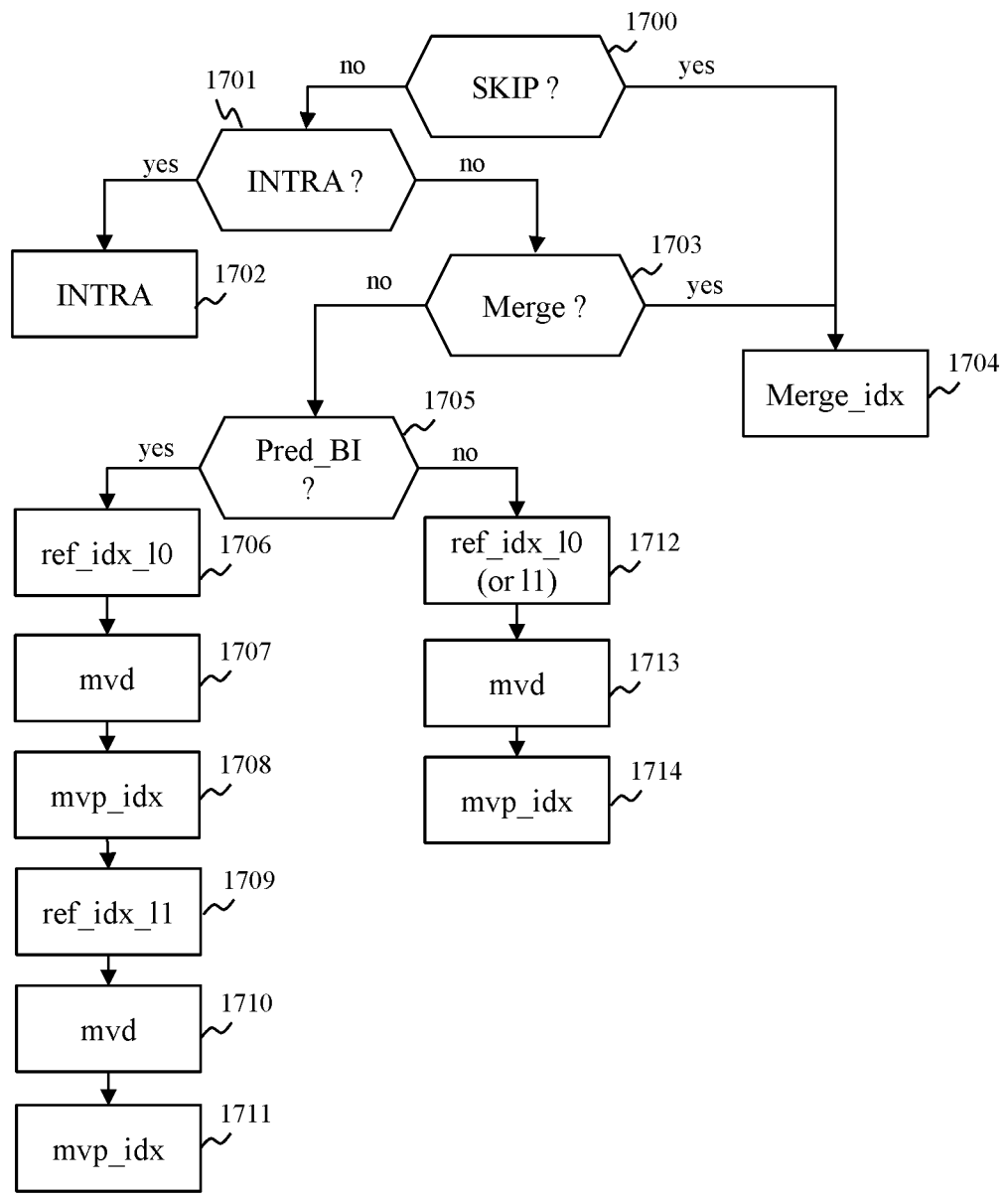
FIG. 17 depicts schematically a basic embodiment of a syntax parsing process of a video compression method not using inter-views prediction.

FIG. 17 depicts schematically a basic embodiment of a syntax parsing process of a video compression method not using the VSP mode.

The basic embodiment of FIG. 17 is based on a syntax of a block (also called a prediction unit (PU)) described in table TAB4. This basic embodiment is executed by a decoder when decoding a current block. However, an encoder encodes a syntax compliant with what the decoder is able to decode.

In a step 1700, the processing module 20 determines if the current block is encoded in skip mode. If yes, the processing module 20 decodes an identifier merge_idx for the current block. The identifier merge_idx identifies which candidate block in a neighbourhood of the current block provides information to decode the current block. The decoding of the identifier merge_idx is followed by the decoding of the current block applying a decoding process adapted to the skip mode.

If the current block is not encoded in skip mode, the processing module 20 determines if the current block is encoded in Intra mode in a step 1701. If yes, the current block is decoded using an Intra mode decoding process in a step 1702.

If the current block is not encoded in Intra mode, the processing module determines if the current block is encoded in a merge mode in a step 1703. If the current block is encoded in a merge mode, the processing module decodes an identifier merge_idx for the current block in a step 1704. The decoding of the identifier merge_idx is followed by the decoding of the current block applying a decoding process adapted to the merge mode.

If the current block is not encoded in merge mode, the processing module 20 determines if the current block is encoded in bi-directional or mono-directional inter prediction mode in a step 1705.

If the current block is encoded in mono-directional inter prediction mode, step 1705 is followed by a step 1712 during which the processing module 20 decodes one index in a list of a reference images stored in the DPB (ref_idx_l0 or ref_idx_l1). This index indicates which reference image provides a predictor block for the current block.

In a step 1713, the processing module 20 decodes a motion vector refinement mvd for the current block.

In a step 1714, the processing module 20 decodes a motion vector predictor index designating a motion vector predictor. With this motion information, the processing module 20 decodes the current block.

When the current block is encoded in bi-directional prediction mode, step 1705 is followed by a step 1706 during which the processing module 20 decodes a first index in a list of a reference images stored in the DPB (ref_idx_l0).

In a step 1707, the processing module 20 decodes a first motion vector refinement mvd for the current block.

In a step 1708, the processing module 20 decodes a first motion vector predictor index designating a first motion vector predictor.

In a step 1709, the processing module 20 decodes a second index in a list of a reference images stored in the DPB (ref_idx_l1).

In a step 1710, the processing module 20 decodes a second motion vector refinement mw for the current block.

In a step 1711, the processing module 20 decodes a second motion vector predictor index designating a second motion vector predictor.

With this motion information, the processing module 20 generates two predictors and decodes the current block using these two predictors.

TABLE TAB4

| prediction_unit( x0, y0, nPbW, nPbH ) { | Descriptor |
|---|---|
| if( cu_skip_flag[ x0 ][ y0 ] ) { | ae[v] |
|   if( MaxNumMergeCand > 1 ) | |
|     merge_idx[ x0 ][ y0 ] | ae(v) |
| } else { /* MODE_INTER */ | |
| merge_flag[ x0 ][ y0 ] | ae(v) |
| if( merge_flag[ x0 ][ y0 ] ) { | |
|   if( MaxNumMergeCand > 1 ) | |
|     merge_idx[ x0 ][ y0 ]} | ae(v) |
| } else { | |
|   if( slice_type = = B ) | |
|     inter_pred_idc[ x0 ][ y0 ] | ae(v) |
|   if( inter_pred_idc[ x0 ][ y0 ] != PRE_L1 ) { | |
|     if( num_ref_idx_l0_active_minus1 > 0 ) | |
|       ref_idx_l0[ x0 ] y0 ] | ae(v) |
|     mvd_coding( x0, y0, 0 ) | |
|     mvp_l0_flag[ x0 ][ y0 ] | ae(v) |
|   } // L0 | |
|   if( inter_pred_idc[ x0 ][ y0 ] != PRED_L0 ) { | |
|     if( num_ref_idx_l1_active_minus1 > 0 ) | |
|       ref_idx_l1[ x0 ][ y0 ] | ae(v) |
|     if( mvd_l1_zero_flag && | |
| inter_pred_idc[ x0 ][ y0 ] = = PRED_BI ) { | |
|       MvdL1[ x0 ][ y0 ][ 0 ] = 0 | |
|       MvdL1[ x0 ][ y0 ][ 1 ] = 0 | |
|     } else { | |
|       mvd_coding( x0, y0, 1 ) | |
|     } | |
|     mvp_l1_flag[ x0 ][ y0 ] | ae(v) |
|   } // L1 | |
| } // inter | |
| } // prediction_unit | |

Figure 18:
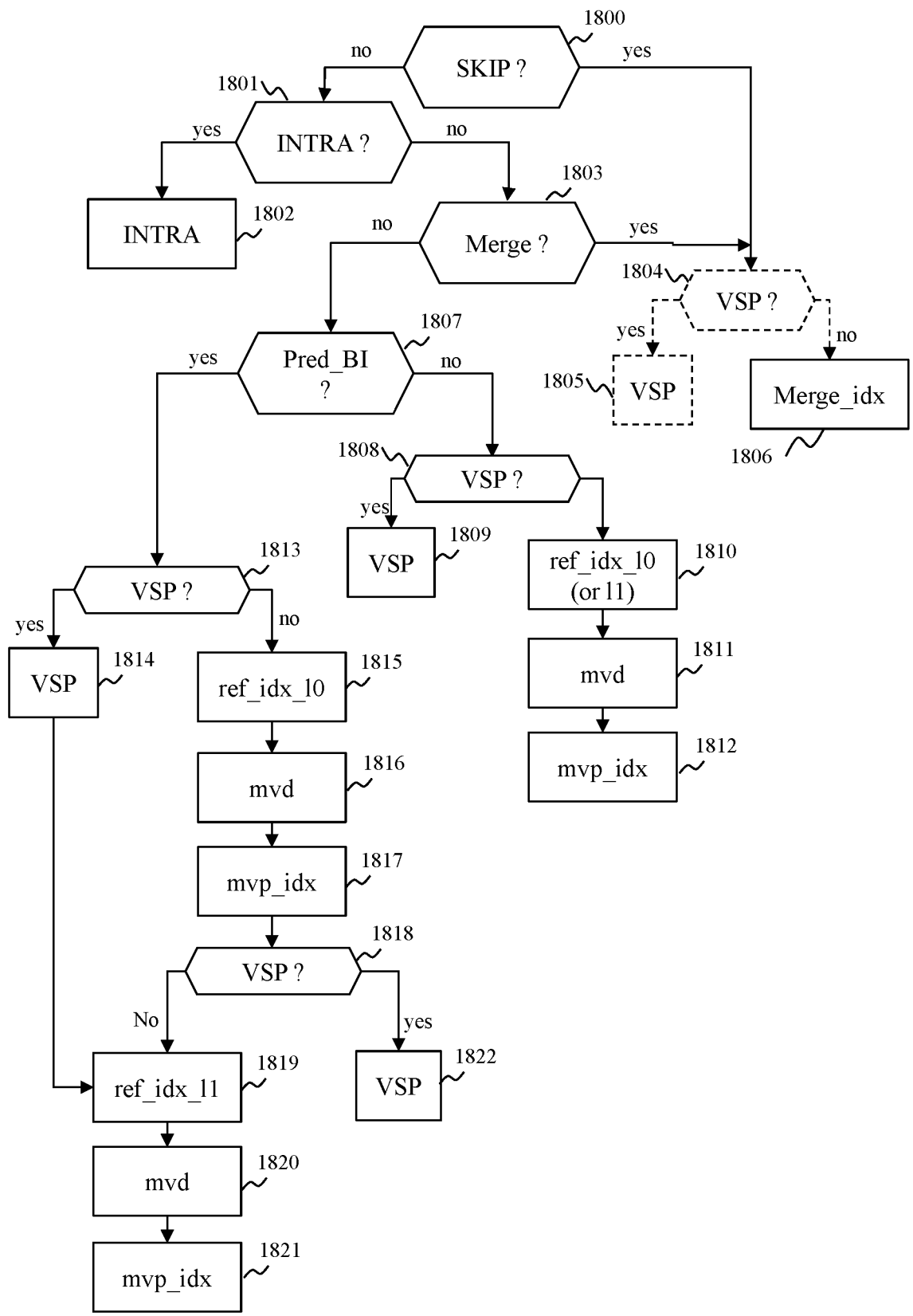
FIG. 18 depicts schematically a first embodiment of a syntax parsing process of a video compression method using a new VSP mode.

FIG. 18 depicts schematically a first embodiment of a syntax parsing process of a video compression method using a new VSP mode.

The embodiment of FIG. 18, called embodiment (18) in the following, is based on a syntax of a block described in table TAB5. The differences between the syntax of table TAB4 and table TAB5 are represented in bold. This embodiment is executed by a decoder when decoding a current block. However, an encoder encodes a syntax compliant with what the decoder is able to decode.

The syntax and parsing method of embodiment (18) is adapted to embodiments (14A), (14B) and (16) when only one prediction image or aggregated prediction image is inserted in the DPB of the current layer.

In a step 1800, the processing module 20 determines if the current block is encoded in skip mode. If yes, the processing module 20 decodes an identifier merge_idx for the current block in a step 1804. The decoding of the identifier merge_idx is followed by the decoding of the current block applying a decoding process adapted to the skip mode.

TABLE TAB5

| prediction_unit( x0, y0, nPbW, nPbH ) { | Descriptor |
|---|---|
|   if( cu_skip_flag[ x0 ][ y0 ] ) { | ae[v] |
|     if (vsp_flag) | |
|       vsp_mode[x0][y0] | ae(v) |
|     If ( !vsp_mode[x0][y0]) { | |
|     if( MaxNumMergeCand > 1 ) | |
|       merge_idx[ x0 ][ y0 ] | ae(v) |
|     } | |
|   } else { /* MODE_INTER */ | |
|     merge_flag[ x0 ][ y0 ] | ae(v) |
|     if( merge_flag[ x0 ][ y0 ] ) { | |
|       if(vsp_flag) vsp_mode[x0][y0] | |
|       if ( !vsp_mode[x0][y0] && MaxNumMergeCand > 1 ) | |
|       merge_idx[ x0 ][ y0 ]} | ae(v) |
|     } else { | |
|       if( slice_type = = B ) | |
|         inter_pred_idc[ x0 ][ y0 ] | ae(v) |
|       if( inter_pred_idc[ x0 ][ y0 ] != PRE_L1 ) { | |
|         if (vsp_flag) vsp_mode_l0[x0][y0] | |
|         if ( !vsp_mode_l0[x0][y0]) { | |
|           if( num_ref_idx_l0_active_minus1 > 0 ) | |
|             ref_idx_l0[ x0 ][ y0 ] | ae(v) |
|           mvd_coding( x0, y0, 0 ) | |
|           mvp_l0_flag[ x0 ][ y0 ] | ae(v) |
|         } | |
|       } // L0 | |
|       if( inter_pred_idc[ x0 ][ y0 ] != PRED_L0 ) { | |
|         if (vsp_flag && !vsp_mode_l0[x0][y0] ) | ae(v) |
|         vsp_mode_l1[x0][y0] | |
|         if( !vsp_mode_l1[x0][y0]) { | |
|           if( num_ref_idx_l1_active_minus1 > 0 ) | |
|             ref_idx_l1[ x0 ][ y0 ] | ae(v) |
|           if( mvd_l1_zero_flag && | |
|           inter_pred_idc[ x0 ][ y0 ] = = PRED_BI ) { | |
|           MvdL1[ x0 ][ y0 ][ 0 ] = 0 | |
|           MvdL1[ x0 ][ y0 ][ 1 ] = 0 | |
|         } else { | |
|           mvd_coding( x0, y0, 1 ) | |
|         } | ae(v) |
|         mvp_l1_flag[ x0 ][ y0 ] | |
|         } | |
|       } // L1 | |
|     } // AMVP | |
| } // prediction_unit | |

As will be described in the following, in the embodiment (18) the use of the VSP mode is signalled at the block level by a flag VSP. When the flag VSP=1 the VSP mode is activated for the current block. Otherwise, it is deactivated. Furthermore, in the embodiment (18), when a block is encoded in VSP mode, the predictor block is co-located with the current block. Consequently, no motion vector is required to get a block predictor from a reference image (which is a prediction image or an aggregated prediction image in that case). In addition, as will be described latter in relation to FIG. 18, the combination of VSP mode and bi-directional inter prediction is not possible when the two predictor blocks are extracted from a same prediction image or aggregated prediction image. Indeed, since in VSP mode, each predictor is co-located with the current block, in case of bi-directional inter prediction, the two predictor blocks are the same.

If the current block is not encoded in skip mode, the processing module 20 determines if the current block is encoded in Intra mode in a step 1801. If yes, the current block is decoded using an Intra mode decoding process in a step 1802.

If the current block is not encoded in Intra mode, the processing module determines if the current block is encoded in a merge mode in a step 1803. If the current block is encoded in a merge mode, the processing module decodes an identifier merge_idx for the current block in a step 1806. The decoding of the identifier merge_idx is followed by the decoding of the current block applying a decoding process adapted to the merge mode.

If the current block is not encoded in merge mode, the processing module 20 determines if the current block is encoded in bi-directional or mono-directional inter prediction mode in a step 1807.

If the current block is encoded in mono-directional inter prediction mode, step 1807 is followed by a step 1808 during which the processing module 20 decodes a flag VSP to determine if the current block is encoded in VSP mode. If the current block is encoded in VSP mode, the processing module 20 decodes the current block according to a VSP mode decoding process. In other words, the current block is predicted from a block of a prediction image (or of an aggregated prediction image) stored in the DPB of the current view. In that case, the position of the prediction image (or of the aggregated prediction image) in the DPB is implicit and known by the decoder (i.e. a prediction image (or an aggregated prediction image) is systematically at the same position in the DPB).

If the current block is not encoded in VSP mode, step 1808 is followed by a step 1810 during which, the processing module 20 decodes one index in a list of a reference images stored in the DPB (ref_idx_l0 or ref_idx_l1).

In a step 1811, the processing module 20 decodes a motion vector refinement mvd for the current block.

In a step 1812, the processing module 20 decodes a motion vector predictor index designating a motion vector predictor. With this motion information, the processing module 20 decodes the current block.

When the current block is encoded in bi-directional prediction mode, step 1807 is followed by a step 1813 during which the processing module 20 decodes a flag VSP to determine if a first predictor block of the current block is obtained from a prediction image (or from an aggregated prediction image) or not. If the first predictor block of the current block is obtained from a prediction image (or from an aggregated prediction image), a first predictor block is obtained in a step 1814 identical to step 1809. Step 1814 is followed by a step 1819 during which the processing module 20 decodes an index in a list of a reference images stored in the DPB (ref_idx_l1).

In a step 1820, the processing module 20 decodes a motion vector refinement mvd for the current block.

In a step 1821, the processing module 20 decodes a motion vector predictor index designating a motion vector predictor. With the motion information obtained in steps 1819, 1820 and 1821, the processing module 20 determines a second predictor block. With these two predictors, the processing module 20 determines a bi-directional predictor a decodes the current block.

If the first predictor block of the current block is not obtained from a prediction image (or from an aggregated prediction image), the processing module executes steps 1815, 1816 and 1817 respectively identical to the steps 1810, 1811 and 1812 to obtain a first predictor.

In a step 1818, the processing module 20 decodes a flag VSP to determine if the second predictor block of the current block is obtained from a prediction image (or from an aggregated prediction image) or not. If the second predictor block of the current block is obtained from a prediction image (or from an aggregated prediction image), a second predictor block is obtained in a step 1822 identical to step 1809. Using the first and the second predictor block, the processing module decodes the current block.

If the second predictor block of the current block is not obtained from a prediction image (or from an aggregated prediction image), in a step 1819, the processing module 20 decodes a second index in a list of a reference images stored in the DPB(ref_idx_l1).

In a step 1820, the processing module 20 decodes a second motion vector refinement mvd for the current block.

In a step 1821, the processing module 20 decodes a second motion vector predictor index designating a second motion vector predictor.

With the motion information obtained in steps 1815, 1816, 1817, 1819, 1820 and 1821, the processing module 20 decodes the current block.

In a variant of embodiment (18), during step 1804, the processing module 20 decodes a VSP flag for the current block. If the VSP mode is activated for the current block, the processing module 20 executes a step 1805 identical to the step 1809. If the VSP mode is not activated for the current block, the processing module 20 executes the step 1806.

Figure 19:
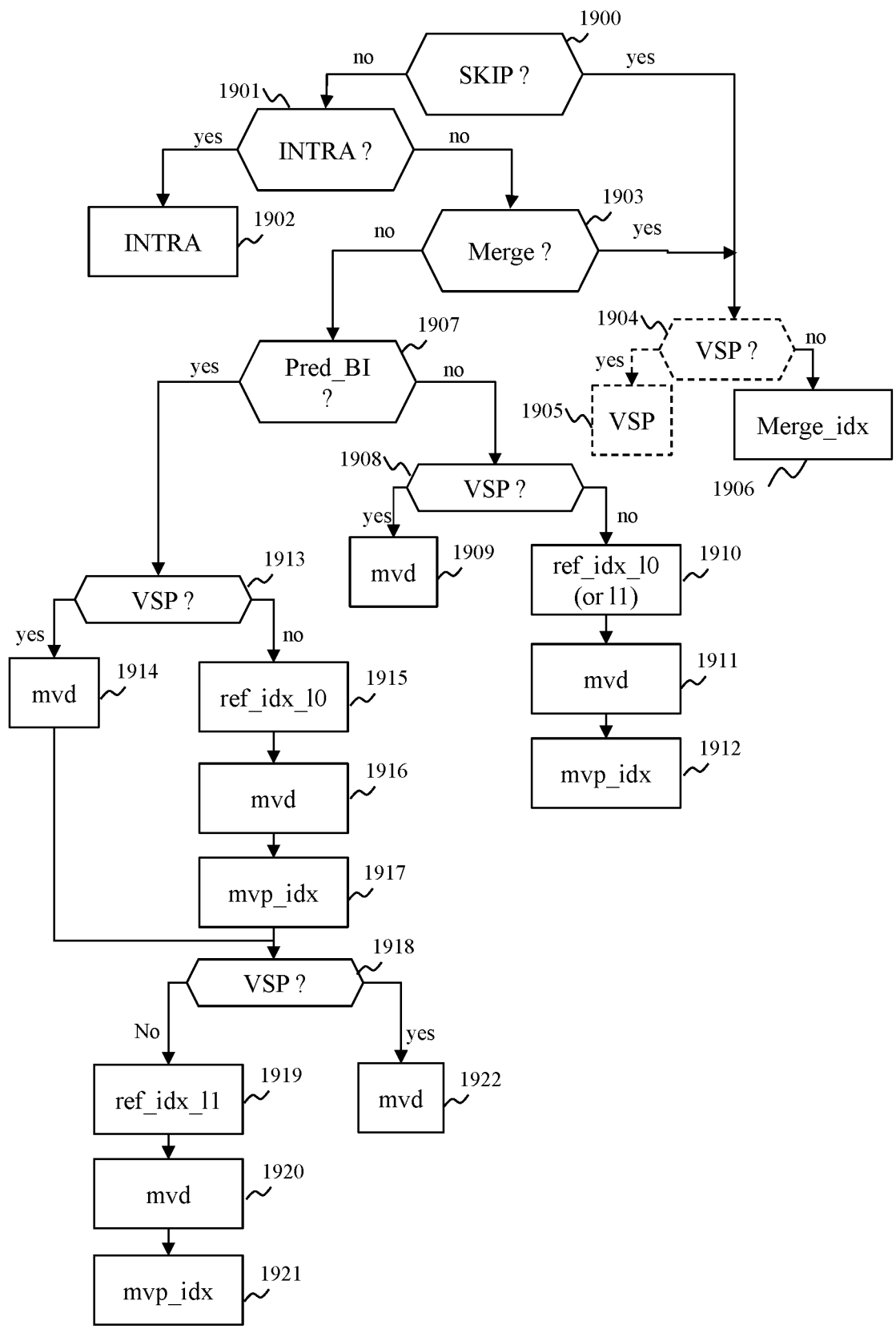
FIG. 19 depicts schematically a second embodiment of a syntax parsing process of a video compression method using a new VSP mode.

FIG. 19 depicts schematically a second embodiment of a syntax parsing process of a video compression method using a new VSP mode.

The embodiment of FIG. 19, called embodiment (19) in the following, is based on a syntax of a block described in table TAB6. The differences between the syntax of table TAB4 and table TAB6 are represented in bold. This embodiment is executed by a decoder when decoding a current block. However, an encoder encodes a syntax compliant with what the decoder is able to decode.

TABLE TAB6

| prediction_unit( x0, y0, nPbW, nPbH ) { | Descriptor |
|---|---|
|     if( cu_skip_flag[ x0 ][ y0 ] ) { | ae(v) |
|      if (vsp_flag) vsp_mode[x0][y0] | ae(v) |
|      if ( !vsp_mode[x0][y0]) { | |
|       if( MaxNumMergeCand > 1 ) | |
|        merge_idx[ x0 ][ y0 ] | ae(v) |
|      } | |
|     } else { /* MODE_INTER */ | |
|      merge_flag[ x0 ][ y0 ] | |
|      if( merge_flag[ x0 ][ y0 ] ) { | |
|       if(vsp_flag) vsp_mode[x0][y0] | ae(v) |
|       if ( !vsp_mode[x0][y0] && | ae(v) |
|       MaxNumMergeCand > 1 ) | |
|   merge_idx[ x0 ][ y0 ] | |
|      } | |
|     } else { | |
|      if( slice_type = = B ) | |
|       inter_pred_idc[ x0 ][ y0 ] | ae(v) |
|       if( inter_pred_idc[ x0 ][ y0 ] != PRE_L1 ) { | |

TABLE TAB6-continued

| prediction_unit( x0, y0, nPbW, nPbH ) { | Descriptor |
|---|---|
|     if (vsp_flag) vsp_mode_l0[x0][y0] | ae(v) |
|     if ( vsp_mode_l0[x0][y0]) { | |
|       mvd_coding(x0,y0,0) | |
|     } else { | |
|       if( num_ref_idx_l0_active_minus1 > 0 ) | |
|         ref_idx_l0[ x0 ] y0 ] | ae(v) |
|       mvd_coding( x0, y0, 0 ) | |
|       mvp_l0_flag[ x0 ][ y0 ] | ae(v) |
|     } | |
|   } // L0 | |
|   if( inter_pred_idc[ x0 ][ y0 ] != PRED_L0 } { | |
|     if (vsp_flag && !( mvd_l1_zero_flag | ae(v) |
| && inter_pred_idc[x0][y0] = = | |
| PRED_BI && vsp_mode_l0[x0][y0] | |
| && mvd_L0==(0,0)) ) | |
| vsp_mode_l1[x0][y0] | |
|     if( vsp_mode_l1[x0][y0]) { | |
|       if( mvd_l1_zero_flag && | |
| inter_pred_idc[ x0 ][ y0 ] = = PRED_BI ) { | |
|         MvdL1[ x0 ][ y0 ][ 0 ] = 0 | |
|         MvdL1[ x0 ][ y0 ][ 1 ] = 0 | |
|       } else { | |
|         mvd_coding(x0,y0,1) | |
|       } | |
|     } else { | |
|       if( num_ref_idx_l1_active_minus1 > 0 ) | ae(v) |
|       ref_idx_l1[ x0 ][ y0 ] | |
|       if( mvd_l1_zero_flag && | |
|       inter_pred_idc[ x0 ][ y0 ] = = PRED_BI ) { | |
|         MvdL1[ x0 ][ y0 ][ 0 ] = 0 | |
|         MvdL1[ x0 ][ y0 ][ 1 ] = 0 | |
|       } else { | |
|         mvd_coding(x0,y0,1) | |
|       } | |
|       mvp_l1_flag[ x0 ][ y0 ] | ae(v) |
|     } // !vsp | |
|   } // L1 | |
| } // inter | |
| } | |

Embodiment (19) is very similar to embodiment (18). Embodiment (19) differs from embodiment (18) in that the syntax of a block encoded in VSP mode comprises a syntax element representing a motion vector difference mvd. A consequence of this feature is that, the combination of VSP mode and bi-directional inter prediction when the two predictor blocks are extracted from a same prediction image or aggregated prediction image is now possible. Indeed, in embodiment (19), the presence of the motion vector difference nd allows obtaining two different predictor blocks.

The syntax and parsing method of embodiment (19) is adapted to embodiments (14A), (14B) and (16) when only one prediction image or aggregated prediction image is inserted in the DPB of the current layer.

Embodiments (19) comprises steps 1900 to 1908, 1910 to 1913, 1915 to 1921 respectively identical to steps 1800 to 1808, 1810 to 1813, 1815 to 1821.

When the VSP mode is activated for the current block, step 1908 is followed by a step 1909 during which a motion vector difference nd is computed for the current block. This motion vector difference mvd allows designating a predictor block in a prediction image or an aggregated prediction image. Said predictor is then used to decode the current block.

When the VSP flag specifies that a first predictor of the current block is generated from a prediction image or from an aggregated prediction image, step 1913 is followed by a step 1914 during which a motion vector difference mvd is computed for the current block. This motion vector difference mvd allows designating a first predictor block in a prediction image or an aggregated prediction image.

Step 1914 is followed by step 1918. When the VSP flag specifies that a second predictor of the current block is generated from a prediction image or from an aggregated prediction image, step 1918 is followed by a step 1922 during which a motion vector difference mvd is computed for the current block. This motion vector difference mvd allows designating a second predictor block in a prediction image or an aggregated prediction image. The current block is decoded from the first and the second predictors as a bi-directional prediction mode.

Note that step 1905 is identical to step 1909.

Figure 20:
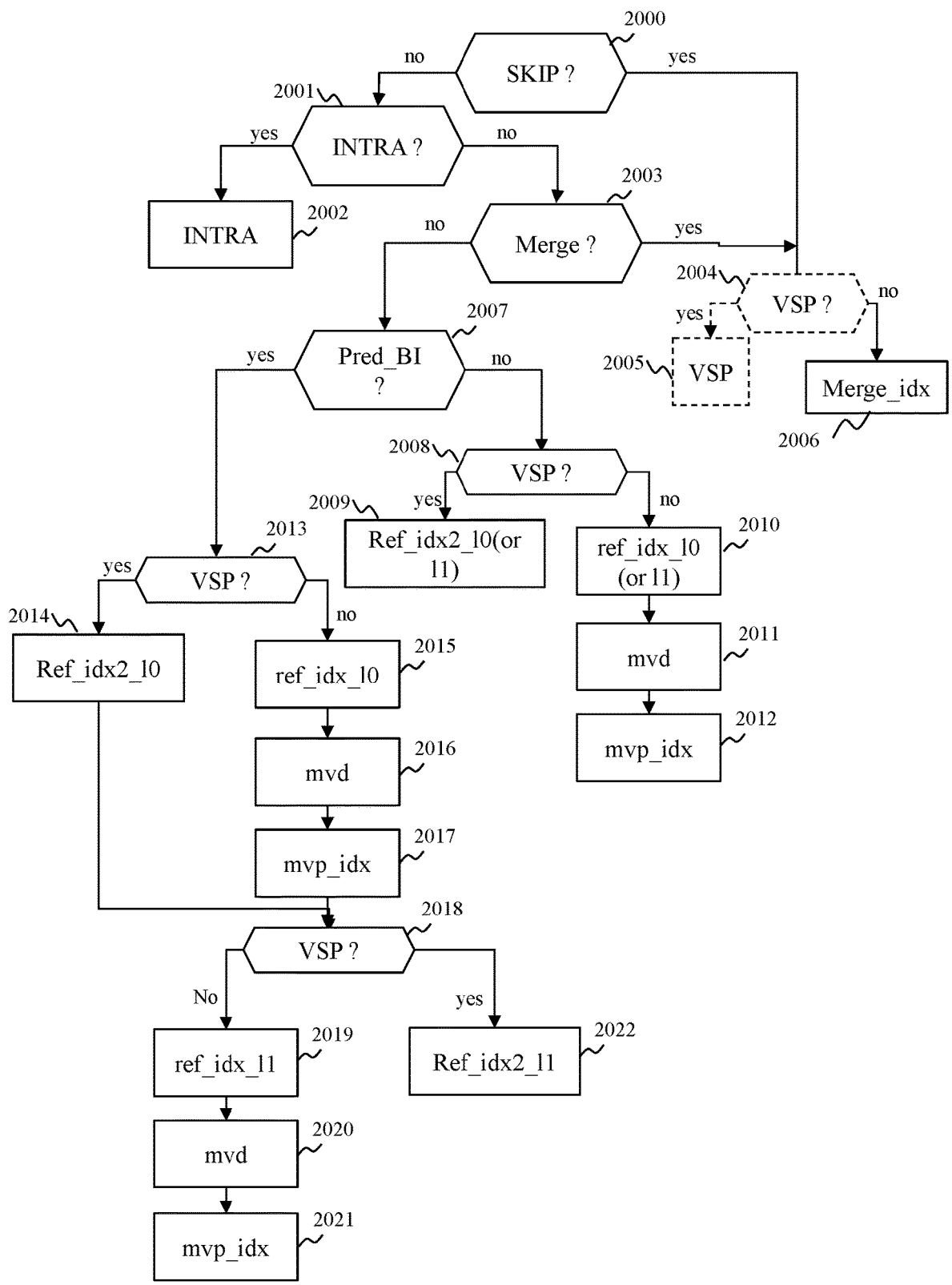
FIG. 20 depicts schematically a third embodiment of a syntax parsing process of a video compression method using a new VSP mode.

FIG. 20 depicts schematically a third embodiment of a syntax parsing process of a video compression method using a new VSP mode.

The embodiment of FIG. 20, called embodiment (20) in the following, is based on a syntax of a block described in table TAB7. The differences between the syntax of table TAB4 and table TAB7 are represented in bold. This embodiment is executed by a decoder when decoding a current block. However, an encoder encodes a syntax compliant with what the decoder is able to decode.

Embodiment (20) is very similar to embodiment (19). Embodiment (20) differs from embodiment (19) in that the syntax of a block encoded in VSP mode no more comprises a syntax element representing a motion vector difference mvd but comprises at least one index in a list of a reference images stored in the DPB (ref_idx2_l0 or ref_idx2_l1). This index indicates which prediction image provides a predictor block for the current block. A consequence of this feature is that, the combination of VSP mode and bi-directional inter prediction is now possible. Indeed, in embodiment (20), the presence of two indexes in case of bi-directional Inter prediction designating two different prediction images (or aggregated prediction images) allows obtaining two different predictor blocks.

The syntax and parsing method of embodiment (20) is adapted to embodiments (15) and (16) when a plurality of prediction images or aggregated prediction images are inserted in the DPB of the current layer.

Embodiments (20) comprises steps 2000 to 2008, 2010 to 2013, 2015 to 2021 respectively identical to steps 1900 to 1908, 1910 to 1913, 1915 to 1921.

Step 1909 of embodiment (19) is replaced by a step 2009 in embodiment (20). In step 2009, the processing module (20) decodes a syntax element ref_idx2_l0 (or ref_idx2_l1) representing an index in a list l0 (or l1) of a reference image among prediction images or aggregated prediction images corresponding temporally to (i.e. in the same frame than) the image comprising the current block. The processing module 20 extracts from the prediction image (or aggregated prediction image) designated by the index ref_idx2_0 (or ref_idx2_l1), a predictor block spatially co-located with the current block. Then, the processing module decodes the current block using the obtained predictor block.

Step 1914 of embodiment (19) is replaced by a step 2014 in embodiment (20). In step 2014, the processing module (20) decodes a syntax element ref_idx2_l0 representing an index in a first list 10 of a reference image to use among prediction images or aggregated prediction images corresponding temporally to (i.e. in the same frame than) the image comprising the current block. The processing module 20 extracts from the prediction image (or aggregated prediction image) designated by the index ref_idx2_l0, a first predictor block spatially co-located with the current block.

Step 1922 of embodiment (19) is replaced by a step 2022 in embodiment (20). In step 2022, the processing module (20) decodes a syntax element ref_idx2_l1 representing an index in a second list 11 of a reference images to use among prediction images or aggregated prediction images corresponding temporally to (i.e. in the same frame than) the image comprising the current block. The processing module 20 extracts from the prediction image (or aggregated prediction image) designated by the index ref_idx2_l1, a second predictor block spatially co-located with the current block.

After steps 2021 or 2022, the processing module 20 decodes the current block using the first and the second predictor as in bi-prediction inter mode.

Note that step 2005 is identical to step 2009.

TABLE TAB7

| prediction_unit( x0, y0, nPbW, nPbH ) { | Descriptor |
|---|---|
|   if( cu_skip_flag[ x0 ][ y0 ] ) { | ae(v) |
|    if (vsp_flag) | |
|     vsp_mode[x0][y0] | |
|    if ( !vsp_mode[x0][y0]) { | ae(v) |
|     if( MaxNumMergeCand > 1 ) | |
|     merge_idx[ x0 ][ y0 ] | |
|    } | |
|   } else { /* MODE_INTER */ | |
|    if( MaxNumMergeCand > 1 ) | |
|     merge_flag[ x0 ][ y0 ] | ae(v) |
|    if( merge_flag[ x0 ][ y0 ] ) { | |
|     if(vsp_flag) | |
|      vsp_mode[x0][y0] | ae(v) |
|     if ( !vsp_mode[x0][y0]) | |
|      merge_idx[ x0 ][ y0 ] | ae(v) |
|    } else { | |
|     if( slice_type == B ) | |
|      inter_pred_idc[ x0 ][ y0 ] | ae(v) |
|     if( inter_pred_idc[ x0 ][ y0 ] != PRED_L1 ) { | |
|      if (vsp_flag) | |
|       vsp_mode_l0[x0][y0] | |
|      if ( vsp_mode_l0[x0][y0]) { | ae(v) |
|       if( num_ref_idx2_l0_active_minus1 > 0 ) | |
|     ref_idx2_l0[ x0 ][ y0 ] | ae(v) |
|      } else { | |
|       if( num_ref_idx_l0_active_minus1 > 0 ) | |
|        ref_idx_l0[ x0 ] y0 ] | ae(v) |
|        mvd_coding( x0, y0, 0 ) | |
|        mvp_l0_flag[ x0 ][ y0 ] | ae(v) |
|      } | |
|     } | |
|     if( inter_pred_idc[ x0 ][ y0 ] != PRED_L0 ) { | |
|      if(vsp_flag) | |
|       vsp_mode_l1[x0][y0] | ae(v) |
|      if( vsp_mode_l1[x0][y0]) { | |
|       if( num_ref_idx2_l1_active_minus1 > 0 ) | ae(v) |
|     ref_idx2_l1[ x0 ][ y0 ] | |
|      } else { | |
|       if( num_ref_idx_l1_active_minus1 > 0 ) | |

TABLE TAB7-continued

| prediction_unit( x0, y0, nPbW, nPbH ) { | Descriptor |
|---|---|
|     ref_idx_l1[ x0 ][ y0 ] | ae(v) |
|     if( mvd_l1_zero_flag &&<br>inter_pred_idc[ x0 ][ y0 ] = = PRED_BI ) {<br>      MvdL1[ x0 ][ y0 ][ 0 ] = 0<br>      MvdL1[ x0 ][ y0 ][ 1 ] = 0<br>    } else {<br>      mvd_coding( x0, y0, 1 )<br>      }<br>    mvp_l1_flag[ x0 ][ y0 ] | ae(v) |
|   }// L1<br>  }// inter<br>} | |

Figure 21:
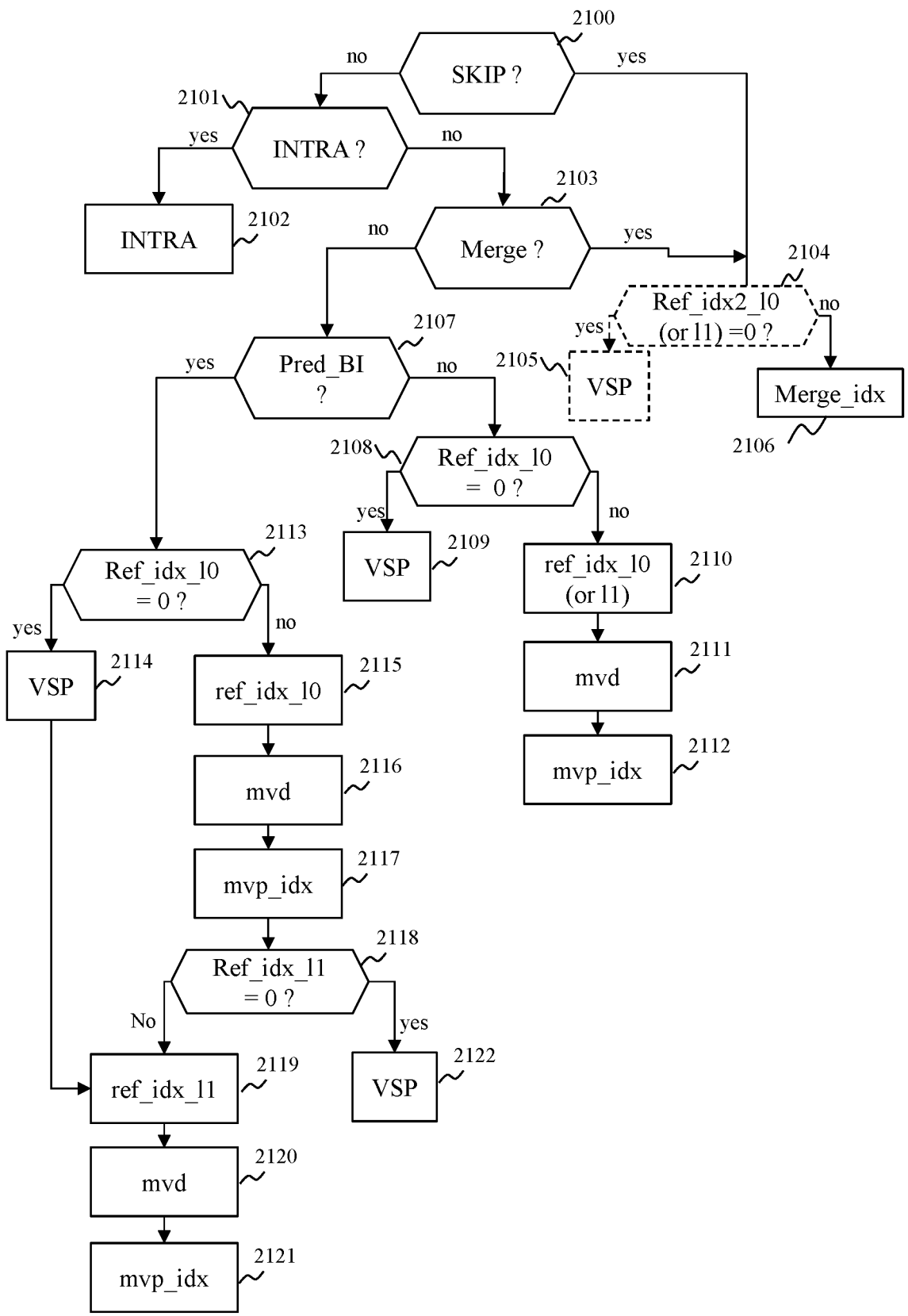
FIG. 21 depicts schematically a fourth embodiment of a syntax parsing process of a video compression method using a new VSP mode.

FIG. 21 depicts schematically a fourth embodiment of a syntax parsing process of a video compression method using the new VSP mode.

The embodiment of FIG. 21, called embodiment (21) in the following, is based on a syntax of a block described in table TAB8. The differences between the syntax of table TAB4 and table TAB8 are represented in bold. This embodiment is executed by a decoder when decoding a current block. However, an encoder encodes a syntax compliant with what the decoder is able to decode.

Embodiment (21) is very similar to embodiment (18). However, in embodiment (21), the use of the VSP mode at the level of a block in inferred from the index of a reference image (ref_idx_l0 or ref_idx_l1) instead of being explicitly specified by the flag VSP.

The syntax and parsing method of embodiment (21) is adapted to embodiments (14A), (14B) and (16) when only one prediction image or aggregated image is inserted in the DPB of the current layer.

Embodiments (21) comprises steps 2100 to 2103, 2105 to 2107, 2109 to 2112, 2114 to 2117, 2119 to 2122 respectively identical to steps 1800 to 1803, 1805 to 1807, 1809 to 1812, 1814 to 1817, 1819 to 1822.

In a step 2104, if an index ref_idx2_l0 or an index ref_idx2_l1 designating a reference image in list of reference images corresponding to prediction images or aggregated prediction images is inherited from the candidate block designated by the identifier merge_idx, then the processing module 20 considers that the VSP mode is activated for the current block.

In a step 2108, if an index ref_idx_l0 designating a reference image in list l0 of reference images designates a prediction image or an aggregated prediction image, then the VSP mode is considered as activated for the current block. For example, ref_idx_l0=0 designates a reference image corresponding to a prediction image or an aggregated prediction image.

In a step 2113, if an index ref_idx_l0 designating a reference image in list 10 of reference images designates a prediction image or an aggregated prediction image, then the processing module 20 considers that a first predictor of the current block is obtained from a prediction image or an aggregated prediction image.

In a step 2118, if an index ref_idx_l1 designating a reference image in list l1 of reference images designates a prediction image or an aggregated prediction image, then the processing module 20 considers that a second predictor of the current block is obtained from a prediction image or an aggregated prediction image. For example, ref_idx_l1=0 designates a reference image corresponding to a prediction image or an aggregated prediction image.

TABLE TAB8

| prediction_unit ( x0, y0, nPbW, nPbH ) { | Descriptor |
|---|---|
|   if( cu_skip_flag[ x0 ][ y0 ] ) {<br>    if( MaxNumMergeCand > 1 )<br>      merge_idx[ x0 ][ y0 ] | ae(v) |
|   } else { * MODE_INTER */<br>    merge_flag[ x0 ][ y0 ] | ae(v) |
|     if( merge_flag[ x0 ][ y0 ] ) {<br>      if( MaxNumMergeCand > 1 )<br>        merge_idx[ x0 ][ y0 ] | ae(v) |
|     } else {<br>      if( slice_type = = B )<br>        inter_pred_idc[ x0 ][ y0 ] | ae(v) |
|       if( inter_pred_idc[ x0 ][ y0 ] != PRED_L1 ) {<br>        if( num_ref_idx_l0_active_minus1 > 0 )<br>          ref_idx_l0[ x0 ] y0 ] | ae(v) |
|           if (!(is_vsp_generated(ref_idx_l0[ x0 ][ y0 ])){<br>            mvd_coding( x0, y0, 0 )<br>            mvp_l0_flag[ x0 ][ y0 ] | ae(v) |
|           }<br>      }<br>      if( inter_pred_idc[ x0 ][ y0 ] != PRED_L0 ) {<br>        if( num_ref_idx_l1_active_minus1 > 0 ) | |

TABLE TAB8-continued

```
prediction_unit ( x0, y0, nPbW, nPbH ) {                                Descriptor
        ref_idx_l1[ x0 ][ y0 ]                                          ae(v)
        if( mvd_l1_zero_flag &&  inter_
    pred_idc[ x0 ][ y0 ] = = PRED_B1 ) {
          MvdL1[ x0 ][ y0 ][ 0 ] = 0
          MvdL1[ x0 ][ y0 ][ 1 ] = 0
        } else {
          if (!(is_vsp_generated(ref_idx_l1[ x0 ][ y0 ]))
    mvd_coding( x0, y0, 1 )
        }
          if (!(is_vsp_generated(ref_idx_l1[ x0 ][ y0 ]))  ae(v)
    mvp_l1_flag[ x0 ][ y0 ]
        }
      }
    }
}
```

In the syntax of table TAB8, a motion vector difference mvd and a motion vector predictor index mvp are decoded only when a function is_vsp_generated returns false. This function is_vsp_generated is defined as: is_vsp_generated (idx)

returns true if the reference index idx refers to a frame generated from a view in the same frame;
returns false otherwise.

In a variant of embodiment (18), called embodiment (18bis) in the following, when the current block is encoded in merge mode or in skip mode, no flag VSP is encoded for the current block. In that case, the processing module 20 decodes first the identifier merge_idx and determines if the candidate block designated by the identifier merge_idx was encoded in the VSP mode. If the candidate block was encoded in VSP mode, then the current block inherits VSP parameters from the candidate block and the current block is decoded using these parameters. Otherwise the current block is decoded applying the usual merge mode decoding process. This embodiment (18bis) is based on a syntax of a block described in table TAB9.

Embodiment (18), (18bis), (19), (20) and (21) could be combined to obtain additional embodiments.

For example, the syntax of a current block encoded in VSP mode can comprise a motion vector difference mad and a syntax element ref_idx2_l0 and/or ref_idx2_l1 representing an index in a first list l0 and or in a second list l1 of a reference image to use among prediction images or aggregated prediction images corresponding temporally to (i.e. in the same frame than) the image comprising the current block. This corresponds to a combination of embodiments (19) and (20).

In another example, the syntax of a current block encoded in VSP mode can comprise a motion vector difference an and the use of the VSP mode can be inferred from syntax element ref_idx_l0 and/or ref_idx_l1 instead of being indicated by a flag VSP. This corresponds to a combination of embodiments (19) and (21).

In another example, the syntax of a current block encoded in VSP mode can comprise a syntax element ref_idx2_l0 and/or ref_idx2_l1 and the use of the VSP mode can be inferred from syntax element ref_idx_l0 and/or ref_idx_l1 instead of being indicated by a flag VSP. This corresponds to a combination of embodiments (20) and (21).

In other examples:
embodiments (18bis) can be combined with embodiment (19), (20) and (21);
embodiments (19), (20) and (21) can be combined;
embodiments (19), (20), (21) and (22) can be combined;
etc.

TABLE TAB9

```
Prediction_unit( x0, y0, nPbW, nPbH ) {                                 Descriptor
      if( cu_skip_flag[ x0 ][ y0 ] ) {                                  ae[v]
        if( MaxNumMergeCand > 1 )
          merge_idx[ x0 ][ y0 ]                                         ae(v)
      } else { /* MODE_INTER */
        if( MaxNumMergeCand > 1 )
          merge_flag[ x0 ][ y0 ]                                        ae(v)
        if( merge_flag[ x0 ][ y0 ] )
          merge_idx[ x0 ][ y0 ]                                         ae(v)
        } else {
          if( slice_type = = B )
            inter_pred_idc[ x0 ][ y0 ]                                  ae(v)
          if( inter_pred_idc[ x0 ][ y0 ] != PRED_L1 ) {
            if (vsp_flag) vsp_mode_l0[x0][y0]
            if ( !vsp_mode_l0[x0][y0]) {                                ae(v)
              if( num_ref_idx_l0_active_minus1 > 0 )
                ref_idx_l0[ x0 ] y0 ]
              mvd_coding( x0, y0, 0 )                                   ae(v)
              mvp_l0_flag[ x0 ][ y0 ]
            }                                                           ae(v)
          } // L0
          if( inter_pred_idc[ x0 ][ y0 ] != PRED_L0 ) {
            if (vsp_flag && !vsp_mode_l0
    [x0][y0] ) vsp_mode_l1[x0][y0]
            if ( !vsp_mode_l1[x0][y0]) {
```

TABLE TAB9-continued

| Prediction_unit( x0, y0, nPbW, nPbH ) { | Descriptor |
|---|---|
|     if( num_ref_idx_l1_active_minus1 > 0 ) | |
|     ref_idx_l1[ x0 ][ y0 ] | ae(v) |
|     if( mvd_l1_zero_flag && inter_ | ae(v) |
|     pred_idc[ x0 ][ y0 ] = = PRED_BI ) { | |
|       MvdL1[ x0 ][ y0 ][ 0 ] = 0 | |
|       MvdL1[ x0 ][ y0 ][ 1 ] = 0 | |
|     } else { | |
|       mvd_coding( x0, y0, 1 ) | |
|       } | |
|       mvp_l1_flag[ x0 ][ y0 ] | ae(v) |
|     } | |
|     }//L1 | |
|   } | |
| } | |

Until now, it was considered that the projection images (or the aggregated projection images) used for inter-view prediction are comprising for each pixel texture data and depth data. In another embodiment, called MI (motion information) based VSP embodiment, prediction images (and aggregated prediction images) are replaced by images, called MI (Motion Information) prediction images (or MI aggregated prediction images) comprising only motion information for each pixel or a subset of pixels.

In the MI based VSP embodiment, the forward projection process of FIG. 13A comprises an additional step 133. During the step 133, the processing module 20 compute a motion vector MV representative of a displacement between the pixel P'(u',v') obtained by the forward projection of steps 130 to 132 and the projected pixel P(u,v). This motion vector MV is intended to be stored in a MI prediction image.

In the following we describe the impact of the MI based VSP embodiment on the embodiments (14A), (14B), (15) and (16).

In the MI based VSP embodiment, the embodiment (14A) is modified and becomes the embodiment (14A_MI). Embodiment (14A_MI) is represented in FIG. 22A.

The first step of embodiment (14A_MI) is step 140, already described in relation to embodiment (14A).

In a step 141_MI, the processing module 20 generates a NI prediction image MI(k) applying the forward projection of steps 130 to 133 between the reference view (for example, the first view 501) and the current view (for example the second view 501B). The MI prediction image MI(k) is intended to be introduced in the DPB of the current view (for example the DPB 519B (respectively 619B)) to become a $k^{th}$ prediction image for the current image of the current view.

In a step 142_MI, the processing module 20 fills the isolated missing motion information. In an embodiment, an isolated missing motion information is filled with neighboring pixel motion information. In another embodiment, the isolated missing motion information are filled with a default value (typically a motion vector=(0,0)). In another embodiment, the isolated missing motion information are considered invalid and a flag representative of a validity of a motion information is associated with each motion information.

In a step 143_MI, the processing module 20 stores the MI prediction image MI(k) in the DPB of the current view.

In a step 144_MI, the processing module 20 reconstructs the current image of the current view using the reference image comprised in the DPB of the current view, the DPB comprising the MI prediction image MI(k). The MI prediction image MI(k) is used by the processing module 20 to generate a prediction image G(k). Indeed, the motion information comprises in the MI prediction image MI(k) is used to apply a motion compensation to each pixel designated by this motion information in a reference image.

Optionally, the embodiment (14A_MI) comprises a step 220 consisting in reducing an amount of motion information in an MI prediction image NI(k). Indeed, having a motion information for each pixel position of an image represent a huge amount of data. In an embodiment the MI prediction image MI(k) is divided in blocks of size N×M where N and M are multiple of two and are inferior to the width and height of said MI prediction image MI(k). Only one motion information is kept for each N×M block. In other words, the motion information are sub-sampled by a factor N×M. In an embodiment N=M=4, one motion information being kept out of "16" motion information.

In an embodiment, the sub-sampling consists in selecting one particular motion information for each block among the N×M motion information.

In an embodiment, the sub-sampling consists in selecting a median value for each block among the N×M motion information (the median value being calculated using a norm of the motion vector).

In an embodiment, the sub-sampling consists in selecting the motion information appearing the most among the N×M motion information.

In an embodiment, the sub-sampling consists in selecting the motion information corresponding to the smallest depth in the view (z-buffer algorithm) for the whole sub-block.

In an embodiment, the sub-sampling consists in keeping the first projected value among the N×M motion information.

In the MI based VSP embodiment, the embodiment (14B) is modified and becomes the embodiment (14B_MI). Embodiment (14B_MI) is represented in FIG. 22B.

Comparing to embodiment (14B), in embodiment (14B_MI), steps 1412 is replaced by a step 1412_MI and step 1415 is replaced by a step 1415_MI.

In step 1412_MI, the processing module 20 generates a MI prediction image MI(k)$_j$ applying the forward projection method of steps 130 to 133 between a view j and the current view.

In step 1415_MI, the processing module 20 computes an aggregated MI prediction image MI(k) from the prediction images MI(k)$_j$, said MI prediction image MI(k) being intended to be stored in the DPB of the current view.

In an embodiment of the aggregation process, the prediction images MI(k)$_j$ are aggregated by keeping the motion information of the first MI prediction image MI(k)$_j$ of the plurality of MI prediction images. The first MI prediction image if for example the prediction image MI(k)$_{j=0}$.

In an embodiment of the aggregation process, the MI prediction images MI(k)$_j$ are aggregated by keeping the motion information of the prediction image MI(k)$_j$ generated from the view j the closest to the current view. If several views are at the same distance from the current view (i.e. there are several closest views), a closest view in the several closest views is selected randomly. For example, in the camera array 10, let suppose that only a first view generated by camera 10A and a second view generated by camera IOC are available for predicting a current view generated by camera 10B. Then the first and the second views are the closest views to the current view and are at the same distance to the current view. One of the first and the second view is selected to provide the motion information to the MI aggregated prediction image MI(k).

In an embodiment of the aggregation process, the MI prediction images MI(k)$_j$ are aggregated by keeping the motion information of the prediction image MI(k)$_j$ having the best quality. For example, an information representative of the quality of a pixel is a value of a quantization parameter applied to a transformed block comprising said pixel.

In an embodiment of the aggregation process, the MI prediction images MI(k)$_j$ are aggregated by keeping the motion information of the prediction image MI(k)$_j$ having the nearest depth value (z-buffer algorithm).

In an embodiment of the aggregation process, the MI prediction images MI(k)$_j$ are aggregated by keeping the pixels values (texture and depth values) of the prediction image MI(k)$_j$ when neighboring pixels of the aggregated MI prediction image MI(k) are already predicted from the prediction image MI(k)$_j$.

In an embodiment of the aggregation process, the MI prediction images MI(k)$_j$ are aggregated by computing an average, a weighted average, a median of the motion information of the MI prediction image MI(k)$_j$.

Note that the motion information comprises information representative of a motion vector and information representative of an index on a reference image in a list of reference images (for example ref_idx_l0, ref_idx_l1, ref_idx2_l0, ref_idx2_l1).

As can be seen from the above, in embodiment (14B_MI) the sub-sampling (step 220) is performed on the aggregated MI prediction image MI(k). In a variant of embodiment (14B_MI), the sub-sampling of step 220 is performed on each MI prediction image MI(k)$_j$.

As can be seen from the above, in embodiment (14B_MI) the sub-sampling (step 220) and the aggregation step 1415_MI are separated steps. In a variant of embodiment (14B_MI), the subsampling if performed during the aggregation step.

In the MI based VSP embodiment, the embodiment (15) is modified and becomes the embodiment (15_MI). Embodiment (15_MI) is represented in FIG. 23.

Comparing to embodiment (15), in embodiment (15_MI), step 1502 is replaced by a step 1502_MI, step 1503 is replaced by a step 1503_MI, step 1504 is replaced by a step 1504_MI and step 144 is replaced by a step 144_MI.

Step 1502_MI is identical to step 1412_MI.

Step 1503_MI is identical to step 142_MI except the hole filing process is applied to a MI prediction image MI(k)$_j$ instead of a MI prediction image MI(k).

During step 1504_MI, the prediction image MI(k)$_j$ is stored in the DPB of the current view.

Step 144_MI in embodiment (15_MI) is identical to step 144_MI in embodiment (14B_MI) except in that the DPB of the current view comprises a number Nb_views of MI prediction images MI(k)$_j$.

In a variant of embodiment (15_MI), a sub-sampling step 220 is introduced between steps 1503_MI and 1504_MI.

In a variant of embodiment (15_MI), in addition to the prediction images MI(k)$_j$, an aggregated prediction image generated from the prediction images MI(k)$_j$ and/or aggregated prediction images generated from subsets of prediction image MI(k)$_j$ is/are inserted in the DPB of the current view.

In a variant of embodiment (15_MII), in place of the prediction images MI(k)$_j$, an aggregated prediction image generated from the prediction images MI(k)$_j$ and aggregated prediction images generated from subsets of prediction images MI(k)$_j$ is/are inserted in the DPB of the current view or only aggregated prediction images generated from subsets of prediction images MI(k)$_j$ are inserted in the DPB of the current view.

Figure 25:
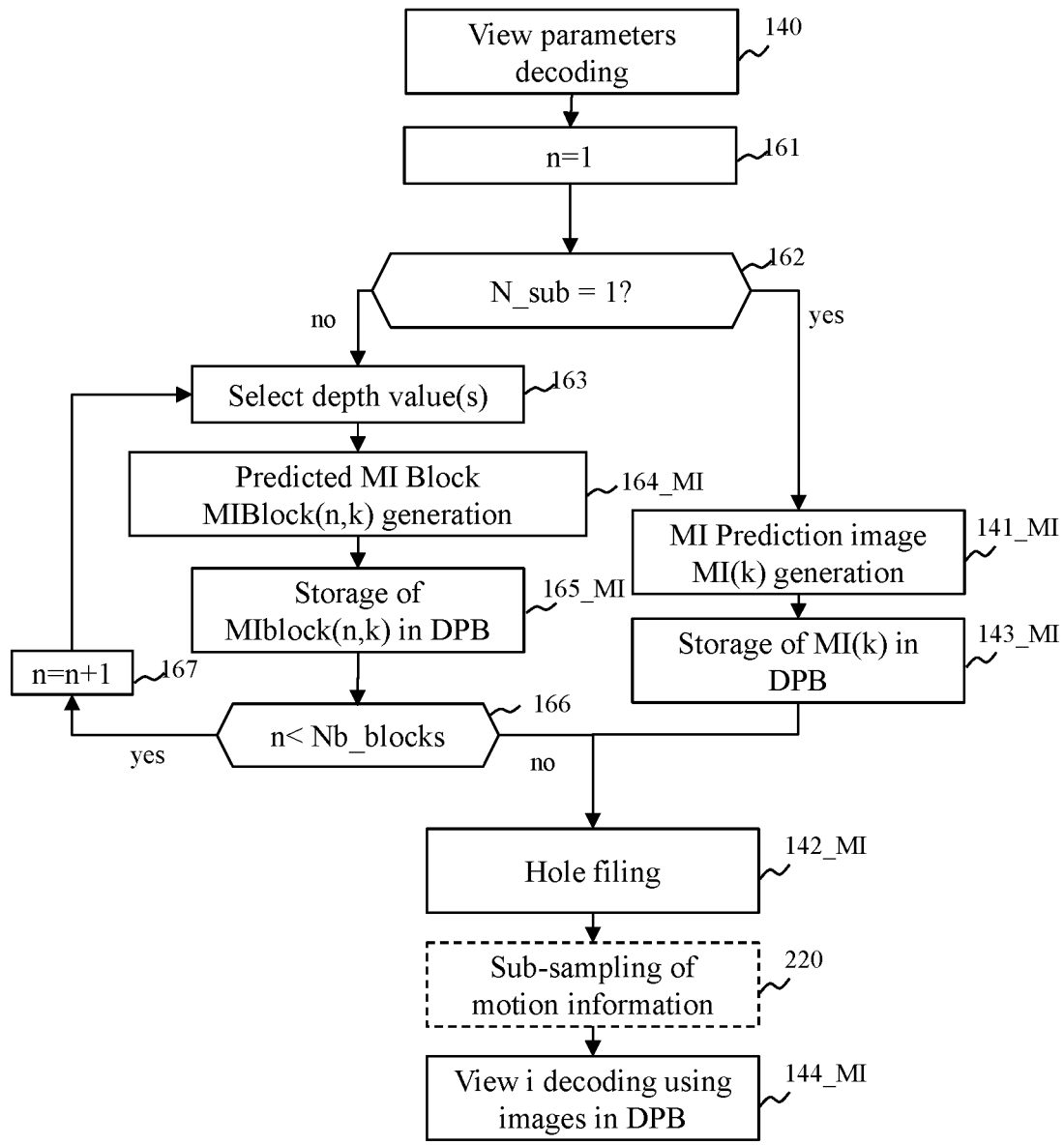

In the MI based VSP embodiment, the embodiment (16) is modified and becomes the embodiment (16_MI). Embodiment (16_MI) is represented in FIG. 25.

Comparing to embodiment (16), in embodiment (16_MI), step 164 is replaced by a step 164_MI, step 165 is replaced by a step 165_MI, step 141 is replaced by a step 141_MI, step 143 is replaced by step 143-MI, step 142 is replaced by step 142_MI and step 144 is replaced by a step 144_MI.

Step 141_MI in embodiment (16_MI) is identical to step 141_MI of embodiment (14A_MI).

Step 143_MI in embodiment (16_MI) is identical to step 143_MI of embodiment (14A_MI).

Step 142_MI in embodiment (16_MI) is identical to step 142_MI of embodiment (14A_MI).

Step 144_MI in embodiment (16_MI) is identical to step 144_MI of embodiment (14A_MI).

In step 164_MI, the processing module 20 generates a predicted block of motion information MIblock(n,k) applying the forward projection method described of steps 130 to 133 between the reference view and the current view for the block number n of the image of the reference view.

In step 165_MI, the processing module 20 stores the block MIblock(n,k) in the DPB of the current view at a position co-located with the position of the block number n of the image of the reference view.

In a variant of embodiment (16_MI), similarly to the embodiments (14B) and (15), the embodiment (16) can be applied to images of a plurality of reference views to obtain a plurality of MI prediction images.

In an embodiment of this variant, the MI prediction images of the plurality are stored in the DPB of the current view.

In an embodiment of this variant, the MI prediction images of the plurality are aggregated to form a MI aggregated prediction image and the aggregated MI prediction image is stored in the DPB of the current view.

In an embodiment of this variant, at least one subset of the MI prediction images of the plurality are aggregated to form an aggregated MI prediction image and each aggregated MI prediction image is stored in the DPB of the current view.

In an embodiment of this variant, at least one subset of the MI prediction images of the plurality are aggregated to form an aggregated MI prediction image and each aggregated MI prediction image is stored in the DPB of the current view, in addition to the MI prediction images and to an aggregated MI prediction image aggregating all prediction images of the plurality.

Embodiments bi-directional, WP and with modified weighting applies the same way to all MI based VSP embodiments (i.e. embodiments (14A), (14B), (15) and (16)).

Until now, the motion information are considered to comprise information representative of a motion vector and information representative of an index on a reference image in a list of reference images (for example ref_idx_l0, ref_idx_l1, ref_idx2_l0, ref_idx2_l1). In a variant of the MI based VSP embodiments, when an MI prediction image MI(k) is divided in blocks of size N, M, the motion information associated to each N×M block comprises parameters of an affine model of motion allowing determining the pixels of the current block in the current view from the pixels of the N×M block of the reference view instead of an information representative of a motion vector.

The syntax and parsing method of embodiments (18) and (18bis) are adapted to embodiments (14A_MI), (14B_MI) and (16_MI) when only one MI prediction image or aggregated MI prediction image is inserted in the DPB of the current layer.

The syntax and parsing method of embodiment (19) is adapted to embodiments (14A_MI), (14B_MI) and (16_MI) when only one MI prediction image or aggregated MI prediction image is inserted in the DPB of the current layer.

The syntax and parsing method of embodiment (20) is adapted to embodiments (15_MI) and (16_MI) when a plurality of MI prediction images or aggregated MI prediction images are inserted in the DPB of the current layer.

The syntax and parsing method of embodiment (21) is adapted to embodiments (14A_MI), (14B_MI) and (16_MI) when only one MI prediction image or aggregated MI prediction image is inserted in the DPB of the current layer.

Embodiments combining features of embodiments (18), (18bis), (19), (20) and (21) also apply to MI based VSP embodiments.

We described above a number of embodiments. Features of these embodiments can be provided alone or in any combination. Further, embodiments can include one or more of the following features, devices, or aspects, alone or in any combination, across various claim categories and types:

A bitstream or signal that includes one or more of the described syntax elements, or variations thereof.

Creating and/or transmitting and/or receiving and/or decoding a bitstream or signal that includes one or more of the described syntax elements, or variations thereof.

A TV, set-top box, cell phone, tablet, or other electronic device that performs MVD encoding or decoding according to any of the embodiments described.

A TV, set-top box, cell phone, tablet, or other electronic device that performs MVD decoding according to any of the embodiments described, and that displays (e.g. using a monitor, screen, or other type of display) a resulting image.

A TV, set-top box, cell phone, tablet, or other electronic device that tunes (e.g. using a tuner) a channel to receive a signal including an encoded video stream, and multi-view decoding according to any of the embodiments described.

A TV, set-top box, cell phone, tablet, or other electronic device that receives (e.g. using an antenna) a signal over the air that includes an encoded video stream, and MVD decoding according to any of the embodiments described.

The invention claimed is:

1. A method for decoding, the method comprising:
obtaining first camera parameters associated with at least one reference view and second camera parameters associated with a current view of a multi-views video content wherein each view comprises a texture layer and a depth layer;
generating an intermediate prediction image by applying a forward projection method to pixels of the reference view to project the pixels from a camera coordinates system of the reference view defined by said first camera parameters to a camera coordinates system of the current view defined by said second camera parameters, each projected pixel of the intermediate prediction image being associated with a texture value and a depth value equal to a texture value and a depth value associated with the pixel of the reference view from which it is projected;
storing at least one final prediction image obtained from at least one intermediate prediction image in a decoded picture buffer of reconstructed images used for temporal prediction of the current view; and
reconstructing a current image of the current view from images stored in said decoded picture buffer.

2. The method according to claim 1, wherein the forward projection method comprises:
applying a de-projection to a current pixel of the reference view from the camera coordinates system of the reference view to a world coordinate system to obtain a de-projected pixel, the de-projection using a pose matrix of a reference camera acquiring the reference view, an inverse intrinsic matrix of the reference camera, and a depth value associated with the current pixel, the pose matrix and the inverse intrinsic matrix of the reference camera being obtained from said first camera parameters;
projecting the de-projected pixel into the camera coordinate system of the current view to obtain a forward projected pixel using an intrinsic matrix and an extrinsic matrix of a current camera acquiring the current view, the intrinsic matrix and the extrinsic matrix of the current camera being obtained from said second camera parameters; and
if the forward projected pixel does not correspond to a pixel on a grid of pixels of the current camera, selecting a pixel of said grid of pixels nearest to the forward projected pixel to obtain a corrected forward projected pixel.

3. The method according to claim 1, further comprising filling isolated missing pixel values in each intermediate prediction image or in the final prediction image with an average of neighboring pixel values, a median value of neighboring pixel values or a default value.

4. The method according to claim 1, wherein the at least one final prediction image results from an aggregation of at least two intermediate prediction images.

5. The method according to claim 1, further comprising reconstructing a current block of the current image from a bi-directional predictor block computed as a weighted sum of two mono-directional predictor blocks, each mono-directional predictor block being extracted from one image stored in the decoded picture buffer, at least one of the mono-directional predictor blocks being extracted from a final prediction image stored in said decoded picture buffer.

6. The method according to claim 5, wherein at least one weight used in the weighted sum is modified in function of a confidence rate of a pixel of a mono-directional predictor block.

7. The method according to claim 1, further comprising decoding a syntax element comprising at least an identifier for the current view and a flag indicating whether the current view is predicted from a final prediction image from a slice header, a sequence header, an image header or at a level of a synchronization point or image.

8. The method according to claim 1, wherein decoding the current block according to a VSP (View basic Synthesis Prediction) mode using the final prediction image to generate a predictor block for the current block, is explicitly signaled by a flag in a portion of an encoded video stream corresponding to said current block or is implicitly signaled by a syntax element representing an index identifying the final prediction image in the decoded picture buffer.

9. The method according to claim 8, wherein when another block encoded in merge or skip mode inherits its encoding parameters from a block encoded in the VSP mode, said another block inherits also VSP parameters.

10. A device for decoding comprising at least one processor configured to implement:
obtaining first camera parameters associated with at least one reference view and second camera parameters associated with a current view of a multi-views video content wherein each view comprises a texture layer and a depth layer;
generating an intermediate prediction image by applying a forward projection method to pixels of the reference view to project the pixels from a camera coordinates system of the reference view defined by said first camera parameters to a camera coordinates system of the current view defined by said second camera parameters, each projected pixel of the intermediate prediction image being associated with a texture value and a depth value equal to a texture value and a depth value associated with the pixel of the reference view from which it is projected;
storing at least one final prediction image obtained from at least one intermediate prediction image in a decoded picture buffer of reconstructed images used for temporal prediction of the current view; and
reconstructing a current image of the current view from images stored in said decoded picture buffer.

11. The device according to claim 10, wherein the processor is further configured to fill isolated missing pixel values in each intermediate prediction image or in the final prediction image with an average of neighboring pixel values, a median value of neighboring pixel values or a default value.

12. The device according to claim 10, wherein the at least one final prediction image results from an aggregation of at least two intermediate prediction images.

13. The device according to claim 10, wherein the processor is further configured to reconstruct a current block of the current image from a bi-directional predictor block computed as a weighted sum of two mono-directional predictor blocks, each mono-directional predictor block being extracted from one image stored in the decoded picture buffer, at least one of the mono-directional predictor blocks being extracted from a final prediction image stored in said decoded picture buffer.

14. The device according to claim 10, wherein the processor is further configured to decode a syntax element comprising at least an identifier for the current view and a flag indicating whether the current view is predicted from a final prediction image from a slice header, a sequence header, an image header or at a level of a synchronization point or image.

15. A device for encoding comprising at least one processor configured to implement:
obtaining first camera parameters associated with at least one reference view and second camera parameters associated with a current view of a set of views of a multi-views video content wherein each view comprises a texture layer and a depth layer;
generating an intermediate prediction image by applying a forward projection method to pixels of the reference view to project said pixels from a camera coordinates system of the reference view defined by said first camera parameters to a camera coordinates system of the current view defined by said second camera parameters, each projected pixel being associated with a texture value and a depth value equal to a texture value and a depth value associated with the pixel of the reference view from which it is projected;
storing at least one final prediction image obtained from at least one intermediate prediction image in a decoded picture buffer of reconstructed images used for temporal prediction of the current view; and
reconstructing a current image of the current view from images stored in said decoded picture buffer.

16. The device according to claim 15, wherein the processor is further configured to fill isolated missing pixel values in each intermediate prediction image or in the final prediction image with an average of neighboring pixel values, a median value of neighboring pixel values or a default value.

17. The device according to claim 15, wherein, at least one final projection image results from an aggregation of at least two intermediate prediction images.

18. The device according to claim 15, wherein the processor is further configured to reconstruct a current block of the current image from a bi-directional predictor block computed as a weighted sum of two mono-directional predictor blocks, each mono-directional predictor block being extracted from one image stored in the decoded picture buffer, at least one of the mono-directional predictor blocks being extracted from a final prediction image stored in said decoded picture buffer.

19. The device according to claim 15, wherein the processor is further configured to encode a syntax element comprising at least an identifier for the current view and a flag indicating whether the current view is predicted from a final prediction image from a slice header, a sequence header, an image header or at a level of a synchronization point or image.

20. A method for encoding, the method comprising:
obtaining first camera parameters associated with at least one reference view and second camera parameters associated with a current view of a set of views of a multi-views video content wherein each view comprises a texture layer and a depth layer;
generating an intermediate prediction image by applying a forward projection method to pixels of the reference view to project said pixels from a camera coordinates system of the reference view defined by said first camera parameters to a camera coordinates system of the current view defined by said second camera parameters, each projected pixel being associated with a texture value and a depth value equal to a texture value and a depth value associated with the pixel of the reference view from which it is projected;
storing at least one final prediction image obtained from at least one intermediate prediction image in a decoded picture buffer of reconstructed images used for temporal prediction of the current view; and reconstructing a current image of the current view from images stored in said decoded picture buffer.

21. The method according to claim 20, wherein the method comprises filling isolated missing pixel values in each intermediate prediction image or in the final prediction image with an average of neighboring pixel values, a median value of neighboring pixel values or a default value.

22. The method according to claim 20, wherein, at least one final projection image results from an aggregation of at least two intermediate prediction images.

23. The method according to claim 20, wherein the method comprises, reconstructing a current block of the current image from a bi-directional predictor block computed as a weighted sum of two mono-directional predictor blocks, each mono-directional predictor block being extracted from one image stored in the decoded picture buffer, at least one of the mono-directional predictor blocks being extracted from a final prediction image stored in said decoded picture buffer.

24. The method according to claim 20, comprising encoding a syntax element comprising at least an identifier for the current view and a flag indicating whether the current view is predicted from a final prediction image in a slice header, a sequence header, an image header or at a level of a synchronization point or image.

* * * * *